(12) United States Patent
Orita

(10) Patent No.: US 8,818,553 B2
(45) Date of Patent: Aug. 26, 2014

(54) ROBOT CONTROL DEVICE

(75) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 13/516,921

(22) PCT Filed: Sep. 13, 2010

(86) PCT No.: PCT/JP2010/065753
§ 371 (c)(1),
(2), (4) Date: Jun. 18, 2012

(87) PCT Pub. No.: WO2011/080949
PCT Pub. Date: Jul. 7, 2011

(65) Prior Publication Data
US 2012/0259463 A1   Oct. 11, 2012

(30) Foreign Application Priority Data

Dec. 28, 2009 (JP) ................................. 2009-297040

(51) Int. Cl.
*B25J 9/00* (2006.01)
*B62D 57/00* (2006.01)
*B25J 9/16* (2006.01)

(52) U.S. Cl.
CPC ............... *B25J 9/1648* (2013.01); *B62D 57/00* (2013.01); *Y10S 901/01* (2013.01)
USPC ............................................. 700/245; 901/1

(58) Field of Classification Search
USPC ................. 700/245, 246, 251, 253, 260, 261; 318/568.1, 568.12, 568.16, 568.2; 901/1, 28, 9, 46
See application file for complete search history.

(56) References Cited

U.S. PATENT DOCUMENTS

| 5,994,864 | A * | 11/1999 | Inoue et al. ................. 318/568.2 |
| 7,054,718 | B2 * | 5/2006 | Miyamoto et al. ............ 700/258 |
| 7,319,918 | B2 * | 1/2008 | Takenaka et al. ............ 700/245 |
| 2007/0267994 | A1 * | 11/2007 | Sugihara ................... 318/568.12 |

FOREIGN PATENT DOCUMENTS

| JP | 05-305579 | 11/1993 |
| JP | 07-078030 | 3/1995 |
| JP | 10-277969 | 10/1998 |
| JP | 2006-105054 | 4/2006 |
| JP | 2007-160446 | 6/2007 |
| JP | 2008-211137 | 9/2008 |
| WO | 2005/109139 | 11/2005 |

* cited by examiner

*Primary Examiner* — Dalena Tran
(74) *Attorney, Agent, or Firm* — Rankin, Hill & Clark LLP

(57) ABSTRACT

Disclosed is a robot control device including a means for determining control inputs classified by state quantity for achieving respective target values of a plurality of types of state quantities of a robot, and a means for determining a synthesized control input by synthesizing control inputs classified by frequency region while determining control inputs classified by frequency region in a plurality of respective frequency regions, according to control inputs classified by state quantity. The means determines a control input classified by frequency region corresponding to any one of the frequency regions by synthesizing the plurality of control inputs classified by state quantity in a mutually non-interfering manner. The operation of the robot is controlled so that, under a variety of operating conditions of the robot, a plurality of types of state quantities are efficiently controlled to target values which correspond to the respective types of state quantities.

7 Claims, 7 Drawing Sheets

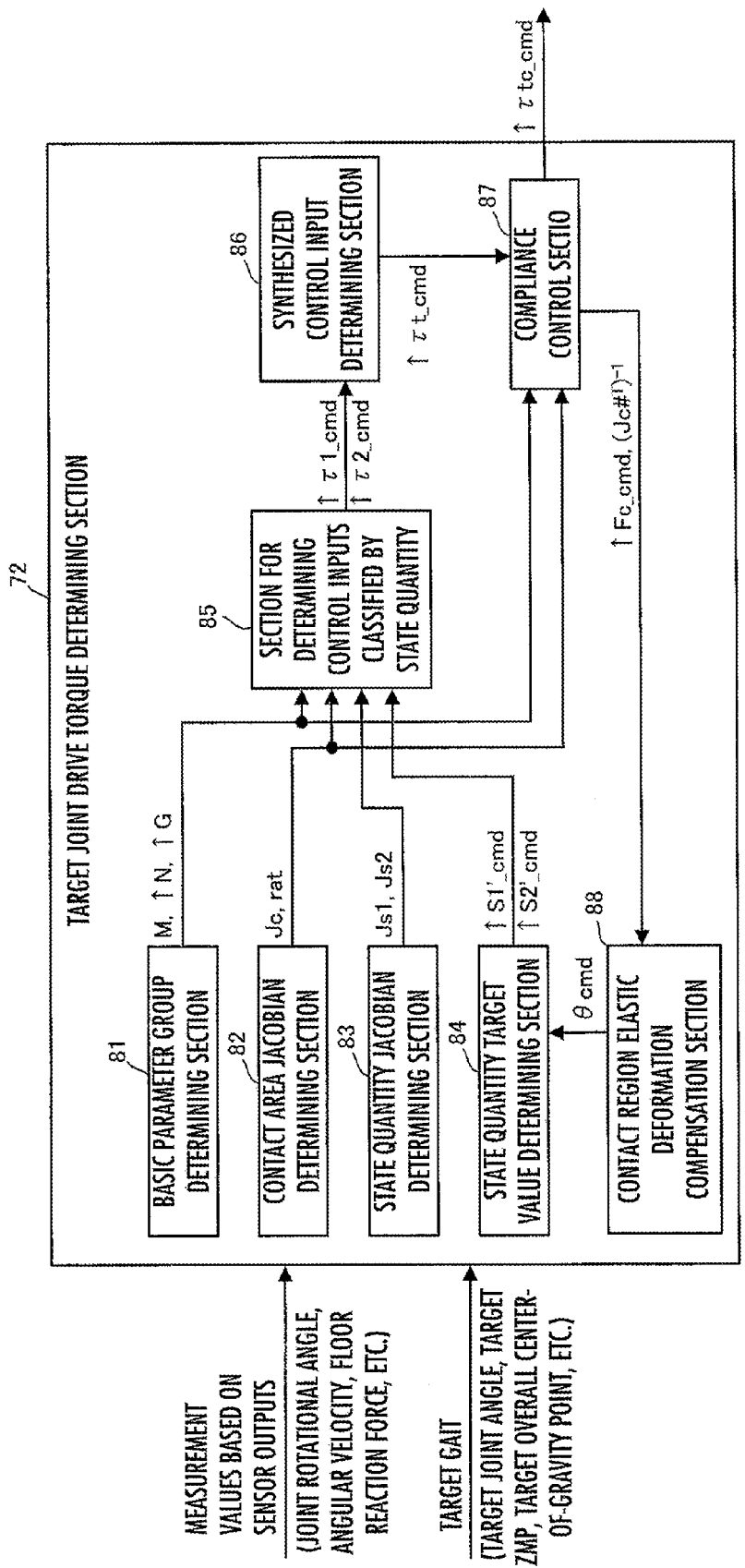

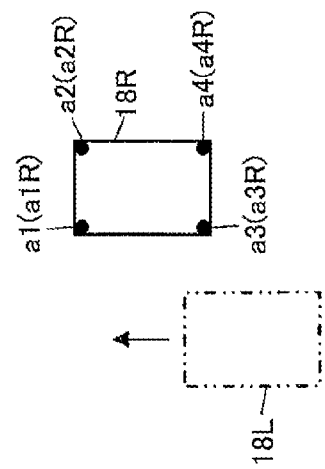
FIG.5(c) ONE-LEG GROUND CONTACT STATE (RIGHT-LEG GROUND CONTACT STATE)
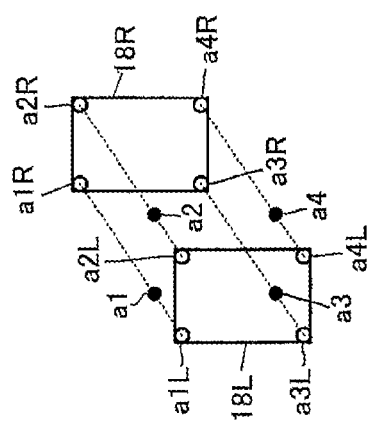
FIG.5(b) TWO-LEG GROUND CONTACT STATE
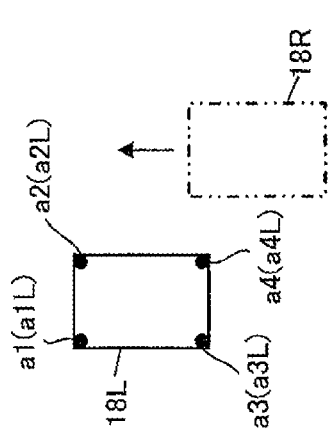
FIG.5(a) ONE-LEG GROUND CONTACT STATE (LEFT-LEG GROUND CONTACT STATE)

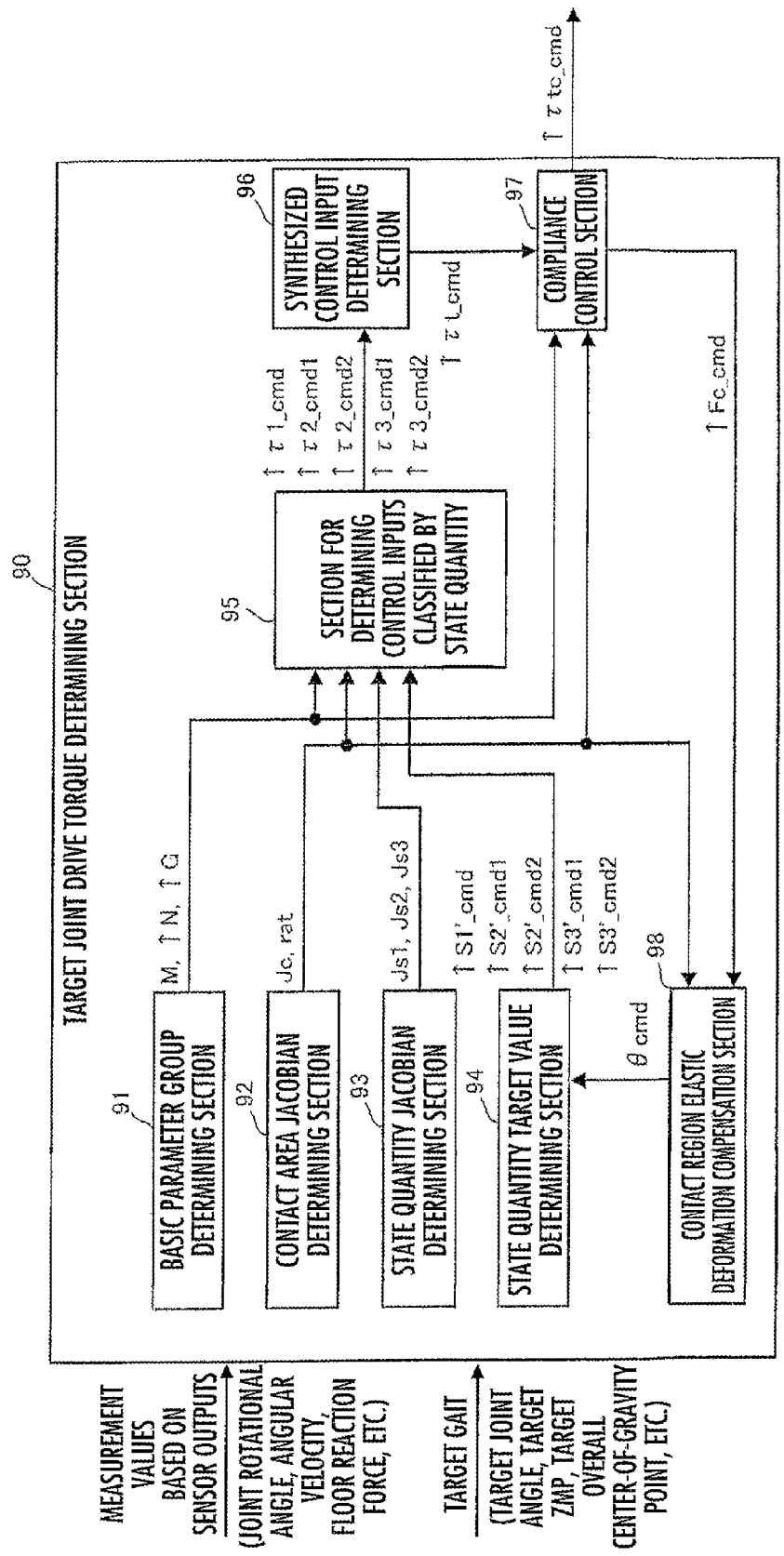

ROBOT CONTROL DEVICE

TECHNICAL FIELD

The present invention relates to a control device for a robot such as a legged mobile robot.

BACKGROUND ART

As a technique for controlling a legged mobile robot such as a bipedal walking robot, there has been generally known so-called position control proposed in, for example, Patent Document 1 by the applicant of the present application. According to the disclosed technique, the target displacement amount of each joint of a robot is sequentially determined on the basis of a target motion of the robot (e.g., the trajectory of a target position of the distal end of a leg of the robot), and then the actuator of each joint is drivably controlled so as to cause an actual displacement amount to coincide with the target displacement amount.

According to the position control described above, the actual displacement amount of a joint is maintained to be constant as long as the target displacement amount of the joint remains constant, thus presenting poor flexibility in response to a change in an external force acting on the robot.

As a solution to the inflexibility, there has been known a technique disclosed in, for example, Patent Document 2. According to the technique, a spring member is interposed between a joint and an actuator to impart flexibility to the joint, and a target driving force for each joint to accomplish a target motion of a robot is determined by inverse dynamics calculation so as to control the actual driving force of each joint to the target driving force thereof by so-called force control.

PRIOR ART DOCUMENTS

Patent Documents

Patent Document 1: Japanese Patent Application Laid-Open No. 5-305579
Patent Document 2: Japanese Patent Application Laid-Open No. 2007-160446

SUMMARY OF THE INVENTION

Problems to be Solved by the Invention

In the case of controlling the motion of the robot, in order to ensure the stability of the motion of the robot, there are many cases where it is desirable to control a plurality of types of state quantities whose values change according to the displacement amounts of one or more joints of the robot (for example, the positions and postures of a plurality of areas, which are different from each other, of the robot, the motion speed of the areas different from each other or representative points, the motion state quantities of different types from each other of a predetermined area of the robot, or the like) to appropriate target values corresponding to the respective state quantities. Particularly, in a force-controlled robot, the displacement amount of each joint is variable according to a change in an external force acting on the robot and therefore there is a high need for controlling the plurality of types of state quantities to appropriate target values corresponding to the respective state quantities as described above.

In this case, generally, the joints capable of adjusting the values of the respective types of state quantities are not always joints of different types from each other, but in some cases the joints capable of adjusting the values of the respective types of state quantities overlap each other, depending on each instantaneous motion state of the robot. In other cases, the priority in controlling the state quantity of each type to a target value or the quick reaction capability required for the control may differ according to the type of state quantity or change according to the operating conditions of the robot.

Therefore, it has been desired to provide a highly versatile control technique capable of controlling the operation of the robot so as to control the plurality of types of state quantities efficiently to appropriate target values corresponding to the respective state quantities under a variety of operating conditions of the robot.

In the conventional robot control technique, however, actually there is no established technique capable of adequately satisfying the above requirement.

The present invention has been made with the background described above, and it is an object of the invention to provide a highly versatile control device capable of controlling the operation of the robot so as to control the plurality of types of state quantities efficiently to the target values corresponding to the respective state quantities under a variety of operating conditions of the robot.

Means for Solving the Problems

In order to achieve the above object, the present invention provides a control device for a robot provided with a plurality of links interconnected by joints and actuators which drive the joints, the control device including:

an element for determining control inputs classified by state quantity which receives respective target values of a plurality of types of state quantities whose values are defined dependently of one or more component values of a generalized variable vector of the robot which is a vector including at least a displacement amount of each joint of the robot as a component, and then determines control inputs classified by state quantity, which are control inputs defining operations of the actuators necessary to achieve the target values corresponding to the state quantities, for each of the respective types of state quantities on the basis of at least the target values corresponding to the state quantities;

a synthesized control input determining element which determines control inputs classified by frequency region, which are control inputs defining operations of the actuators in a plurality of respective preset frequency regions, according to one or more of the control inputs classified by state quantity, which are determined correspondingly to the plurality of types of state quantities, respectively, while carrying out processing for synthesizing the control inputs classified by frequency region corresponding to the plurality of frequency regions, respectively;

an actuator control element which controls the operation of the actuators according to at least the synthesized control input, wherein the processing carried out by the synthesized control input determining element includes processing for determining the control inputs classified by frequency region, which correspond to at least one of the plurality of frequency regions, by synthesizing a plurality of control inputs classified by state quantity of the control inputs classified by state quantity, which correspond to the plurality of types of state quantities, respectively, in a mutually non-interfering manner (a first aspect of the invention).

Supplementarily, in the present invention, the aforesaid robot may be an installed type robot having at least one link thereof fixed relative to a global coordinate system in an operating environment of the robot (fixed to a floor or the like in the operating environment) or a mobile robot whose entire body is movable in relation to the global coordinate system. The global coordinate system means a coordinate system that can be regarded as an inertial coordinate system or an approximately inertial coordinate system.

Further, the aforesaid generalized variable vector is a vector having the displacement amounts (rotational angles or stroke amounts) of all joints of the robot as component values thereof in the case where the aforesaid robot is an installed robot. Meanwhile, in the case where the aforesaid robot is a mobile robot, the generalized variable vector is a vector having the position and posture of an arbitrary single representative link of the robot on the global coordinate system and the displacement amounts of all joints of the robot as component values thereof.

The term "position" of a link of the robot means a spatial position of a representative point fixed relative to the link, and the term "posture" of the link means a spatial orientation of the link.

According to the first aspect of the invention, in order to control the plurality of types of state quantities of the robot to required target values, the element for determining control inputs classified by state quantity determines the control inputs classified by state quantity, which define the operations of the actuators necessary to achieve the target values corresponding to the state quantities (to control the actual values of the state quantities to the target values) for each of the respective types of state quantities on the basis of at least the target values corresponding to the state quantities.

The term "respective types of state quantities" means state quantities whose values are defined dependently of one or more component values of the generalized variable vector of the robot, i.e., state quantities to be function values of one or more component values of the generalized variable vector.

Further, in the first aspect of the invention, the synthesized control input determining element determines a synthesized control input by determining control inputs classified by frequency region in the plurality of respective frequency regions according to the control inputs classified by state quantity, while carrying out processing for synthesizing the control inputs classified by frequency region corresponding to the plurality of frequency regions, respectively.

Further, the actuator control element controls the operation of the actuators according to at least the synthesized control input. This enables the operations of the robot to be controlled with the control inputs classified by frequency region reflected on the operations for each frequency region.

Here, the control inputs classified by frequency region for each frequency region are determined according to one or more of the control inputs classified by state quantity (i.e., one or more control inputs classified by state quantity) out of the control inputs classified by state quantity corresponding to the plurality of types of state quantities, respectively. The control inputs classified by state quantity to be the basis for the control inputs classified by frequency region for each frequency region are more specifically frequency components within the corresponding frequency region.

Moreover, regarding at least one of the frequency regions (one or more frequency regions), the control inputs classified by frequency corresponding to the frequency region (hereinafter, referred to as the specific frequency region in some cases) are determined according to two or more (a plurality of) control inputs classified by state quantity out of the control inputs classified by state quantity corresponding to the plurality of types of state quantities, respectively (the number of control inputs classified by state quantity may be less than the number of types of state quantities). Further, in this case, the control inputs classified by frequency corresponding to the specific frequency region are determined by synthesizing the two or more control inputs classified by state quantity in a mutually non-interfering manner.

In addition, the plurality of frequency regions may be frequency regions partially overlapping each other.

Here, in the present invention, the term "synthesizing the two or more control inputs classified by state quantity in a mutually non-interfering manner" means that, in the case where the control input classified by frequency obtained after the synthesizing is defined as a control input A and where an arbitrary single control input classified by state quantity out of the two or more control inputs classified by state quantity to be the basis for the control input A is defined as a control input B and assuming a case of controlling the operations of the actuators of the robot by using the control input A and a case of controlling the operations of the actuators of the robot by using the components of the specific frequency region of the control input B, the two or more control inputs classified by state quantity are synthesized such that the state quantity of the type corresponding to the control input B out of the plurality of types of state quantities is controlled to the same state in both cases.

In other words, the term "synthesizing the two or more control inputs classified by state quantity in a mutually non-interfering manner" means that the two or more control inputs classified by state quantity are synthesized such that the operation for the components affecting the value of the state quantity corresponding to the control input B, out of the generalized variable vector, is the same between the control input A and the control input B and the operation for one or more of other components are different between the control input A and the control input B.

According to the first aspect of the invention, it is possible to select the control inputs classified by state quantity to be the basis for the control inputs classified by frequency corresponding to the respective frequency regions for each thereof. In other words, state quantities as controlled objects (objects to be controlled) can be selected for each frequency region. Therefore, it is possible to determine control inputs classified by frequency region appropriate for demands regarding the control of the plurality of state quantities (the degree of priority of the control, the degree of demand for quick reaction capability, the necessity of the control, etc.).

Moreover, regarding the specific frequency region, the plurality of control inputs classified by state quantity are synthesized in a mutually non-interfering manner, thereby enabling controlling the plurality of types of state quantities corresponding to the respective control inputs classified by state quantity to the target values, respectively, in a mutually non-interfering manner (such that the control of each of the plurality of types of state quantities does not affect the control of other state quantities).

Consequently, according to the first aspect of the invention, robot operation control is achieved in such a way as to efficiently control the plurality of types of state quantities to target values corresponding thereto under a variety of operating conditions of the robot. In addition, a variety of forms may be employed as state quantities to be controlled, thereby enabling an increase in versatility of the control device which performs the operation control as described above.

Supplementarily, in the present invention, the control inputs classified by state quantity, which are determined in association with the respective types of state quantities by the element for determining control inputs classified by state quantity, do not need to be single control inputs for the respective types of state quantities, but a plurality of control inputs classified by state quantity for achieving the target value of the state quantity may be determined for any one type of state quantities according to control laws different from each other. For example, two control inputs classified by state quantity for achieving the target value of the state quantity may be determined according to the feedforward control law for one control input and according to the feedback control law for the other control input. Further, in this case, the controlled objects in frequency regions different from each other may include the state quantities, and the control inputs classified by frequency region corresponding to the respective frequency regions may be determined by using the respective control inputs classified by state quantity corresponding to the state quantities (the respective control inputs classified by state quantity determined according to control laws different from each other).

In the first aspect of the invention, more specifically the processing of the synthesized control input determining element is implemented by, for example, the following processing.

Specifically, assuming that τtotal is the synthesized control input, n is the total number of the plurality of frequency regions, an i-th frequency region (i=1, 2, . . . , n) is each of n frequency regions, and W(i) is a frequency weight having a frequency pass characteristic set so that the i-th frequency region is a passable frequency band, the synthesized control input determining element determines the synthesized control input τtotal, for example, by processing represented by the following expression 01 from n τf(i) (i=1, 2, . . . , n) calculated by processing represented by the following expression 02a and the frequency weight W(i) (i=1, 2, . . . , n) (a second aspect of the invention).

In the present specification, "*" means a multiplication sign.

[MATH. 1]

$$\tau\,\text{total} = W(1)*\tau f(1) + W(2)*\tau f(2) + \ldots + W(n)*\tau f(n) \quad \text{Expression 01}$$
$$= \sum_{i=1}^{n}(W(i)*\tau f(i))$$

$$\tau f(i) = \tau(i,1) + Nu(i,1)*\tau(i,2) + \ldots + \quad \text{Expression 02a}$$
$$Nu(i,1)*Nu(i,2)*\ldots*Nu(i,m(i)-1)*$$
$$\tau(i,m(i))))$$
$$= \tau(i,1) + \sum_{j=1}^{m(i)-1}\left(\left(\prod_{k=1}^{j}Nu(i,k)\right)*\tau(i,j+1)\right)$$

where

[MATH. 2]

$$\text{if } m(i) = 1, \sum_{j=1}^{m(i)-1}\left(\left(\prod_{k=1}^{j}Nu(i,k)\right)*\tau(i,j+1)\right) \equiv 0$$

W(i)*τf(i): an i-th control input classified by frequency region, which is a control input classified by frequency region corresponding to the i-th frequency region;

m(i): an integer which indicates the number of control inputs classified by state quantity determined as composition components of the i-th control input classified by frequency region W(i)*τf(i) out of the control inputs classified by state quantity corresponding to the plurality of types of state quantities, respectively, and which is set so as to satisfy conditions $1 \leq m(i) \leq M$ (M: the number of types of the state quantities) and m(i)>1 for any i within a range of satisfying a predetermined constraint condition;

τ(i, j): a (i, j)-th control input classified by state quantity (vector), which is a j-th control input classified by state quantity out of the m(i) control inputs classified by state quantity τ(i, j) (j=1, 2, . . . , m(i)) determined as composition components of the i-th control input classified by frequency W(i)*τf (i) within a range of satisfying the predetermined constraint condition;

the predetermined constraint condition: a condition that the following is not satisfied: m(i)=M hold for all i (i=1, 2, . . . , n), and τ(i1, j)=τ(i2, j) hold for all j (j=1, 2, . . . , M) from 1 to M with respect to arbitrary i values i1 and i2 ($1 \leq i1 \leq n$, $1 \leq i2 \leq n$) different from each other;

Nu(i, j): a matrix defined by $Nu(i,j) \equiv I - Js(i,j)^T*(Js\#(i,j))^T$;

Js#(i, j): a matrix defined by $Js\#(i,j)(Wat)^T*Js(i,j)^T*(Js(i,j)*Wat*Js(i,j)^T)^{-1}$;

I: an identity matrix;

Js(i, j): a Jacobian satisfying $S(i,j)=Js(i,j) \cdot q'$;

Wat: a matrix defined by $WatWd*M^{-1}$;

Wd: a preset weight matrix (diagonal matrix);

M: an inertia matrix transforming q" into a generalized force vector (M*q"=generalized force vector);

S(i, j): a state quantity corresponding to the (i, j)-th control input classified by state quantity (a vector or a scalar);

q: a generalized variable vector;

q': a first-order differential value of q (=dq/dt); and q": a second-order differential value of q ($=d^2q/dt^2$).

In addition, the arithmetic processing W(i)*τf(i) in the above expression 01 is equivalent to processing for passing τf(i) through a filter having the same frequency pass characteristic as the frequency weight W(i) (filtering processing).

Moreover, the generalized force vector is a vector whose each component corresponds to each component of a generalized variable vector q (a vector composed of the same number of components as those of q). The generalized force vector is, more specifically, a vector whose each component is a force (a translational force or a moment) which causes a temporal change of a component value of the generalized variable vector q corresponding to the component.

According to the second aspect of the invention, the i-th frequency region satisfying m(i)>1 corresponds to the specific frequency region.

In this case, the matrix Nu(i, j) is defined as described above. Therefore, in the above expression 02, for example, Nu(i, 1)*τ(i, 2) means a vector (generalized force vector) composed of components not affecting the value of the state quantity of the type corresponding to the control input classified by state quantity τ(i, 1) (not changing the value of the state quantity), out of the control inputs classified by state quantity τ(i, 2).

More generally speaking, Nu(i, 1)*Nu(i, 2)* . . . *Nu(i, m(i)−1)*τ(i, m(i)) in the above expression 02 means a vector (generalized vector) composed of components not affecting the values of the state quantities corresponding to (m(i)−1) control inputs classified by state quantity τ(i, 1) to τ(i, m(i)−1), respectively, out of the control inputs classified by state quantity τ(i, m(i)).

Further, the number of control inputs classified by state quantity m(i) determined as composition components of the i-th control input classified by frequency region W(i)*τf(i) (i.e., the number of state quantities selected as controlled objects in the i-th frequency region) is set so as to satisfy the above condition.

Therefore, according to the second aspect of the invention, the i-th control input classified by frequency region $W(i)*\tau f(i)$ corresponding to the i-th frequency region satisfying $m(i)>1$ (specific frequency region) is derived by synthesizing the $m(i)$ control inputs classified by state quantity $\tau(i,1)$ to $\tau(i, m(i))$ in a mutually non-interfering manner.

Therefore, according to the second aspect of the invention, the synthesized control input capable of achieving the advantageous effect of the first aspect of the invention can be properly determined.

Supplementarily, the predetermined constraint condition is, in other words, equivalent to a condition that there is a pair of i values, i3 and i4, satisfying $m(i) \neq M$ with respect to arbitrary i ($1 \leq i \leq n$) or satisfying $\tau(i3, j) \neq \tau(i4, j)$ with respect to arbitrary j ($1 \leq j \leq M$).

Moreover, the weight matrix Wd may be an identity matrix. In other words, $Wat = M^{-1}$ may hold.

In each frequency region, the type or number of state quantities to be selected as controlled objects are not always required to be fixed during operation of the robot, but in some cases it is necessary or preferable to change the type or number of state quantities to be controlled according to the operating conditions of the robot.

For example, in some cases, it is required to select a specific type of state quantities as controlled objects in a specific frequency region only in a period in which a specific operation is performed in a series of operations of the robot and is required to remove the specific type of state quantities from the controlled objects in the specific frequency region or to replace the specific type of state quantities by other types of state quantities in other periods.

In the above situation, if the type or number of state quantities to be controlled in an arbitrary frequency region is immediately changed at a certain timing during the operation of the robot (at a timing of changing the type or number of state quantities to be controlled), a discontinuous change easily occurs in the control inputs classified by frequency region corresponding to the frequency region in the vicinity of the change. By extension, the synthesized control input is susceptible to a discontinuous change.

Further, if the discontinuous change occurs in the synthesized control input, the operations of the actuators of the robot are required to change rapidly. Therefore, in the case of changing the type or number of state quantities to be controlled in any one of the plurality of frequency regions, it is required to make the above change in such a way as to prevent the discontinuous change in the synthesized control input.

To achieve the above demand, it is preferable to carry out the processing of the synthesized control input determining element by, for example, processing as described below in the first aspect of the invention.

Specifically, the synthesized control input determining element determines the synthesized control input $\tau$total by processing represented by the above expression 01 from $n$ $\tau f(i)$ ($i=1, 2, \ldots, n$) calculated by processing represented by the following expression 02b, instead of the above expression 02a, and the frequency weight $W(i)$ ($i=1, 2, \ldots, n$) (a third aspect of the invention).

[MATH. 3]

$$\tau\text{total} = W(1)*\tau f(1) + W(2)*\tau f(2) + \ldots + W(n)*\tau f(n) \quad \text{Expression 01}$$

$$= \sum_{i=1}^{n} (W(i)*\tau f(i))$$

-continued $$\tau f(i) = wc(i,1)*\tau(i,1) + Nuw(i,1)* \qquad \text{Expression 02a}$$
$$wc(i,2)*\tau(i,2) + \ldots + Nuw(i,1)*Nuw(i,2)*\ldots*$$
$$Nuw(i, m(i)-1)*wc(i, m(i))*\tau(i, m(i))))$$

$$= wc(i,1)*\tau(i,1) + \sum_{j=1}^{m(i)-1} \left(\left(\prod_{k=1}^{j} Nuw(i,k)\right) * wc(i, j+1)*\tau(i, j+1)\right)$$

where

[MATH. 4]

if $m(i) = 1$, $$\sum_{j=1}^{m(i)-1} \left(\left(\prod_{k=1}^{j} Nuw(i,k)\right) * wc(i, j+1)*\tau(i, j+1)\right) \equiv 0$$

$W(i)*\tau f(i)$: the i-th control input classified by frequency region, which is a control input classified by frequency region corresponding to the i-th frequency region;

$m(i)$: an integer which indicates the number of control inputs classified by state quantity determined as composition components of the i-th control input classified by frequency region $W(i)*\tau f(i)$ out of the control inputs classified by state quantity corresponding to the plurality of types of state quantities, respectively, and which is set so as to satisfy conditions $1 \leq m(i) \leq M$ (M: the number of types of the state quantities) and $m(i)>1$ for any i within a range of satisfying a predetermined constraint condition;

$\tau(i, j)$: the (i, j)-th control input classified by state quantity (vector), which is the j-th control input classified by state quantity out of the $m(i)$ control inputs classified by state quantity $\tau(i, j)$ ($j=1, 2, \ldots, m(i)$) determined as composition components of the i-th control input classified by frequency $W(i)*\tau f(i)$ within a range of satisfying the predetermined constraint condition;

the predetermined constraint condition: a condition that the following is not satisfied: $m(i)=M$ hold for all i ($i=1, 2, \ldots, n$), and $\tau(i1, j)=\tau(i2, j)$ hold for all j ($j=1, 2, \ldots, M$) from 1 to M with respect to arbitrary i values i1 and i2 ($1 \leq i1 \leq n$, $1 \leq i2 \leq n$) different from each other;

$wc(i, j)$: a weight coefficient which corresponds to the (i, j)-th control input classified by state quantity $\tau(i, j)$ and which is maintained at a constant value within a range of $0 \leq wc(i, j) \leq 1$ or set so as to increase or decrease continuously;

$Nuw(i, j)$: a matrix defined by $Nuw(i, j) \equiv I - wc(i, j)*Js(i, j)^T*(Js\#(i, j)^T$;

$Js\#(i, j)$: a matrix defined by $Js\#(i, j)(Wat)^T*Js(i, j)^T*(Js(i, j)*Wat*Js(i, j)^T)^{-1}$;

I: an identity matrix;

$Js(i, j)$: a Jacobian satisfying $S(i, j)=Js(i, j) \cdot q'$;

Wat: a matrix defined by $Wat \equiv Wd*M^{-1}$;

Wd: a preset weight matrix (diagonal matrix);

M: an inertia matrix transforming $q''$ into a generalized force vector ($M*q''$=generalized force vector);

$S(i, j)$: a state quantity corresponding to the (i, j)-th control input classified by state quantity (vector or scalar);

q: a generalized variable vector;

q': a first-order differential value of q ($=dq/dt$); and q'': a second-order differential value of q ($=d^2q/dt^2$)

The above expression 02b in the third aspect of the invention is derived by adding the weight coefficient $wc(i, j)$ by which $\tau(i, j)$ ($j=1, 2, \ldots, m(i)$) is multiplied to the respective terms in the right side of the above expression 02a in the second aspect of the invention and replacing the matrix Nu(i, j) ($=I-*Js(i, j)^T*(Js\#(i, j))^T$) in the above expression 02a by the above matrix Nuw(i, j) ($=I-wc(i, j)*Js(i, j)^T*(Js\#(1, j))$), which is defined by adding the weight coefficient wc(i, j).

According to the third aspect of the invention, in the case of setting the values of the weight coefficients wc(i, j) corresponding to all control inputs classified by state quantity τ(i, j) (j=1, 2, ..., m(i)), which are to be composition components of the i-th control input classified by frequency region W(i)*τf(i) to one, expression 02b coincides with the above expression 02a. Therefore, in the i-th frequency region (specific frequency region) satisfying m(i)>1, the i-th control input classified by frequency region can be determined assuming that the m(i) control inputs classified by state quantity τ(i,1) to τ(i,m(i)) are synthesized in a mutually non-interfering manner similarly to the second aspect of the invention.

Moreover, if the weight coefficient wc(i, j) by which one of the (i, j)-th control inputs classified by state quantity τ(i, j) is multiplied is set to zero in one of the i-th frequency regions, the i-th control input classified by the frequency region W(i)*τf(i) corresponding to the i-th frequency region is not dependent on the (i, j)-th control input classified by state quantity τ(i, j) and the Jacobian Js(i, j) corresponding to the (i, j)-th control input classified by state quantity τ(i, j). Therefore, the state quantity corresponding to the (i, j)-th control input classified by state quantity τ(i, j) is substantially removed from the controlled objects in the i-th frequency region.

Furthermore, if the weight coefficient wc(i, j) corresponding to one of the (i, j)-th control inputs classified by state quantity τ(i, j) is set so as to increase or decrease continuously within the range between zero and one in one of the i-th frequency regions, the degree of dependence of the i-th control input classified by frequency region W(i)*τf(i) corresponding to the i-th frequency region on the (i, j)-th control input classified by state quantity τ(i, j) continuously changes. For example, as the value of the weight coefficient wc(i, j) is continuously decreased from one to zero, the i-th control input classified by frequency region W(i)*τf(i) continuously decreases in the degree of dependence on the (i, j)-th control input classified by state quantity τ(i, j).

Therefore, one or both of the type and number of state quantities of the controlled objects in each frequency region can be appropriately changed according to the setting change of the value of the weight coefficient wc(i,j). Furthermore, by continuously increasing or decreasing the value of the weight coefficient wc(i, j) at the time of change, the i-th control input classified by frequency region W(i)*τf(i) can be continuously changed. By extension, the synthesized control input τtotal can be determined so as not to change in a discontinuous manner (so as to change continuously).

In this case, for example, in the case of removing a certain state quantity from controlled objects in each frequency region, the value of the weight coefficient wc(i, j) by which the control input classified by state quantity τ(i,j) corresponding to the state quantity is multiplied may be set so as to decrease continuously from one to zero. In contrast, in the case of returning the state quantity, which has been removed from the controlled objects, to the controlled objects in each frequency region, the value of the weight coefficient wc(i, j) by which the control input classified by state quantity τ(i, j) corresponding to the state quantity is multiplied is set so as to increase continuously from zero to one.

Furthermore, in the case of removing a certain state quantity from the controlled objects and further adding another type of state quantity to the controlled objects in each frequency region, in other words, in the case of changing the type of the state quantity to be controlled, the value of the weight coefficient wc(i, j) by which the control input classified by state quantity τ(i, j) corresponding to the state quantity to be removed from the controlled objects is multiplied is decreased continuously from one to zero, and further the value of the weight coefficient wc(i, j) by which the control input classified by state quantity τ(i, j) corresponding to another type of state quantity to be added to the controlled objects is multiplied is increased continuously from zero to one.

As can be seen from the above description, according to the third aspect of the invention, it is possible to properly determine the synthesized control input, which is capable of achieving the advantageous effect of the first aspect of the invention, while continuously changing the synthesized control input. Moreover, by variably setting the value of the weight coefficient wc(i, j) according to the operating conditions or the like of the robot for each frequency region, the type or number of state quantities to be controlled can be properly changed according to the operating conditions or the like of the robot. Further, in this case, it is possible to continuously change the control inputs classified by frequency region W(i)*τf(i) corresponding to the frequency region in which the type or number of state quantities to be controlled is changed, and therefore the synthesized control input can be determined so as not to change in a discontinuous manner. By extension, the operation of the robot can be smoothly performed.

In the third aspect of the invention as described above, for example, in the case where the robot makes motions including an operation of causing a predetermined area (for example, the distal end of a leg or an arm) thereof to come in contact with a portion to be contacted in an external world of the robot and an operation of moving away from the portion to be contacted and where the plurality of types of state quantities include the motion state quantity of the predetermined area with the predetermined area of the robot being away from the portion to be contacted as a controlled object in at least one frequency region out of the plurality of frequency regions, the following form is able to be employed.

Specifically, assuming that an ia-th frequency region is a frequency region in which the motion state quantity of the predetermined area is included as a controlled object and an (ia, ja)-th control input classified by state quantity τ(ia, ja) is a control input classified by state quantity corresponding to the motion state quantity of the predetermined area out of the control inputs classified by state quantity to be composition components of the ia-th control input classified by frequency region (W(ia)*τf(i)) corresponding to the ia-th frequency region, the value of the weight coefficient wc(ia, ja) corresponding to τ(ia, ja) is set so as to be maintained at zero in a period in which the predetermined area is in contact with the portion to be contacted, and the value of the weight coefficient wc(ia, ja) is set so as to continuously increase from zero to one and thereafter to continuously decrease from one to zero in a period in which the predetermined area is away from the portion to be contacted (a fourth aspect of the invention).

According to the fourth aspect of the invention, the value of the weight coefficient wc(ia, ja) is maintained at zero in the period in which the predetermined area is in contact with the portion to be contacted.

Here, in the period, the predetermined area is in contact with the portion to be contacted, and therefore the contact constrains the motion of the predetermined area. Further, if the motion state quantity of the predetermined area (for example, the position, the posture, the temporal change rate, the acceleration, etc. of the predetermined area) is forcibly controlled to a desired target value in the above situation, an excess driving force of the actuator might be required in the case of an occurrence of a difference between an actual value of the motion state quantity and the target value thereof.

Therefore, in the fourth aspect of the invention, the value of the weight coefficient wc(ia, ja) is maintained at zero in the period in which the predetermined area is in contact with the portion to be contacted. Thereby, in the period, the motion state quantity of the predetermined area is substantially removed from the controlled objects in the ia-th frequency region.

On the other hand, in the period in which the predetermined area is away from the portion to be contacted, the value of the weight coefficient wc(ia,ja) is set so as to continuously increase from zero to one and thereafter to continuously decrease from one to zero. Therefore, in the period, the motion state quantity of the predetermined area is included in the controlled objects in the ia-th frequency region. In this case, the predetermined area is away from the portion to be contacted and thus is not subjected to constraint involved with a contact with the external world. Therefore, the motion state quantity of the predetermined area in the ia-th frequency region in the period can be smoothly controlled to a desired target value.

Furthermore, in this case, the value of the weight coefficient wc(ia, ja) is set so as to continuously increase from zero to one and then to continuously decrease from one to zero. Therefore, within the period in which the predetermined area is away from the portion to be contacted, the ia-th control inputs classified by frequency region $W(ia)*\tau f(ia)$ can be smoothly and continuously changed. Consequently, the operation of the robot can be smoothly performed without discontinuous change in the synthesized control input.

In the second to fourth aspects of the invention, the frequency weight $W(i)$ (i=1, 2, ..., n) may be a frequency weight expressed by a transfer function, for example, in the following expression 03 (a fifth aspect of the invention).

[MATH. 5]

$$W(i) = \frac{1}{T(i)*s+1} *(1-W(i+1)) \quad \text{Expression 03}$$

where
s: a Laplace transform operator;
$T(i)$ (i=1, 2, ..., n): a time constant set so as to satisfy $T(1)<T(2)<...<T(n)$; and
$W(n+1)\equiv 0$.

According to the fifth aspect of the invention, among n frequency weights $W(1)$ to $W(n)$, $W(n)$ is a frequency weight having a low-pass characteristic, and other frequency weights $W(1)$ to $W(n-1)$ are those each having a band-pass characteristic. In this case, regarding $W(1)$ to $W(n)$, the smaller (the closer to one) the number i (i=1, 2, ..., n) is, the higher the passable frequency region is.

Further, the frequency weights $W(1)$ to $W(n)$ enable the separation of a frequency region equal to or lower than the cutoff frequency defined by a time constant $T(1)$ without a break. Therefore, a desired control characteristic of the robot can be easily achieved in a frequency region equal to or lower than the cutoff frequency defined by the time constant $T(1)$.

Moreover, in the second aspect of the invention, preferably the control inputs classified by state quantity $\tau(i, j)$ (j=1, 2, ..., m(i)), whose number m(i) satisfies m(i)>1 and which are determined as composition components of the i-th control input classified by frequency region $W(i)*\tau f(i)$, are control inputs classified by state quantity selected out of the M control inputs classified by state quantity corresponding to the plurality of types of state quantities such that the m(i) matrices Nu(i, j) (j=1, 2, ..., m(i)) used for calculating the expression 2a satisfy a relationship expressed by rank(Nu(i, 1))≥rank(Nu(i, 2))≥ ... ≥rank(Nu(i, m(i))) (a sixth aspect of the invention).

Similarly, in the third aspect of the invention, preferably the control inputs classified by state quantity $\tau(i, j)$ (j=1, 2, ..., m(i)), whose number m(i) satisfies m(i)>1 and which are determined as composition components of the i-th control input classified by frequency region $W(i)*\tau f(i)$, are control inputs classified by state quantity selected out of the M control inputs classified by state quantity corresponding to the plurality of types of state quantities such that the m(i) matrices Nuw(i, j) (j=1, 2, ..., m(i)) used for calculating the expression 2b satisfy a relationship expressed by rank(Nuw(i, 1))≥rank(Nuw(i, 2))≥ ... ≥rank(Nuw(i, m(i))) (a seventh aspect of the invention).

In addition, rank(Nu(i, j)) is the rank of the matrix Nu(i, j), and rank(Nuw(i, j)) is the rank of the matrix Nuw(i, j).

In this condition, in the sixth aspect of the invention, the control inputs classified by state quantity $\tau(i, j)$(j=1, 2, ..., m(i)), whose number m(i) satisfies m(i)>1 and which are determined as composition components of the i-th control input classified by frequency region $W(i)*\tau f(i)$, are control inputs classified by state quantity selected out of the M control inputs classified by state quantity corresponding to the plurality of types of state quantities so as to satisfy a relationship expressed by rank(Nu(i, 1))≥rank(Nu(i, 2))≥ ... ≥rank (Nu(i, m(i))).

Moreover, in the seventh aspect of the invention, the control inputs classified by state quantity $\tau(i, j)$ (j=1, 2, ..., m(i)), whose number m(i) satisfies m(i)>1 and which are determined as composition components of the i-th control input classified by frequency region $W(i)*\tau f(i)$, are control inputs classified by state quantity selected out of the M control inputs classified by state quantity corresponding to the plurality of types of state quantities so as to satisfy a relationship expressed by rank(Nuw(i, 1))≥rank(Nuw(i, 2))≥ ... ≥rank (Nuw(i, m(i))).

Therefore, in both of the sixth and seventh aspects of the invention, regarding the number m(i) of the control inputs classified by state quantity composing the i-th control input classified by frequency region $W(i)*\tau f(i)$, it is possible to increase the number m(i) of control inputs classified by state quantity capable of being synthesized in a mutually non-interfering manner according to the above expression 02a or 02b as much as possible.

As a result, the number of types of state quantities controllable in the i-th frequency region (the number of types of state quantities selectable as controlled objects in the i-th frequency region) can be increased. This enables the operation of the robot in the i-th frequency region to be controlled so as to satisfy various demands.

In addition, the sixth aspect of the invention may be combined with the fifth aspect of the invention. Moreover, the seventh aspect of the invention may be combined with the fourth or fifth aspect of the invention.

BRIEF DESCRIPTION OF THE DRAWINGS

FIG. 4 is a block diagram illustrating the functions of a target joint drive torque determining section illustrated in FIG. 3;

FIG. 5(a) to FIG. 5(c) are diagrams for describing the processing of a contact area Jacobian determining section illustrated in FIG. 4;

FIG. 6 is a block diagram illustrating the functions in a second embodiment of the target joint drive torque determining section illustrated in FIG. 3;

MODE FOR CARRYING OUT THE INVENTION

First Embodiment

The following describes a first embodiment of the present invention with reference to FIG. 1 to FIG. 5.

Figure 1:
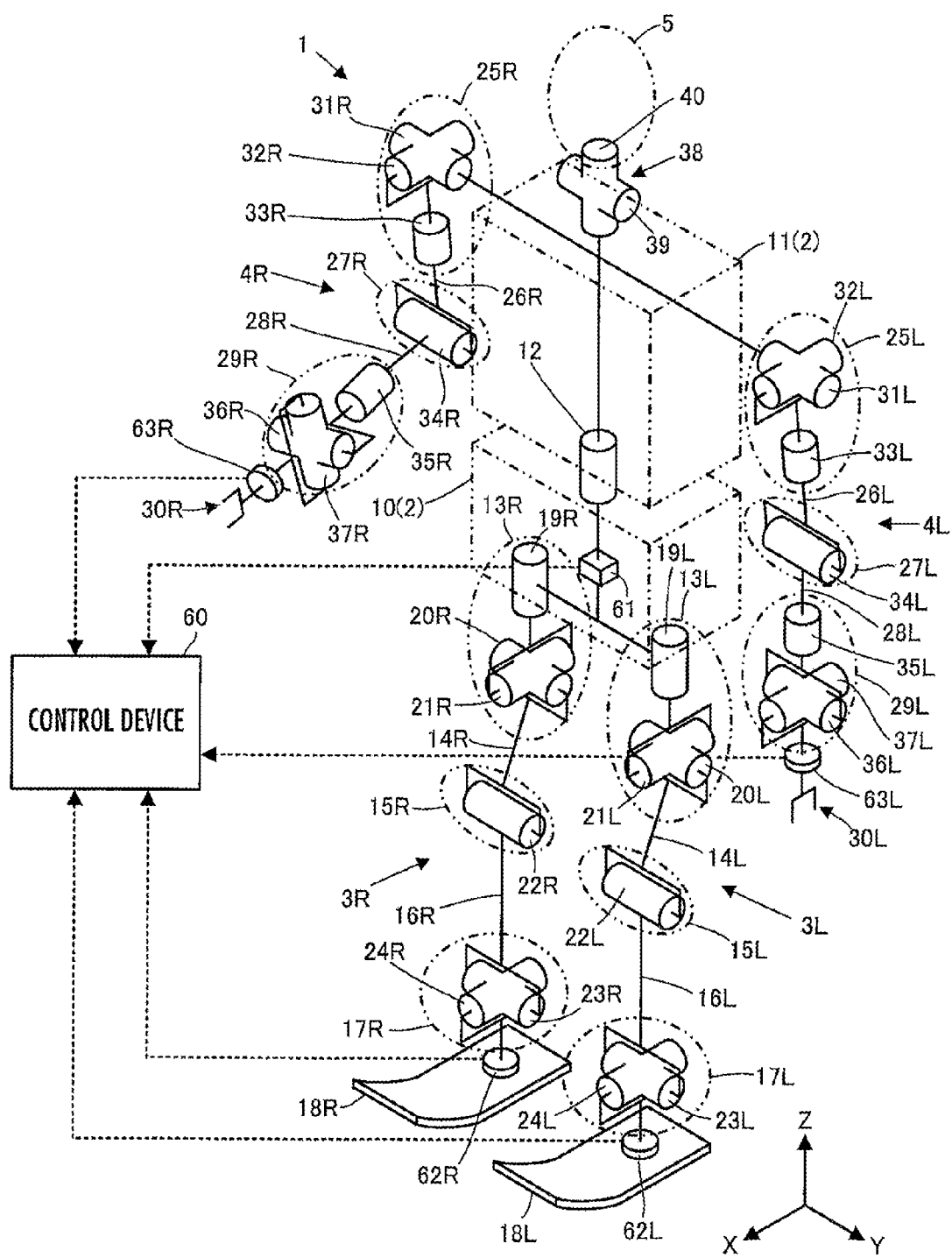
FIG. 1 is a schematic diagram illustrating a skeleton framework of a robot to which first and second embodiments of the present invention is applied.

FIG. 1 schematically illustrates the skeleton framework of a robot illustrated in the present embodiment. This robot 1 is a bipedal mobile robot as a legged mobile robot. The robot 1 is roughly composed of a body link 2, a pair of right and left leg links 3R, 3L, a pair of right and left arm links 4R, 4L, and a head 5.

In the present description, a member on the right side observed facing to the front of the robot 1 or a variable indicating a quantity associated with the member is suffixed by a character "R," while a member on the left side observed facing to the front of the robot 1 or a variable indicating a quantity associated with the member is suffixed by a character "L." The characters "R" and "L," however, may be omitted unless it is particularly necessary to distinguish between the right side and the left side.

The body link 2 is composed of a lower body 10, which provides the base body of the robot 1, and an upper body 11, which is disposed above the lower body 10. The upper body 11 is connected to the lower body 10 through a body rotating joint 12, which has a degree of freedom of rotation about a yaw axis (about a Z axis).

The pair of right and left leg links 3R and 3L share the same construction. To be more specific, each leg link 3 is provided with a thigh 14 connected to the lower body 10 through a hip joint 13, a crus 16 connected to the thigh 14 through a knee joint 15, and a foot 18 connected to the crus 16 through an ankle joint 17 as a plurality of links constituting the leg link 3.

In this case, the hip joint 13 is composed of three joints 19, 20, and 21, which have the degrees of freedom of rotation about the yaw axis, about a pitch axis (about a Y axis), and about a roll axis (an X axis), respectively. The knee joint 15 is composed of a joint 22 having a degree of freedom of rotation about the pitch axis. The ankle joint 17 is composed of two joints 23 and 24 having the degrees of freedom of rotation about the pitch axis and the roll axis, respectively. Thus, each leg link 3 in the present embodiment has six degrees of freedom of motion relative to the lower body 10. Incidentally, the rotational axes (the roll axis, the pitch axis, and the yaw axis) of the joints 19 to 24 of each leg link 3 in the above description indicate the rotational axes in a state where the leg link 3 is stretched in the vertical direction.

The pair of right and left arm links 4R and 4L share the same construction. To be more specific, each arm link 4 is provided with an upper arm 26 connected to the upper body 11 through a shoulder joint 25, a forearm 28 connected to the upper arm 26 through an elbow joint 27, and a hand 30 connected to the forearm 28 through a wrist joint 29 as a plurality of links constituting the arm link 4.

In this case, the shoulder joint 25 is composed of three joints 31, 32, and 33 having the degrees of freedom of rotation about the pitch axis, about the roll axis, and about the yaw axis, respectively. The elbow joint 27 is composed of a joint 34 having a degree of freedom of rotation about the pitch axis. The wrist joint 29 is composed of three joints 35, 36, and 37 having the degrees of freedom of rotation about the yaw axis, about the pitch axis, and about the roll axis, respectively. Thus, each arm link 4 in the present embodiment has seven degrees of freedom of motion relative to the upper body 11. Incidentally, the rotational axes (the roll axis, the pitch axis, and the yaw axis) of the joints 31 to 37 of each arm link 4 in the above description indicate the rotational axes in a state where the arm links 4 are stretched in the vertical direction.

The head 5 is disposed above the upper body 11 and connected to the upper body 11 through a neck joint 38. In this case, the neck joint 38 is composed of two joints 39 and 40 having the degrees of freedom of rotation about the pitch axis and about the yaw axis, respectively. Hence, the head 5 has two degrees of freedom of motion relative to the upper body 11. Incidentally, the rotational axes (the pitch axis and the yaw axis) of the joints 31 and 37 indicate the rotational axes in a state where the neck joint 38 is stretched in the vertical direction.

The robot 1 constructed as described above implements spatial motions of the leg links 3 by driving the six joints 19 to 24 of each leg link 3, thus enabling the robot 1 to move on a floor. For example, moving the leg links 3R and 3L in modes (gaits) similar to a human walking or running motion enables the robot 1 to walk or run. In this case, each link of the robot 1 has six degrees of freedom for the spatial position and posture (spatial orientation) thereof.

Further, the seven joints 31 to 37 of each arm link 4 are driven to cause each arm link 4 to perform spatial motions, thus enabling a hand 30 of each arm link 4 to carry out work, such as touching an appropriate object.

In the present embodiment, the lower body 10 and the upper body 11, which constitute the body link 2, are connected through the joint 12, and therefore the body link 2 can be twisted by driving the joint 12.

Further, the head 5 can be tilted (a rotational motion about the pitch axis) or panned (a rotational operation about the yaw axis) by driving the joints 39 and 40 of the neck joint 38.

Supplementarily, the robot 1 in the present embodiment is a humanoid robot having the arm links 4R, 4L and the head 5. Alternatively, however, the robot 1 may be a robot without the arm links 4R, 4L or the head 5. Further alternatively, the joint 12 of the body link 2 may be omitted, thus combining the lower body 10 and the upper body 11 into one body. Moreover, the robot 1 may be provided with not only rotary joints, but also direct-acting joints.

Although not specifically illustrated in FIG. 1, the robot 1 has a joint drive system (a mechanism for driving the joints), including electric motors serving as actuators that output motive power for rotatively driving the aforesaid joints. According to the present embodiment, in order to impart flexibility to each joint, a motive power transmitting system between each joint and an electric motor is provided with a spring member that converts the motive power of the electric motor into elastic force and imparts the elastic force to a driven member of the joint as described below.

Figure 2:
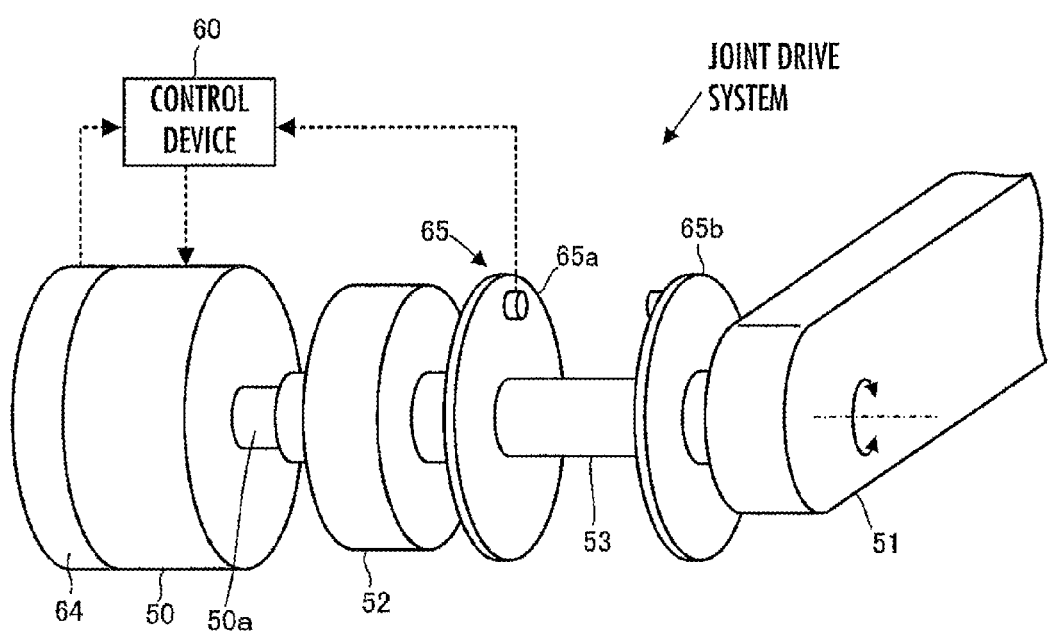
FIG. 2 is a schematic diagram illustrating a skeleton framework of a joint drive system provided in the robot illustrated in FIG. 1.

FIG. 2 schematically illustrates the skeleton framework of the joint drive system of each joint. The joint drive system includes a reduction gear unit 52, which is composed of a harmonic drive gear or the like, and a torsion bar 53, which is a spring member, as the motive power transmitting element between an electric motor 50 and a driven member 51 of the joint (hereinafter referred to as the joint driven portion 51). Further, an output shaft 50a of the electric motor 50 is connected to the joint driven portion 51 through the intermediary of the reduction gear unit 52 and the torsion bar 53 in this order. Thus, the joint drive system is constructed such that the motive power (torque) output from the electric motor 50 is transmitted to the joint driven portion 51 via the reduction gear unit 52 and the torsion bar 53 in order. In this case, the motive power (torque) output from the electric motor 50 is converted into an elastic force (torsional force) by the torsion bar 53, and the elastic force is imparted as a drive torque to the joint driven portion 51.

Supplementarily, the torsion bar 53 (spring member) here generically represents an elastic member added between the reduction gear unit 52 and the joint driven portion 51 or an elastic member originally placed in the motive power transmitting system between the electric motor 50 and the joint driven portion 51. For this reason, if the reduction gear unit 52 originally has an elastic member in an output stage thereof, as in the harmonic drive gear, such as Harmonic Drive (registered trademark), then the elastic member is also included in the torsion bar 53 (spring member).

The joint driven member 51 is one of a pair of members relatively and rotatively connected to each other by the joint having the pair of members. For example, in the joint drive system that drives the joint 22 of the knee joint 15, one of the links of the thigh 14 and the crus 16 is the joint driven portion 51, while the housings of the electric motor 50 and the reduction gear unit 52 are secured to the other link.

As described above, according to the present embodiment, the joint drive system is provided with the torsion bar 53 serving as a spring member, thereby enabling flexible operations of each joint.

In the present embodiment, there is provided a control device 60 composed of an electronic circuit unit, which includes a CPU, a RAM, a ROM and the like, and a variety of sensors to control the operations of the robot 1 having the structure described above.

In this case, as illustrated in FIG. 1, the sensors include a posture sensor 61 mounted on the lower body 10 to measure the angular velocity, the posture angle (the inclination angle relative to the vertical direction and the azimuth about the yaw axis) and the like of the lower body 10, which is the base body of the robot 1, force sensors 62 (62R and 62L), each of which is interposed between the ankle joint 24 and the foot 18 of each leg link 3 to measure an external force (floor reaction force) applied to each foot 18 at the time of coming in contact with the ground, and force sensors 63 (63R and 63L), each of which is interposed between the wrist joint 29 and the hand 30 of each arm link 4 to measure an external force applied to each hand 30 from an object with which the hand 30 comes in contact.

The aforesaid posture sensor 61 is composed of, for example, a gyro sensor which detects angular velocities about three axes and an acceleration sensor which detects the accelerations in the directions of three axes. Each of the force sensors 62 and 63 is composed of, for example, a six-axis force sensor which detects the translational forces in the directions of the three axes and moments about the three axes, respectively. The acceleration sensor constituting the posture sensor 61 is used also to measure the moving velocity of the lower body 10.

Further, according to the present embodiment, as illustrated in FIG. 2, the joint drive system for each joint is provided with a rotary encoder 64 serving as an angle sensor for detecting the rotational angle of the output shaft 50a of the electric motor 50 (the rotational angle of a rotor) and a differential encoder 65 serving as an angle sensor which detects the rotational angle difference between both ends of the torsion bar 53.

The differential encoder 65 in the present embodiment is a sensor which has a pair of discs 65a and 65b secured to both ends of the torsion bar 53 and outputs a signal based on a relative rotational angle of one of the discs 65a and 65b relative to the other as a signal based on a rotational angle difference between both ends of the torsion bar 53.

The rotary encoder 64 and the differential encoder 65 are sensors used to measure the rotational angle of the output shaft 50a of the electric motor 50 (or the rotational angle of one end of the torsion bar 53 on the side of the reduction gear unit 52 (=the rotational angle of the output shaft of the reduction gear unit 52)) and the temporal change rate (rotational angular velocity) thereof, the rotational angle of the joint driven portion 51 and the temporal change rate (rotational angular velocity) thereof, and the rotational angle difference between both ends of the torsion bar 53 (=the torsional angle of the torsion bar 53).

In place of the differential encoder 65, an angle sensor, such as a rotary encoder which detects the rotational angle of the joint driven portion 51, may be used. Further, in place of the rotary encoder 64, an angle sensor, such as a rotary encoder which detects the rotational angle of the output shaft of the reduction gear unit 52 may be used.

In the following description, the rotational angle of the joint driven portion 51 of each joint of the robot 1 may be referred to as the rotational angle of a joint or a joint angle.

The control device 60 receives detection outputs of the aforesaid sensors (or filtering values obtained by passing the detection outputs through appropriate filters). The control device 60 then uses required measurement values (e.g., the measurement value of the posture angle of the lower body 10 and the temporal change rate (angular velocity) thereof, the measurement value of the moving velocity of the lower body 10, the measurement value of an external force acing on each of the feet 18 or the hands 30, and the measurement values of the rotational angle of each joint and the temporal change rate (angular velocity) thereof recognized from the input values of the received detection outputs so as to determine the target value of the drive torque to be imparted to the joint driven portion 51 of each joint in order to cause the robot 1 to perform a target motion (hereinafter the target value of the drive torque is referred to as the target joint drive torque). The control device 60 also carries out processing for controlling the output torque of the electric motor 50 of each joint drive system on the basis of the target joint drive torque.

Figure 3:
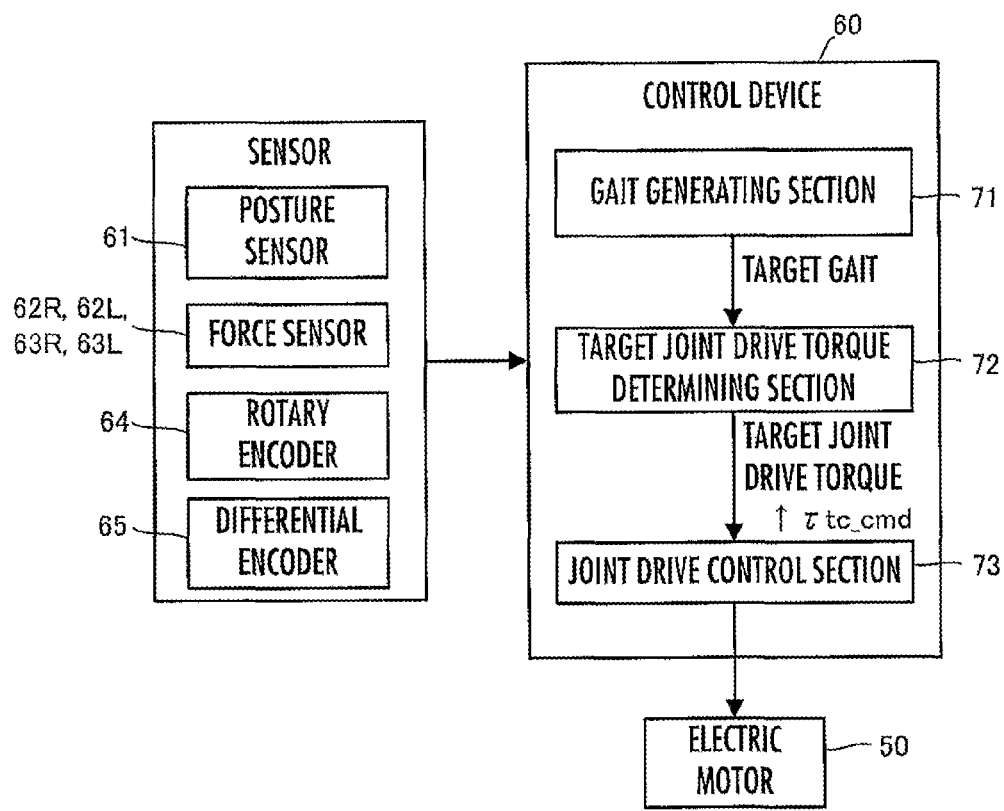
FIG. 3 is a block diagram illustrating major functions of a control device of the robot illustrated in FIG. 1.

The following describes in detail the control processing carried out by the control device 60. In the present embodiment, the description is made by giving an example of the control processing in the case where the target motion of the robot 1 is a motion for moving on a floor by walking As illustrated in FIG. 3, the control device 60 has a gait generating section 71, a target joint drive torque determining section 72, and a joint drive control section 73 as its major sections for implementing functions by running an installed program or the like.

The gait generating section 71 is a functional section that carries out processing for generating a target gait including at least a target motion of the robot 1. The target motion generated by the gait generating section 71 includes the time series of a target joint angle, which indicates a target value of the displacement amount (rotational angle) of each joint of the robot 1 and the time series of a target position of the overall center-of-gravity point of the robot 1 (hereinafter referred to as the target overall center-of-gravity point in some cases).

The aforesaid target motion is generated by using, for example, the gait generating technique proposed by the applicant of the present application in the Patent Document 1 or the like.

The gait generating technique will be schematically described. The expected landing position, the expected landing posture, and expected landing time aimed by each of both feet 18R and 18L of the robot 1 are determined on the basis of the floor geometry information of an operating environment of the robot 1 and the requirements on the moving direction of the robot 1.

Based on the expected landing position, the expected landing posture, and the expected landing time, a foot position/posture trajectory, which is the trajectory (a time series pattern) of a target position and a target posture of each foot 18, is determined. Further, based on the foot position/posture trajectory, a target ZMP trajectory, which is the trajectory of a target position of zero moment point (ZMP) (hereinafter referred to as the target ZMP in some cases), is determined.

Further, the trajectories of target positions and target postures of links (the body link 2 and the like) other than the two leg links 3R and 3L of the robot 1 are determined such that the stability of the robot 1 in the future will be secured while at the same time satisfying a dynamic balance condition that the horizontal component of a moment generated about a target ZMP by the resultant force of the inertial force generated due to a motion of the entire robot 1 and the gravity acting on the robot 1 becomes zero.

Then, based on the target positions and the target postures, the target joint angles of individual joints are determined by using a geometric model (a rigid link model) of the robot 1.

The target gait may not necessarily be generated in real time while the robot 1 is actually in motion. Alternatively, a target gait prepared beforehand (off-line) may be input to the control device 60 from outside by means of wireless communication or the like or may be stored and retained beforehand in a storage device, which is not shown, of the robot 1. In this case, the gait generating section 71 is unnecessary.

A target gait may include a target value of a particular component (e.g., a vertical component of a translational force) of an overall floor reaction force (total floor reaction force) acting on one or both of feet 18R and 18L or the target position of the acting point of the total floor reaction force (i.e., the target ZMP), in addition to a target motion of the robot 1. In the present embodiment, a target gait output from the gait generating section 71 includes a target ZMP.

The target joint drive torque determining section 72 is a functional section which sequentially carries out processing for determining a target joint drive torque of each joint for accomplishing the aforesaid target motion generated by the gait generating section 71 (for making the actual motion of the robot 1 follow the target motion). The target joint drive torque determining section 72 is a functional section that carries out core processing related to the present invention, which will be described in detail later.

The joint drive control section 73 is a functional section which sequentially carries out processing for controlling the output torque of the electric motor 50 of each joint drive system so as to achieve a target joint drive torque (specifically, a target joint drive torque of each joint defined by a corrected target joint drive torque $\uparrow \tau tc\_cmd$, which will be described later) of each joint sequentially determined by the target joint drive torque determining section 72 (so as to cause the drive torque actually imparted to the joint driven portion 51 of each joint to follow a target joint drive torque).

The joint drive control section 73 controls the output torque of the electric motor 50, for example, as described below. The joint drive control section 73 sequentially estimates an elastic force torque actually generated by the torsion bar 53 (the drive torque actually imparted from the torsion bar 53 to the joint driven portion 51) on the basis of a measurement value of the rotational angle difference between both ends of the torsion bar 53 (the torsional angle of the torsion bar 53). Further, the joint drive control section 73 sequentially sets the target rotational angular velocity of the output shaft 50a of the electric motor 50 such that the difference between the estimated value of the elastic force torque and the target joint drive torque is converged to zero.

Subsequently, the joint drive control section 73 determines the target output torque of the electric motor 50 such that the difference between the target rotational angular velocity and the measurement value of the rotational angular velocity of the output shaft 50a of the electric motor 50 is converged to zero. Then, the joint drive control section 73 converts the target output torque into a target value of energizing current of the electric motor 50, and the actual energizing current is subjected to feedback control based on the target value, thereby controlling the actual output torque of the electric motor 50 to the target output torque.

In the control processing by the joint drive control section 73, the output torque of the electric motor 50 may be controlled while compensating for the influences of vibrations of the torsion bar 53 or compensating for the influences of an external force acting on the joint driven portion 51.

The following describes, in detail, the processing to be performed by the target joint drive torque determining section 72, the description thereof had been postponed.

In the following description, a vector (a column of a plurality of components) will be denoted by adding "$\uparrow$" to the beginning of a variable name like, for example, "$\uparrow A$." Unless otherwise specified, a vector is a longitudinal vector in which components are longitudinally arranged (column vector). In the present specification, "*" is used as a multiplication sign.

As illustrated in FIG. 4, the target joint drive torque determining section 72 is provided with, as its major functions, a basic parameter group determining section 81, a contact area Jacobian determining section 82, a state quantity Jacobian determining section 83, a state quantity target value determining section 84, a section for determining control inputs classified by state quantity 85, a synthesized control input determining section 86, a compliance control section 87, and a contact region elastic deformation compensation section. FIG. 4 illustrates major outputs of the functional sections and the destinations to which the major outputs are input.

The target joint drive torque determining section 72 sequentially carries out the processing by the functional sections at a predetermined arithmetic processing cycle, thereby sequentially determining the target joint drive torque of each joint.

Describing this processing below, the target joint drive torque determining section 72 first carries out the processing by the basic parameter group determining section 81, the processing by the contact area Jacobian determining section 82, the processing by the state quantity Jacobian determining section 83, and the processing by the state quantity target value determining section 84.

The basic parameter group determining section 81 is a functional section which sequentially carries out processing for calculating a parameter of a robot motion model, which is a model representing the relationship (motion equation) between a motion of the robot 1 and a force.

Here, the robot motion model is represented by the following expression 1-1 if an external force (a floor reaction force or the like) acting on the robot 1 from an external world is zero.

$$M*\uparrow q''+\uparrow N+\uparrow G=\uparrow \tau \qquad \text{Expression 1-1}$$

$\uparrow q''$ in this expression 1-1 denotes a second-order differential value of a generalized variable vector $\uparrow q$ of the robot 1 ($=d^2Tq/dt^2$), M denotes an inertia matrix, $\uparrow N$ denotes a centrifugal force/Coriolis force-dependent generalized force vector, $\uparrow G$ denotes a gravity-dependent generalized force vector, and $\uparrow \tau$ denotes a driving force-dependent generalized force vector.

The aforesaid generalized variable vector $\uparrow q$ in the present embodiment is a vector composed of a sequence of components, namely, the position and the posture (the position and the posture observed in a global coordinate system) of a single representative link of the robot 1 previously determined and the displacement amount (rotational angle) of each joint. The aforesaid representative link in the present embodiment is the lower body 10 serving as the base body of the robot 1. Hereinafter, the lower body 10 will be referred to as the representative link 10 in some cases.

Here, in the description of the present embodiment, the term "position" of each link, including the representative link 10 of the robot 1, more specifically means the position in the global coordinate system of a representative point fixedly set relative to the link. In addition, the term "posture" of each link more specifically means the spatial orientation of the link observed in the global coordinate system (the orientation expressed in terms of the dimension of angle) (In the following description, the posture is referred to as the posture angle in some cases).

The aforesaid global coordinate system is an inertial coordinate system (including a coordinate system that can be approximately regarded as an inertial system), such as a coordinate system secured to a floor (including the ground surface) in an environment in which the robot 1 moves.

Further, each of the position and the posture (posture angle) of each link has three degrees of freedom in the present embodiment, and therefore each of them is expressed by means of three coordinate components. Hence, the number of the components of the generalized variable vector $\uparrow q$ (i.e., the degree of freedom of $\uparrow q$) in the present embodiment is the total sum of the total degree of freedom of the position and the posture of the representative link 10 (=6) and the total degree of freedom of all joints of the robot 1. In the robot 1 of the present embodiment illustrated in FIG. 1, the total degree of freedom of all joints is 29. Therefore, the degree of freedom of $\uparrow q$ is 35.

The aforementioned inertia matrix M is a matrix (symmetric matrix) for converting the second-order differential value $\uparrow q''$ of the generalized variable vector $\uparrow q$ into a generalized force vector, i.e., a matrix in which the component value of a vector obtained by multiplying the inertia matrix by $\uparrow q''$ ($=M*\uparrow q''$) becomes a value having the dimension of a force corresponding to each component of $\uparrow q''$ (a translational force or a moment).

Here, each component of $\uparrow q$ is a position, a posture angle, or a rotational angle, and therefore each component of $\uparrow q''$ has the dimension of a translational acceleration or an angular acceleration. Therefore, each component value of a vector obtained by reversing the sign of $M*\uparrow q''$ ($-M*\uparrow q''$) means the inertial force generated by a motion of the robot 1. In this case, in the vector ($-M*\uparrow q''$), the inertial force of a component corresponding to the second-order differential value (translational acceleration) of the position of the representative link 10 is a translational inertial force (an inertial force turning into a translational force). The inertial force of a component corresponding to the second-order differential value (angular acceleration) of the posture of the representative link 10 and the inertial force of the component corresponding to the second-order differential value of the rotational angle (angular acceleration) of each joint are inertial force moments (inertial forces turning into moments).

The inverse matrix $M^{-1}$ of the inertia matrix M is a diagonal matrix.

The generalized force vector is a vector whose components correspond to the components of the generalized variable vector $\uparrow q$ (a vector composed of the same number of components as that of $\uparrow q$). More specifically, the generalized force vector is a vector whose each component provides a force (a translational force or a moment) that causes a change (acceleration) in a component value of IA corresponding thereto. In this case, each component of the generalized force vector is a force of the same type as that of the inertial force based on the second-order differential value of a component of IA corresponding thereto.

The centrifugal force/Coriolis force-dependent generalized force vector $\uparrow N$ is a generalized force vector generated by a centrifugal force and a Coriolis force acting on each link of the robot 1. Further, the gravity-dependent generalized force vector $\uparrow G$ is a generalized force vector generated by the gravity acting on each link of the robot 1. In the following description, the sum of $\uparrow N$ and $\uparrow G$ ($=\uparrow N+\uparrow G$) is referred to as the nonlinear term generalized force vector in some cases.

The driving force-dependent generalized force vector $\uparrow \tau$ is a generalized force vector generated by a driving force of the actuator (the electric motor 50 in the present embodiment) that drives each joint of the robot 1. In the robot 1 according to the present embodiment, the values of the components corresponding to the position and the posture of the representative link 10 in the driving force-dependent generalized force vector $\uparrow \tau$ are always zero. Further, in the $\uparrow \tau$, the value of the component corresponding to the rotational angle of each joint means the drive torque to be imparted to the joint (hereinafter, the drive torque is referred to as the joint drive torque in some cases).

The parameters calculated by the basic parameter group determining section 81 include the inertia matrix M, the centrifugal force/Coriolis force-dependent generalized force vector $\uparrow N$, and the gravity-dependent generalized force vector $\uparrow G$ (or the nonlinear term generalized force vector ($\uparrow N+\uparrow G$)) in expression 1-1.

Supplementarily, if an external force ($\neq 0$), such as a floor reaction force, acts on the robot 1, then the robot motion model is represented by an expression obtained by adding the term of the generalized force vector depending on the external force (external force term) to expression 1-1 (expression 5-1 described later). However, the aforesaid M, $\uparrow N$, and $\uparrow G$, which are the parameters calculated by the basic parameter group determining section 81 do not depend on the external force, and the values thereof depend on the motion state of the robot 1, such as the rotational angle and the temporal change rate (angular velocity) thereof of each joint of the robot 1. For this reason, the external force term is omitted in the aforesaid expression 1-1 for describing the basic parameter group determining section 81.

To calculate the parameters M, ↑N, and ↑G (or M and (↑N+↑G)), the basic parameter group determining section 81 sequentially receives the measurement value of the moving velocity of the representative link (the lower body) 10, the measurement value of the posture angle of the representative link 10 and the measurement value of the temporal change rate (angular velocity) thereof, and the measurement value of the rotational angle of each joint and the measurement value of the temporal change rate (angular velocity) thereof. These measurement values are the measurement values recognized by the control device 60 on the basis of the detection outputs of the posture sensor 61, the rotary encoder 64, and the differential encoder 65.

Further, the basic parameter group determining section 81 uses the input measurement values to sequentially calculate the parameters M, ↑N, and ↑G (or M and (↑N+↑G)) according to a publicly known method, such as the Recursive Newton Euler Algorithm (RNEA) or the unit vector method.

Supplementarily, there are some cases where the magnitude of a component value of ↑N becomes sufficiently minute in comparison with the magnitude of the corresponding component value of the gravity-dependent generalized force vector ↑G or becomes zero, which leads to ↑N+↑G↑≈G. In such a case, ↑N out of the ↑N and ↑G may be ignored (regarding that the nonlinear term generalized force vector (↑N+↑G) agrees with ↑G), and only ↑G may be calculated.

The aforesaid contact area Jacobian determining section 82 is a functional section which carries out processing for sequentially calculating Jacobian (hereinafter, referred to as the contact area Jacobian) that expresses the relationship between the motion speed of the representative point of a contact area in contact with the external world of the robot 1 (hereinafter, the representative point is referred to as the contact area representative point) and the first-order differential value (temporal change rate) of the generalized variable vector ↑q. In other words, the contact area Jacobian is a matrix that expresses the ratio (sensitivity) of a change in the spatial position of the contact area representative point with respect to a change (minute change) of each component value of the generalized variable vector ↑q.

Here, a target motion of the robot 1 described in the present embodiment is a motion for the robot 1 to perform a walking motion, as described above. In this case, the contact area (the ground contact area) of the robot 1 in contact with the external world changes with time. More specifically, the ground contact state of the robot 1 during a walking motion is such that a one-leg ground contact state in which only one of the feet 18R and 18L is a contact area, a two-leg ground contact state in which both feet are contact areas, and a one-leg ground contact state in which only the other one is a contact area are repeated in order. Hence, the position of the contact area representative point should change according to the ground contact states of the feet 18R and 18L.

Thus, the contact area Jacobian determining section 82 sequentially calculates the contact area Jacobian while sequentially determining the position (more accurately, the value of a parameter (the rate value r at, which is described later) that defines the position) of the contact area representative point of the robot 1 according to the ground contact state of the feet 18R and 18L. In this case, the position of the contact area representative point is determined such that the position does not discontinuously change (i.e., such that the position always continuously changes) at the time when the ground contact state of the feet 18R and 18L changes or the like.

The following specifically describes the processing by the contact area Jacobian determining section 82.

In the present embodiment, the contact area representative point is composed of a plurality of points and the number of the points is maintained to be constant in any one of the contact states of the feet 18R and 18L. More specifically, the contact area representative point is composed of four points a1, a2, a3, and a4 in any one of the ground contact states of the feet 18R and 18L, as indicated by the black dots in FIGS. 5(a) to 5(c). In FIGS. 5(a) to 5(c), one or both of the feet 18R and 18L in contact with the ground are indicated by solid lines, while the foot off the ground (moving in the air) is indicated by the two-dot chain line.

In this case, the positions of the four contact area representative points a1 to a4 are defined to be the positions based on the ground contact states of the feet 18R and 18L.

To be more specific, in the one-leg ground contact state in which the left foot 18L is in contact with the ground, while the right foot 18R is off the ground (the state where the left leg is in contact with the ground), four predetermined points a1L, a2L, a3L, and a4L set beforehand at predetermined positions on the bottom surface of the left foot 18L (the positions secured to the left foot 18L) are determined as the contact area representative points a1, a2, a3, and a4, respectively, as illustrated in FIG. 5(a).

The positions of the four predetermined points a1L to a4L in the present embodiment are the positions at four corners of the bottom surface of the left foot 18L. More specifically, the positions of the predetermined points a1L to a4L are the front left corner of the bottom surface of the left foot 18L, the front right corner thereof, the rear left corner thereof, and the rear right corner thereof, respectively, in order.

Further, in the one-leg ground contact state in which the right foot 18R is in contact with the ground, while the foot 18L of the left leg link 3L is off the ground (the state where the right leg is in contact with the ground), four predetermined points a1R, a2R, a3R, and a4R set beforehand at predetermined positions on the bottom surface of the right foot 18R (the positions secured to the right foot 18R) are determined as the contact area representative points a1, a2, a3, and a4, respectively, as illustrated in FIG. 5(c).

As with the four predetermined points a1L to a4L of the left foot 18L, the positions of the four predetermined points a1R to a4R are the positions of four corners of the bottom surface of the right foot 18R (the positions of the front left corner, the front right corner, the rear left corner, and the rear right corner).

The mutual positional relationship among the four predetermined points a1R to a4R of the right foot 18R is the same as the mutual positional relationship among the four predetermined points a1L to a4L of the left foot 18L.

In the two-leg ground contact state in which both feet 18R and 18L are in contact with the ground, the positions of the contact area representative points a1, a2, a3, and a4 are determined to be a position on a line segment connecting the predetermined points a1 R and a1L of both feet 18R and 18L, a position on a line segment connecting the predetermined points a2R and a2L, a position on a line segment connecting the predetermined points a3R and a3L, and a position on a line segment connecting the predetermined points a4R and a4L, respectively, in order, as illustrated in FIG. 5(b).

Here, in the following description, a line segment connecting arbitrary two points A and B is denoted by line segment A_B, and the length of the line segment A_B (line segment length) is denoted by L(A_B).

In this case, the positions of the contact area representative points a1 to a4 in the two-leg ground contact state are more specifically defined as described below.

The positions of the contact area representative points a1, a2, a3, and a4 are determined such that the ratio of a line segment length L(a1_a1L) to a line segment length L(a1R_a1L), i.e., L(a1_a1L)/L(a1R_a1L), the ratio of a line segment length L(a2_a2L) to a line segment length L(a2R_a2L), i.e., L(a2_a2L)/L(a2R_a2L), the ratio of a line segment length L(a3_a3L) to a line segment length L(a3R_a3L), i.e., L(a3_a3L)/L(a3R_a3L), and the ratio of a line segment length L(a4_a4L) to a line segment length L(a4R_a4L), i.e., L(a4_a4L)/L(a4R_a4L), present a mutually equal ratio value r at ($0 \leq r\ at \leq 1$) as indicated by expression 2-1a given below.

In other words, the positions of the contact area representative points a1, a2, a3, and a4 are determined such that the ratio of a line segment length L(a1_a1R) to a line segment length L(a1R_a1L), i.e., L(a1_a1R)/L(a1R_a1L), the ratio of a line segment length L(a2_a2R) to a line segment length L(a2R_a2L), i.e., L(a2_a2R)/L(a2R_a2L), the ratio of a line segment length L(a3_a3R) to a line segment length L(a3R_a3L), i.e., L(a3_a3R)/L(a3R_a3L), and the ratio of a line segment length L(a4_a4R) to a line segment length L(a4R_a4L), i.e., L(a4_a4R)/L(a4R_a4L), present a mutually equal ratio value (1−r at) as indicated by expression 2-1b given below.

$$L(a1\_a1L)/L(a1R\_a1L)=L(a2\_a2L)/L(a2R\_a2L)=L(a3\_a3L)/L(a3R\_a3L)=L(a4\_a4L)/L(a4R\_a4L)=r\ at \qquad \text{Expression 2-1a}$$

$$L(a1\_a1R)/L(a1R\_a1L)=L(a2\_a2R)/L(a2R\_a2L)=L(a3\_a3R)/L(a3R\_a3L)=L(a4\_a4R)/L(a4R\_a4L)=1-r\ at \qquad \text{Expression 2-1b}$$

Further, according to the present embodiment, the aforesaid ratio value r at, which defines the positions of the contact area representative points a1 to a4 in the state where both legs are in contact with the ground, is determined on the basis of the ratio of a vertical component Fz_act_R of a translational floor reaction force (a translational force of a floor reaction force) actually acting on the right foot 18R to a vertical component Fz_act_L of a translational floor reaction force actually acting on the left foot 18L. More specifically, the contact area Jacobian determining section 82 determines the aforesaid ratio value r at according to expression 2-2a or 2-2b given below.

$$r\ at=Fz\_act\_R/(Fz\_act\_R+Fz\_act\_L) \qquad \text{Expression 2-2a}$$

$$r\ at=1-Fz\_act\_L/(Fz\_act\_R+Fz\_act\_L) \qquad \text{Expression 2-2b}$$

In expression 2-2a or 2-2b, if Fz_act_R is zero, then r at is zero. In this case, therefore, the contact area representative points a1, a2, a3, and a4 coincide with the aforesaid predetermined points a1L, a2L, a3L, and a4L, respectively, of the left foot 18L. In expression 2-2a or 2-2b, if Fz_act_L is zero, then r at is 1. In this case, therefore, the contact area representative points a1, a2, a3, and a4 coincide with the aforesaid predetermined points a1R, a2R, a3R, and a4R, respectively, of the right foot 18R. Further, Fz_act_R is zero in the state where the left leg is in contact with the ground, while Fz_act_L is zero in the state where the right leg is in contact with the ground.

Hence, not only in the state where both legs are in contact with the ground but also in the state where the left leg is in contact with the ground and in the state where the right leg is in contact with the ground, the ratio value r at is determined according to the expression 2-2a or 2-2b and the positions of the contact area representative points a1, a2, a3, and a4 are defined on the basis of the determined ratio value r at such that the aforesaid expression 2-1a or 2-1b is satisfied. This results in defining the positions of the contact area representative points a1, a2, a3, and a4 to be the aforesaid positions also in the state where the left leg is in contact with the ground and the state where the right leg is in contact with the ground.

In the present embodiment, therefore, the contact area Jacobian determining section 82 carries out processing for determining the aforesaid ratio value r at as a parameter defining the positions of the contact area representative points a1, a2, a3, and a4. This processing is performed as described below.

The measurement values of the actual translational floor reaction force vertical components Fz_act_R and Fz_act_L acting on the feet 18R and 18L are input to the contact area Jacobian determining section 82 to determine the aforesaid ratio value r at (hereinafter referred to as the contact area representative point defining ratio r at). The measurement values of Fz_act_R and Fz_act_L are the measurement values recognized by the control device 60 on the basis of the detection outputs of the force sensors 62R and 62L.

Then, based on the received measurement values of the translational floor reaction force vertical components Fz_act_R and Fz_act_L, the contact area Jacobian determining section 82 calculates the contact area representative point defining ratio r at according to the aforesaid expression 2-2a or expression 2-2b.

Determining the contact area representative point defining ratio r at as described above consequently determines the positions of the four contact area representative points a1 to a4 such that these positions continuously change.

Further, the contact area Jacobian determining section 82 determines a contact area Jacobian by using the contact area representative point defining ratio r at determined as described above.

In this case, according to the present embodiment, the contact area representative points a1 to a4 are four points, and therefore the contact area Jacobian is a matrix Jc which represents the relationship between a temporal change rate (a first-order differential value) ↑Xc' (=d↑Xc/dt) of a vector ↑Xc composed of a sequence of the positions of the contact area representative points a1 to a4 as components (hereinafter, the vector is referred to as the contact area representative point vector ↑Xc), i.e., the vector ↑Xc' composed with the motion velocities of the individual contact area representative points a1 to a4 as the components thereof, and a first-order differential value ↑q' of the aforesaid generalized variable vector ↑q by expression 2-3 given below.

$$\uparrow Xc'=Jc*\uparrow q' \qquad \text{Expression 2-3}$$

The motion velocity of each of the contact area representative points a1 to a4 has three degrees of freedom, and therefore ↑Xc' is a vector formed of twelve components (3*4=12).

Here, the contact area representative point position vector ↑Xc in the case where the contact area representative points a1 to a4 are set so as to coincide with the aforesaid predetermined points a1R to a4R of the right foot 18R is denoted by ↑Xc_R, while the contact area representative point position vector ↑Xc in the case where the contact area representative points a1 to a4 are set so as to coincide with the aforesaid predetermined points a1L to a4L of the left foot 18L is denoted by ↑Xc_L. Further, the Jacobian that represents the relationship between a first-order differential value ↑Xc_R' of ↑Xc_R (=d↑Xc_R/dt) and the first-order differential value ↑q' of the generalized variable vector ↑q is denoted by Jc_R, while the Jacobian that represents the relationship between a first-order differential value ↑Xc_L' of the ↑Xc_L (=d↑Xc_L/dt) and the first-order differential value ↑q' of the generalized variable vector ↑q is denoted by Jc_L. In other words, ↑Xc_L'=Jc_L*↑q' and ↑Xc_R'=Jc_R*↑q' apply.

At this time, the contact area Jacobian Jc is given by the following expression 2-4.

$$Jc = r\_at * Jc\_R + (1 - r\_at) * Jc\_L \qquad \text{Expression 2-4}$$

According to the present embodiment, therefore, the contact area Jacobian determining section 82 calculates the Jacobian Jc_R and Jc_L of the right side of expression 2-4, and the right side of expression 2-4 is calculated from the calculated values of the Jacobians Jc_R and Jc_L and the contact area representative point defining ratio r_at calculated as described above, thereby calculating the contact area Jacobian Jc.

In this case, the contact area Jacobian determining section 82 receives the moving velocity of the lower body 10, the measurement values of the posture angle and the temporal change rate (angular velocity) of the lower body 10, and the measurement values of the rotational angles and the temporal change rates (angular velocities) of the joints of each of the leg links 3R and 3L in order to calculate the aforesaid Jacobians Jc_R and Jc_L. Then, the contact area Jacobian determining section 82 calculates the aforesaid Jacobians Jc_R and Jc_L from the received measurement values.

Thus, in the processing carried out by the contact area Jacobian determining section 82, the contact area representative point defining ratio r_at is determined on the basis of the measurement values of the translational floor reaction force vertical components Fz_act_R and Fz_act_L acting on the robot 1 (by extension, on the basis of the ground contact states of both feet 18R and 18L). Further, the Jacobians Jc_R and Jc_L are calculated on the basis of the measurement values of required components of the generalized variable vector ↑q and the first-order differential value ↑q' thereof. Then, the contact area Jacobian Jc is calculated according to the aforesaid expression 2-4 from the calculated values of the contact area representative point defining ratio r_at and the Jacobians Jc_R and Jc_L.

Supplementarily, if the denominator of the right side of the aforesaid expression 2-2a or 2-2b is able to be regarded to be maintained substantially constant, then the contact area representative point defining ratio r_at may be determined according to an expression derived by replacing the denominator of the right side of expression 2-2a or 2-2b by the gravity acting on the entire robot 1 (=overall mass of the robot 1*gravity acceleration constant).

If the aforesaid target gait generated and output by the gait generating section 71 (or a target gait supplied to the control device 60 from outside) includes target values Fz_cmd_R and Fz_cmd_L of the translational floor reaction force vertical components of the feet 18R and 18L, respectively, then the contact area representative point defining ratio r_at may be determined according to an expression derived by replacing Fz_act_R and Fz_act_L of the aforesaid expression 2-2a or 2-2b by Fz_cmd_R and Fz_cmd_L, respectively.

Alternatively, for example, the contact area representative point defining ratio r_at may be determined by synthesizing (adding up) a filtering value obtained by subjecting the value of r_at, which is calculated according to an expression obtained by replacing Fz_act_R and Fz_act_L of expression 2-2a or 2-2b by Fz_cmd_R and Fz_cmd_L, respectively, to filtering of a low-pass characteristic and a filtering value obtained by subjecting the value of r_at, which is calculated by calculating the expression 2-2a or 2-2b, to filtering of a low-cut characteristic (a high-pass characteristic).

In other words, a component on the low frequency side of the contact area representative point defining ratio r_at may be determined on the basis of the ratio of the target values Fz_cmd_R and Fz_cmd_L and a component on the high frequency side of the contact area representative point defining ratio r_at may be determined on the basis of the ratio of the measurement values of Fz_act_R and Fz_act_L, and then these determined components may be synthesized (added up), thereby determining the contact area representative point defining ratio r_at.

In this case, for the filtering of a low-pass characteristic and the filtering of a low-cut characteristic, filters whose transfer functions are expressed by, for example, $1/(Tc*s+1)$ and $Tc*s/(Tc*s+1)$, respectively (Tc: predetermined time constant) may be used.

In the present embodiment, the four points a1 to a4 have been used as the contact area representative points. Alternatively, however, three, or five or more points may be used as the contact area representative points.

The aforesaid state quantity Jacobian determining section 83 is a functional section which sequentially carries out processing for calculating a Jacobian expressing the relationship between each type of a state quantity, with respect to a plurality of types of state quantities previously determined as control targets which are preferably controlled to target values appropriate for ensuring a stable walking motion of the robot 1, and the first-order differential value ↑q' of the generalized variable vector ↑q (hereinafter, the Jacobian is referred to as the state quantity Jacobian).

The state quantity of each type is a state quantity whose value changes according to a change in the value of any one component of the generalized variable vector N. To be more specific, the state quantity of each type is a state quantity whose value (instantaneous value) is obtained by multiplying a certain state quantity Jacobian, which corresponds to the state quantity, by the first-order differential value ↑q' of the generalized variable vector ↑q.

In the present embodiment, the number of types of the state quantities as controlled objects (objects to be controlled) is, for example, two. Then, as one type of the state quantity (hereinafter, referred to as the first-type state quantity), a pair of a total translational momentum ↑Ptotal and a total angular momentum ↑Ltotal of the robot 1 observed in the global coordinate system (more specifically, a total angular momentum ↑Ltotal about a predetermined reference point in the global coordinate system) is used. In the present embodiment, the global coordinate system is, for example, a coordinate system (a so-called supporting leg coordinate system) having the origin thereof set at a position based on the ground contact position of the foot of a supporting leg out of the feet 18R and 18L of the robot 1 (e.g., a position in a ground contact surface).

More specifically, the total translational momentum ↑Ptotal is a translational momentum resulting from adding up the momentum of the center-of-gravity point of each link of the robot 1 (=the mass of each link*the moving velocity of the center-of-gravity point of the link) In other words, ↑Ptotal denotes the translational momentum of the overall center-of-gravity of the robot 1. The ↑Ptotal in the present embodiment denotes a vector having three degrees of freedom (a vector composed of components in the directions of three axes, namely, the roll axis, the pitch axis, and the yaw axis).

In the following description, the roll axis means a horizontal axis in the longitudinal direction of the robot 1, the pitch axis means a horizontal axis in the lateral direction of the robot 1, and the yaw axis means an axis in the vertical direction (gravitational direction).

The total angular momentum ↑Ltotal denotes an angular momentum obtained by adding up the angular momentum about the aforesaid reference point attributable to the translational motion of the center-of-gravity point of each link of the robot 1 (=the vector product of the position vector of the center-of-gravity point of each link relative to the reference point and the translational momentum of the center-of-gravity point) and the angular moment attributable to a rotational motion of each link about the center-of-gravity point (=the inertial moment of each link*the angular velocity about the center-of-gravity point of the link), with respect to all links. The total angular momentum ↑Ltotal in the present embodiment is a vector having two degrees of freedom, excluding a component about the yaw axis (i.e., a vector composed of components about two axes, namely, the roll axis and the pitch axis). The aforesaid reference point is a point preset on the aforesaid global coordinate system (e.g., the origin of the supporting leg coordinate system).

In addition, as another type of state quantity (hereinafter, referred to as the second-type state quantity), a displacement rate (rotational angular velocity) of each joint of the robot 1 is used in the present embodiment.

The state quantity Jacobian determining section 83 determines the state quantity Jacobian for each state quantity of each type described above. In this case, the state quantity Jacobian corresponding to the aforesaid the first-type state quantity (hereinafter, referred to as the first state quantity Jacobian) is a matrix Js1 which represents the relationship between a vector ↑S1 (=[↑P, ↑L]$^T_o$; hereinafter, referred to as the first-type state quantity vector ↑S1), which is composed of the total translational momentum ↑Ptotal and the total angular momentum ↑Ltotal arranged as the components thereof, and the first-order differential value ↑q' of the aforesaid generalized variable vector ↑q, according to expression 3-1 given below.

$$↑S1 = Js1 * ↑q'$$ Expression 3-1

In the present embodiment, the total translational momentum ↑Ptotal and the total angular momentum ↑Ltotal are a vector having three degrees of freedom and a vector having two degrees of freedom, respectively. Hence, ↑S1 is a vector composed of 5 components (3+2=5).

To calculate the first state quantity Jacobian Js1, the state quantity Jacobian determining section 83 receives the measurement values of the moving velocity of the representative link (the lower body) 10 and the posture angle and the temporal change rate (angular velocity) thereof, and the measurement values of the rotational angle of each joint and the temporal change rate (angular velocity) thereof. Then, the state quantity Jacobian determining section 83 calculates the first state quantity Jacobian Js1 from the received measurement values.

In addition, the state quantity Jacobian corresponding to the aforesaid second-type state quantity (hereinafter, referred to as the second state quantity Jacobian) is a matrix Js2 which represents the relationship between a vector ↑S2 (hereinafter, referred to as the second-type state quantity vector ↑S2), which is composed of the rotational angular velocities of the respective joints of the robot 1 arranged as the components thereof, and the first-order differential value ↑q' of the aforesaid generalized variable vector ↑q, according to expression 3-2 given below.

$$↑S2 = Js2 * ↑q'$$ Expression 3-2

In this case, ↑q' is a first-order differential value, namely a vector including a rotational angular velocity as a component. Therefore, the respective components of the second-type state quantity vector ↑S2 coincide with the components of the first-order differential value ↑q'. Therefore, in the present embodiment, the second state quantity Jacobian Js2 is a Jacobian wherein the respective component values are fixed values (constant values).

Therefore, the state quantity Jacobian determining section 83 substantially does not perform processing for calculating the second state quantity Jacobian Js2, but outputs a second state quantity Jacobian Js2 stored and retained beforehand in the control device 60.

The state quantity target value determining section 84 is a functional section which carries out processing for determining target values of the first-type state quantity and the second-type state quantity.

In the present embodiment, the target value of the first-type state quantity is a target value ↑S1'_cmd of the temporal change rate (first-order differential value) ↑S1' of the first-type state quantity vector ↑S1 (=d↑S1/dt). In addition, the target value of the second-type state quantity is a target value ↑S2'_cmd of the temporal change rate (first-order differential value) ↑S2' of the second-type state quantity vector ↑S2 (=d↑S2/dt).

In this case, ↑S1' is a vector having the first-order differential value ↑Ptotal' of the total translational momentum ↑Ptotal of the robot 1 (=d↑Ptotal/dt) and the first-order differential value ↑Ltotal' of the total angular momentum ↑Ltotal (=d↑Ltotal/dt) as the components thereof (=[↑Ptotal', ↑Ltotal']$^T$). Hence, the target value ↑S1'_cmd of ↑S1' (hereinafter, referred to as the first-type state quantity target value vector ↑S1'_cmd) corresponds to the target value of the total inertial force (excluding a moment component about the yaw axis) generated by a motion of the entire robot 1.

More specifically, the first-type state quantity target value vector ↑S1'_cmd is a vector having the target value of ↑Ptotal' and the target value of ↑Ltotal' as the components thereof. Further, the target value of ↑Ptotal' of ↑S1' cmd corresponds to the target value of the total translational inertial force generated by a motion of the entire robot 1 (the target value of the translational inertial force of the overall center-of-gravity of the robot 1), while the target value of ↑Ltotal' corresponds to the target value of the total moment inertial force (excluding the component about the yaw axis) generated by a motion of the entire robot 1.

In addition, the target value ↑S2'_cmd of ↑S2' (hereinafter, referred to as the second-type state quantity target value vector ↑S2'_cmd) is a target value of a rotation angle acceleration of each joint of the robot 1.

Further, according to the present embodiment, the state quantity target value determining section 84 determines the aforesaid first-type state quantity target value vector ↑S1'_cmd and the second-type state quantity target value vector ↑S2'_cmd as described below.

Specifically, the state quantity target value determining section 84 calculates the target value ↑Ptotal'_cmd of the temporal change rate ↑Ptotal' of the total translational momentum ↑Ptotal and the target value ↑Ltotal'_cmd of the temporal change rate ↑Ltotal' of the total angular momentum ↑Ltotal in the first-type state quantity target value vector ↑S1'_cmd by carrying out the arithmetic processing for each.

To be more specific, regarding the processing for calculating ↑Ptotal'_cmd, the state quantity target value determining section 84 calculates a difference ↑Δr gc between a target position ↑r gc_cmd of the overall center-of-gravity point of the robot 1 in the global coordinate system and the measurement value of an actual position ↑r gc_act (=↑r gc_cmd-↑r gc_act), and a first-order differential value ↑Δr gc' of the difference ↑Δr gc (=d↑Δr gc/dt).

In this case, the target position ↑r gc_cmd of the overall center-of-gravity point of the robot 1 is input to the state quantity target value determining section 84 from the aforesaid gait generating section 71. The measurement value of the actual position ↑r gc_act of the overall center-of-gravity point is sequentially calculated by the control device 60 according to a publicly know method (e.g., a method using a Kalman filter) from the measurement value of the rotational angle of each joint and the like, and the calculated measurement value is input to the state quantity target value determining section 84.

Incidentally, each of ↑r gc_cmd and ↑r gc_act denotes a vector composed of positions in the directions of three axes, namely, the direction of the roll axis, the direction of the pitch axis, and the direction of the yaw axis (a position vector having three degrees of freedom).

Then, the state quantity target value determining section 84 calculates a feedback manipulated variable for converging the aforesaid difference ↑Δr gc to zero according to a predetermined feedback control law and determines the calculated feedback manipulated variable as the target value ↑Ptotal'_cmd of ↑Ptotal'.

In this case, specifically, the state quantity target value determining section 84 determines ↑Ptotal'_cmd according to a proportional-differential law (PD law) such that the aforesaid difference ↑Δr gc is converged to zero. In other words, the state quantity target value determining section 84 determines ↑Ptotal'_cmd according to the following expression 4-1 from the difference ↑Δr gc and a first-order differential value ↑Δr gc' thereof.

$$\uparrow Ptotal'\_cmd = Kp1 * \uparrow \Delta r\, gc + Kv1 * \uparrow \Delta r\, gc' \quad \text{Expression 4-1}$$

In expression 4-1, Kp1 and Kv1 denote a proportional gain and a differential gain, respectively, having predetermined values set beforehand. These gains Kp1 and Kv1 are expressed by diagonal matrices (third-order diagonal matrices in the present embodiment).

Subsequently, regarding the processing for calculating Ltotal'_cmd, the state quantity target value determining section 84 calculates a difference ↑Δrg_xy between the horizontal position of a target ZMP of the robot 1 on the global coordinate system (the position in the roll-axis direction and the position in the pitch-axis direction) and the measurement value of the an actual horizontal position ↑r gc_act_xy of the overall center-of-gravity point of the robot 1 (=the component of the aforesaid ↑r gc_act in the roll-axis direction and the component thereof in the pitch-axis direction). In this case, the horizontal position of the target ZMP of the robot 1 is input to the state quantity target value determining section 84 from the gait generating section 71.

Further, the state quantity target value determining section 84 calculates an inclination angle ↑θpend (an inclination angle about two axes, namely, the roll axis and the pitch axis) relative to the vertical direction of an inverted pendulum in the case where the overall center-of-gravity point of the robot 1 is regarded as the mass point of the inverted pendulum which uses a target ZMP as its supporting point, and also calculates the first-order differential value ↑θpend' thereof (=d↑θpend/dt) from the aforesaid difference ↑Δr g_xy. More specifically, if the component of ↑θpend about the roll axis and the component thereof about the pitch axis are denoted by θpend_x and θpend_y, respectively, then θpend_x and θpend_y are calculated from the component ↑Δr g_y of the aforesaid difference ↑Δr g_xy in the pitch-axis direction and the component ↑Δr g_x thereof in the roll-axis direction, respectively, according to expressions 4-2a and 4-2b given below.

$$\theta pend\_x = \tan^{-1}(\Delta r\, g\_y/h) \approx \Delta r\, g\_y/h \quad \text{Expression 4-2a}$$

$$\theta pend\_y = \tan^{-1}(\Delta r\, g\_x/h) \approx \Delta r\, g\_x/h \quad \text{Expression 4-2b}$$

Then, the first-order differential values (temporal change rates) of these θpend_x and θpend_y are calculated, thereby calculating each component of ↑θpend_xy'.

In expressions 4-2a and 4-2b, "h" denotes a predetermined value set beforehand as a mean height of the overall center-of-gravity point of the robot 1.

Subsequently, according to a predetermined feedback control law, the state quantity target value determining section 84 calculates the feedback manipulated variable (control input) for converging the inclination angle ↑θpend (=[θpend_x, θpend_y]$^T$) of the inverted pendulum calculated as described above to zero, and determines the calculated feedback manipulated variable as the target value ↑Ltotal'_cmd of ↑Ltotal'.

In this case, specifically, the state quantity target value determining section 84 determines ↑Ltotal'_cmd such that the aforesaid inclination angle ↑θpend is converged to zero according to the PD law (proportional-differential law). More specifically, the state quantity target value determining section 84 determines ↑Ltotal'_cmd according to the following expression 4-3 from the inclination angle ↑θpend and the first-order differential value ↑θpend' thereof.

$$\uparrow Ltotal'\_cmd = Kp2 * \uparrow \theta pend + Kv2 * \uparrow \theta pend' \quad \text{Expression 4-3}$$

In expression 4-3, Kp2 and Kv2 denote a proportional gain and a differential gain, respectively, of predetermined values set beforehand. These gains Kp2 and Kv2 are expressed by diagonal matrices (second-order diagonal matrices in the present embodiment).

Thus, the target value of ↑Ptotal'_cmd of ↑Ptotal' and the target value ↑Ltotal'_cmd of ↑Ltotal' are determined by the processing described above, thereby determining the first-type state quantity target value vector ↑S1'_cmd (=[↑Ptotal'_cmd, ↑Ltotal_cmd]$^T$).

In this case, according to the present embodiment, ↑Ptotal'_cmd of ↑S1'_cmd is determined such that the position of the overall center-of-gravity point ↑r gc_act of the robot 1 converges to the target position ↑r gc_cmd.

Further, ↑Ltotal'_cmd of ↑S1'_cmd is determined such that, in the case where the actual overall center-of-gravity point of the robot 1 is regarded as the mass point of an inverted pendulum, the inclination angle ↑θpend of the inverted pendulum converges to zero (in other words, such that the actual overall center-of-gravity point of the robot 1 converges to a position above a target ZMP in the vertical direction).

Supplementarily, θpend_x and θpend_y are approximately proportional to Δr g_y and Δr g_x, respectively. Hence, the processing for calculating θpend_x and θpend_y may be omitted, and ↑Ltotal'_cmd_xy may be determined such that Δr g_y and Δr g_x converge to zero according to a feedback control law (e.g., the PD law). For example, ↑Ltotal'_cmd_xy may be calculated according to an expression in which ↑θpend of the right side of expression 4-3 is replaced by a vector [Δr g_y, Δr g_x]$^T$.

Subsequently, regarding the processing for calculating the second-type state quantity target value vector ↑S2'cmd, the state quantity target value determining section 84 calculates a difference Δθ (=θcmd−θact) between a required target value θcmd of a rotational angle of each joint of the robot 1 (hereinafter, the rotational angle is referred to as the joint angle in some cases) and the measurement value of an actual rotational angle θact of the joint and the first-order differential value Δθ' (=dΔθ/dt) thereof. In this case, the target value θcm of each joint angle is a value (the previous value) obtained by correcting the target joint angle, which is generated by the gait generating section 71, by using a contact region elastic deformation compensation section 88 described later in detail at the previous arithmetic processing cycle of the control device 60.

Further, the state quantity target value determining section 84 calculates the feedback manipulated variable for use in converging the aforesaid difference Δθ of each joint to zero according to a predetermined feedback control law and determines a vector having the calculated feedback manipulated variables as components (a vector in which the feedback manipulated variables for the respective joints are arranged) to be a second-type state quantity target value vector ↑S2'_cmd.

In this case, specifically, the state quantity target value determining section 84 determines ↑S2'_cmd such that the aforesaid difference Δθ is converged to zero according to the PD law (proportional-differential law). More specifically, the state quantity target value determining section 84 determines ↑S2'_cmd according to the following expression 4-4 from a vector ↑ΔΘ in which the differences Δθ of the respective joints are arranged and a vector ↑ΔΘ' in which the first-order differential values Δθ' of the differences Δθ are arranged (i.e., the first-order differential values of ↑ΔΘ).

$$\uparrow S2'cmd = Kp3 * \uparrow \Delta\Theta + Kv3 * \uparrow \Delta\Theta' \qquad \text{Expression 4-4}$$

In expression 4-4, Kp3 and Kv3 denote a proportional gain and a differential gain, respectively, of predetermined values set beforehand. These gains Kp3 and Kv3 are expressed by diagonal matrices (diagonal matrices of the same order as for ↑S2'_cmd).

Thus, the second-type state quantity target value vector ↑S2'_cmd is determined by carrying out the processing described above. In this case, in the present embodiment, ↑S2'_cmd is determined such that the actual joint angle θact of each joint of the robot 1 is converged to a required target value θcmd.

Thus, after carrying out the processing by the basic parameter group determining section 81, the contact area Jacobian determining section 82, the state quantity Jacobian determining section 83, and the state quantity target value determining section 84, the target joint drive torque determining section 72 carries out the processing by the section for determining control inputs classified by state quantity 85.

The section for determining control inputs classified by state quantity 85 is a functional section which sequentially carries out the processing for determining a target joint drive torque of each joint of the robot 1 necessary to achieve a target value of a state quantity of each type (the first-type state quantity target value vector ↑S1'_cmd and the second-type state quantity target value vector ↑S2'_cmd) for each state quantity of each type. Hereinafter, a vector formed of target joint drive torques of joints, which correspond to the first-type state quantity, arranged as the components thereof is denoted by the first target joint drive torque ↑τ1_cmd and a vector formed of target joint drive torques of joints, which correspond to the second-type state quantity, arranged as the components thereof is denoted by the second target joint drive torque ↑τ1_cmd.

In the description of the present embodiment, ↑τ1_cmd and ↑τ2_cmd are vectors of the same order as the aforesaid driving force-dependent generalized force vector ↑τ (the same order as the generalized variable vector ↑q). In this case, out of the components of ↑τ1_cmd and those of ↑τ2_cmd, the components corresponding to the position and the posture of the representative link (the lower body 10) of the robot 1 are both zero.

Here, the basic expression used for the processing by the section for determining control inputs classified by state quantity 85 is described below.

In the case where the robot 1 is subjected to an external force in a contact area thereof in contact with the external world, a robot motion model expressing the relationship between a motion of the robot 1 and a force (a motion equation) is represented by the following expression 5-1 derived by adding an equivalent of the influence of the external force to the aforesaid expression 1-1 representing a robot motion model in the case where the external force is zero.

$$M * \uparrow q'' + \uparrow N + \uparrow G + Jc^T * \uparrow Fc = \uparrow \tau \qquad \text{Expression 5-1}$$

In the expression 5-1, ↑Fc denotes an external force acting on the contact area of the robot 1 in contact with the external world (in the present embodiment, foot 18R, 18L), and $Jc^T$ denotes a transposed matrix of the contact area Jacobian Jc.

As described below, the aforesaid expression 5-1 can be transformed to expression 5-11, which is discussed later, by defining the motion of a contact area of the robot 1 subjected to an external force (the motion is supposed to match a predetermined motion).

As described below, multiplying both sides of expression 5-1 by a matrix $Jc*M^{-1}$ results in the following expression 5-2.

$$Jc * \uparrow q'' + Jc*M^{-1}*(\uparrow N + \uparrow G) + Jc*M^{-1}*Jc^T*\uparrow Fc = Jc*M^{-1}*\uparrow \tau \qquad \text{Expression 5-2}$$

Meanwhile, the following expression 5-3 is derived by subjecting both sides of the aforesaid expression 2-3, which represents the relationship between the motion velocity of the contact area representative points a1 to a4 (=a first-order differential value ↑Xc' of the contact area representative point position vector ↑Xc) and the first-order differential value ↑q' of the generalized variable vector ↑q, to first-order differentiation and then by carrying out expression transformation.

$$Jc * \uparrow q'' = \uparrow Xc'' - Jc'* \uparrow q' \qquad \text{Expression 5-3}$$

In this expression 5-3, Jc' denotes a first-order differential value of the aforesaid contact area Jacobian Jc (=dJc/dt) and ↑q" denotes a second-order differential value of ↑q (=d²↑q/dt²).

Further, the following expression 5-4 is derived by substituting expression 5-3 into expression 5-2.

$$\uparrow Xc'' - Jc'*\uparrow q' + Jc*M^{-1}*(\uparrow N + \uparrow G) + Jc*M^{-1}*Jc^T*\uparrow Fc = Jc*M^{-1}*\uparrow \tau \qquad \text{Expression 5-4}$$

Here, a weight matrix Wat (diagonal matrix) is used to introduce a matrix Jc# and a matrix Rc defined by the following expressions 5-5 and 5-6, respectively.

$$Jc\# \equiv Wat^T * Jc^T * Rc^T \qquad \text{Expression 5-5}$$

$$Rc \equiv ((Jc*Wat*Jc^T)^{-1})^T \qquad \text{Expression 5-6}$$

The matrix Jc# defined by expression 5-5 means a generalized weighted pseudo inverse matrix of the contact area Jacobian Jc.

In this case, as the aforesaid weight matrix Wat, for example, the inverse matrix $M^{-1}$ of the aforesaid inertia matrix M may be used. If $Wat=M^{-1}$, then $(Jc\#)^T = Rc*Jc*Wat = Rc*Jc*M^{-1}$. Hence, the following expression 5-7 is derived by multiplying both sides of the aforesaid expression 5-4 by the matrix Rc (provided that $Wat=M^{-1}$).

More specifically, the aforesaid expression 5-1 is transformed to the following expression 5-7 by using matrices Jc# and Rc defined by the following expressions 5-8 and 5-9, respectively, obtained as Wat=$M^{-1}$ according to expressions 5-5 and 5-6.

$$Rc^*\uparrow Xc''-Rc^*Jc'^*\uparrow q'+(Jc\#)^{T*}(\uparrow N+\uparrow G)+\uparrow F=(Jc\#)^{T*}\uparrow\tau \quad \text{Expression 5-7}$$

where $$Jc\#=(M^{-1})^T*Jc^T*Rc^T \quad \text{Expression 5-8}$$

$$Rc\equiv(Jc^**M^{-1}*Jc^T)^{-1})^T \quad \text{Expression 5-9}$$

Here, $M^{-1}$ denotes a diagonal matrices and therefore $(M^{-1})^T=M^{-1}$.

Here, a case is assumed where motions of the contact area representative points a1 to a4 are defined and the second-order differential value $\uparrow Xc''(=d^2\uparrow Xc/dt^2)$ of the contact area representative point position vector $\uparrow Xc$ is set to coincide with a predetermined target value $\uparrow C$ (a case where the motion accelerations of the contact area representative points a1 to a4 are respectively set to coincide with certain predetermined target values). In other words, a case is assumed where the motions of the feet 18R and 18L, which are contact areas, are defined so that $\uparrow Xc''$ equals $\uparrow C$.

In this case, the following expression 5-10 is derived from the above expression 5-7.

$$\uparrow Fc=(Jc\#)^{T*}(\uparrow\tau=\uparrow N-\uparrow G)-Rc^*\uparrow C-Rc^*Jc'^*\uparrow q' \quad \text{Expression 5-10}$$

This expression 5-10 is substituted into the above expression 5-1, and further, a matrix Tc, a vector $\uparrow Cc$, a matrix Pc, and a generalized force vector $\uparrow\tau cmpn$, which are defined by the following expressions 5-12, 5-13, 5-14, and 5-15, respectively, are used to provide the following expression 5-11.

$$M^*\uparrow q''+Tc^*\uparrow q'=Pc^*(\uparrow\tau-\uparrow\tau cmpn) \quad \text{Expression 5-11}$$

where $$Tc\equiv -Jc^T*Rc*Jc' \quad \text{Expression 5-12}$$

$$\uparrow Cc\equiv -Jc^T*Rc^*\uparrow C \quad \text{Expression 5-13}$$

$$Pc\equiv I-Jc^{T*}(Jc\#)^T \quad \text{Expression 5-14}$$

$$\uparrow\tau cmpn\equiv(\uparrow N+\uparrow G)-Pc^{-1}*\uparrow Cc \quad \text{Expression 5-15}$$

The above expression 5-11 denotes the motion equation of the robot 1, which applies when the motions of the contact area representative points a1 to a4 are specified, in a form excluding an external force $\uparrow Fc$.

Subsequently, assuming an arbitrary state quantity $\uparrow S$ having a value that depends on one or more components of the aforesaid generalized variable vector $\uparrow q$ of the robot 1, it is supposed that the relationship between the state quantity $\uparrow S$ and the first-order differential value $\uparrow q'$ of the generalized variable vector $\uparrow q$ is denoted by the following expression 5-16 by using a certain Jacobian Js.

$$\uparrow S=Js^*\uparrow q' \quad \text{Expression 5-16}$$

This expression 5-16 is a generalized version of the above expression 3-1. Although $\uparrow S$ in expression 5-16 does not need to be a vector (may be a scalar), it is denoted as a vector for convenience of consistency with the above expressions 3-1 and 3-2 in this description.

Here, the above expression 5-11 is transformed to the following expression 5-20 by using the relational expression of the following expression 5-17 derived from the above expression 5-16.

$$Js^*\uparrow q''=\uparrow S'-Js'^*\uparrow q' \quad \text{Expression 5-17}$$

$$\uparrow S'+(Js^*M^{-1}*Tc-Js')^*\uparrow q'=(Js^*M^{-1}*Pc)^*(\uparrow\tau-\uparrow\tau c-mpn) \quad \text{Expression 5-20}$$

Thus, determining the values of the matrices Js, M, Tc, Js', and Pc in expression 5-20 and the values of $\uparrow S'$, $\uparrow A'$, and $\uparrow\tau cmpn$ enables determining the driving force-dependent generalized force vector $\uparrow\tau$ (by extension, the joint drive torque of each joint) according to the above expression 5-20.

Here, the matrix of the right side of expression 5-20 $(Js^*M^{-1}*Pc)$ (hereinafter defined as $As\equiv Js^*M^{-1}*Pc$) is not necessarily a regular matrix (an inverse matrix $As^{-1}$ of As does not necessarily exist).

Therefore, in the present embodiment, $\uparrow\tau$ is calculated according to expression 5-22 given below by using a matrix Bs determined from the matrix As according to an expression 5-21a or 5-21b given below.

In the case where $As(\equiv Js^*M^{-1}*Pc)$ is a regular matrix;

$$Bs=As^{-1} \quad \text{Expression 5-21a}$$

In the case where As ($\equiv Js^*M^{-1}*Pc$) is not a regular matrix;

$$Bs=As^{T*}(k^*I+As^*As^T)^{-1} \quad \text{Expression 5-21b}$$

where k: positive real number determined so that $(k^*I+As^*As^T)$ is a regular matrix $$\uparrow\tau=Bs^*(\uparrow S'+(Js^*M^{-1}*Tc-Js')^*\uparrow\tau c-mpn \quad \text{Expression 5-22}$$

This expression 5-22 is the basic expression used to calculate the first target joint drive torque $\uparrow\tau1\_cmd$ corresponding to the first-type state quantity and the second target joint drive torque $\uparrow\tau2\_cmd$ corresponding to the second-type state quantity in the present embodiment. In this case, the matrix Bs determined by the above expression 5-21b means a pseudo inverse matrix of the matrix As.

In the following description, for an arbitrary matrix A, "$A^{-1}$" is assumed to mean a matrix matching a matrix B determined according to the following expression 5-23 (a pseudo inverse matrix) if the matrix A is not a regular matrix. On the other hand, if the matrix A is a regular matrix, then $A^{-1}$ is assumed to mean an inverse matrix of A in its original meaning. Further, in either case of whether or not A is a regular matrix, $A^{-1}$ is referred to as the inverse matrix of A for the sake of convenience.

$$B=A^{T*}(k^*I+A^*A^T)^{-1} \quad \text{Expression 5-23}$$

where k: Positive real number determined so that $(k^*I+A^*A^T)$ is a regular matrix In the above expression 5-22, the matrix Bs denotes the inverse matrix of As ($=As^{-1}$) in the above meaning Supplementarily, both sides of the above expression 5-20 may be multiplied by an appropriate matrix to constitute an expression for calculating $\uparrow\tau$. For example, the expression for calculating $\uparrow\tau$ may be constituted in the same manner as described above on the basis of an expression obtained by multiplying both sides of expression 5-20 from the left by a matrix Rsc defined by $Rsc\equiv(Js^*pc^{T*}M^{-1}*Js^T)^{-1})^T$. In this case, multiplying both sides of expression 5-20 from the left by the matrix Rsc causes both sides of expression 5-20 to be converted to the dimension of a generalized force vector. Further, the expression for calculating $\uparrow\tau$ is an expression obtained by replacing the matrix Bs of expression 5-22 by a matrix $((Rsc^*Js^*M^{-1}*Pc)^{-1}*Rsc)$.

Based on the above description, the following specifically describes the processing carried out by the section for determining control inputs classified by state quantity 85.

To calculate the target joint drive torque corresponding to each type of state quantity (the first target joint drive torque ↑τ1_cmd and the second target joint drive torque ↑τ2_cmd), the section for determining control inputs classified by state quantity 85 sequentially receives the inertia matrix M, and the centrifugal force/Coriolis force-dependent generalized force vector ↑N and the gravity-dependent generalized force vector ↑G (or the nonlinear term generalized force vector (↑N+↑G)) determined by the basic parameter group determining section 81, the contact area Jacobian Jc determined by the contact area Jacobian determining section 82, the state quantity Jacobian corresponding to each type of state quantity (the first state quantity Jacobian Js1 and the second state quantity Jacobian Js2) determined by the state quantity Jacobian determining section 83, and the target value of each type of state quantity (the first-type state quantity target value vector ↑S1'_cmd and the second-type state quantity target value vector ↑S2'_cmd) determined by the state quantity target value determining section 84.

In addition, the section for determining control inputs classified by state quantity 85 sequentially receives the measurement values of the temporal change rates (first-order differential values) ↑q' of the generalized variable vector ↑q (the measurement values of the moving velocity of the lower body 10 and the temporal change rate (angular velocity) of the posture angle and the measurement value of the temporal change rate (angular velocity) of the rotational angle of each joint), and also receives a contact area representative point target acceleration ↑C described later.

Then, the section for determining control inputs classified by state quantity 85 determines the value of each parameter used for calculating the right side of expression 5-22 by using a required input value, and calculates the right side of expression 5-22 by using the determined parameter, thereby calculating the first target joint drive torque ↑τ1_cmd and the second target joint drive torque ↑τ2_cmd. In this case, a part of the parameters in the right side of expression 5-22 are shared between the target joint drive torques ↑τ1_cmd and ↑τ2_cmd, and other remaining parameters are individually determined for each of the target joint drive torques ↑τ1_cmd and ↑τ2_cmd.

More specifically, the section for determining control inputs classified by state quantity 85 carries out processing for calculating the matrices Tc and Pc and the generalized force vector ↑τcmpn necessary to calculate expression 5-22 by using a predetermined input value. The matrices Tc and Pc and the vector ↑τcmpn are parameters shared between both of the target joint drive torques ↑τ1_cmd and ↑τ2_cmd.

In this case, the section for determining control inputs classified by state quantity 85 uses the inertia matrix M, the centrifugal force/Coriolis force-dependent generalized force vector ↑N and the gravity-dependent generalized force vector ↑G (or the nonlinear term generalized force vector (↑N+↑G)) and the contact area Jacobian Jc, which have been received, to calculate Tc, Pc, and ↑τcmpn on the basis of the definitional equations of the above expressions 5-8, 5-9, 5-12, 5-13, 5-14, and 5-15.

To be more specific, the section for determining control inputs classified by state quantity 85 calculates the matrices Jc# and Rc on the basis of the above definitional equations 5-8 and 5-9 from the received inertia matrix M and the contact area Jacobian Jc. Further, from these matrices Jc# and Rc and the received Jc, the section for determining control inputs classified by state quantity 85 calculates the matrices Tc and Pc on the basis of the above definitional equations 5-12 and 5-14. In this case, Jc', i.e., the temporal change rate (a first-order differential value) of Jc, is calculated from the time series of the received Jc.

Further, the section for determining control inputs classified by state quantity 85 calculates the vector Cc according to the definitional equation of the above expression 5-13 from the received Jc and the calculated Re, and the target value ↑C of the second-order differential value ↑Xc" of the contact area representative point position vector ↑Xc (the motion accelerations of the contact area representative points a1 to a4). Hereinafter, the target value ↑C is referred to as the contact area representative point target acceleration ↑C.

Here, according to the present embodiment, the target accelerations of the four contact area representative points a1 to a4, which are the components of the contact area representative point target acceleration ↑C, are preset to zero for all the contact area representative points a1 to a4. In other words, according to the present embodiment, the contact area representative points a1 to a4 remaining stationary relative to a floor or moving at a constant velocity are provided as targets for the motions of the feet 18R and 18L serving as the contact areas.

Then, the section for determining control inputs classified by state quantity 85 calculates the vector ↑Cc according to the definitional equation of the above expression 5-13 by using the contact area representative point target acceleration ↑C. In the present embodiment, the contact area representative point target acceleration ↑C is a zero vector, and therefore all components of the vector ↑Cc are zero. Hence, in actuality, the processing for calculating ↑Cc is unnecessary, and the components of ↑Cc may simply be set to zero.

Further, the section for determining control inputs classified by state quantity 85 calculates ↑τcmpn on the basis of the definitional equation of the above expression 5-15 from the above ↑Cc, the calculated Pc, and the received ↑N and ↑G.

The processing for calculating Tc, Pc, and ↑τcmpn, which are shared between ↑τ1_cmd and ↑τ2_cmd, is carried out as described above.

Supplementarily, in the case where ↑N+↑G≈↑G applies, ↑τcmpn may be calculated according to an expression derived from the above expression 5-15 without ↑N.

The section for determining control inputs classified by state quantity 85 carries out the processing for calculating the matrix Bs used for the calculation of expression 5-22 in order to calculate the first target joint drive torque ↑τ1_cmd, which corresponds to the fist-type state quantity. In the following description, the matrix Bs corresponding to the first-type state quantity is denoted by Bs1.

In this case, the section for determining control inputs classified by state quantity 85 calculates the matrix Bs1 from the received inertia matrix M, the first state quantity Jacobian Js1, and the aforesaid calculated value of Pc. More specifically, the inverse matrix As$^{-1}$ of a matrix (Js1*M$^{-1}$*Pc) (≡As) is determined as Bs1. As described above, if As is not a regular matrix, then As$^{-1}$ is a pseudo inverse matrix calculated on the basis of the above expression 5-23.

Subsequently, the section for determining control inputs classified by state quantity 85 calculates ↑τ by calculating the right side of the above expression 5-22 (more specifically, calculating an expression derived by replacing Bs, ↑S', Js, Js', and ↑q of the right side of expression 5-22 by the measurement values Bs1, Rs1, ↑S1'cmd, Js1, Js1', and ↑q', respectively) by using the calculated values of Bs1, Tc and ↑τcmpn, the received first-type state quantity target value vector ↑S1'_cmd, the first state quantity Jacobian Js1 and the inertia matrix M, and the measurement value of ↑q', and determines the calculated value of ↑τ as the first target joint drive torque ↑τ1_cmd. In this case, Js1' (=the first-order differential value of Js1) is calculated from the time series of the first state quantity Jacobian Js1.

Moreover, the section for determining control inputs classified by state quantity 85 carries out processing for calculating a matrix Bs used for the calculation of expression 5-22 in order to calculate the second target joint drive torque ↑τ2_cmd, which corresponds to the second-type state quantity. In the following description, the matrix Bs corresponding to the second-type state quantity is denoted by Bs2.

In this case, the section for determining control inputs classified by state quantity 85 calculates the matrix Bs2 from the received inertia matrix M, the second state quantity Jacobian Js2, and the aforesaid calculated value of Pc on the basis of the expression 5-21. More specifically, the inverse matrix $As^{-1}$ of a matrix $(Js2*M^{-1}*Pc)(\equiv As)$ is determined as Bs2. Similarly to the calculation of Bs1, if As is not a regular matrix, then $As^{-1}$ is a pseudo inverse matrix calculated on the basis of the above expression 5-23.

Further, the section for determining control inputs classified by state quantity 85 calculates ↑τ by calculating the right side of the above expression 5-22 (more specifically, calculating an expression derived by replacing Bs, Rs, ↑S', Js, Js', and ↑q of the right side of expression 5-22 by the measurement values Bs2, Rs2, ↑S2'cmd, Js2, Js2', and ↑q', respectively) by using the calculated values of Bs2, Tc and ↑τcmpn, the received second-type state quantity target value vector ↑S2'_cmd, the second state quantity Jacobian Js2 and the inertia matrix M, and the measurement value of ↑q', and determines the calculated value of ↑τ as the second target joint drive torque ↑τ2_cmd. In this case, Js2' (=the second-order differential value of Js2) is calculated from the time series of the second state quantity Jacobian Js2.

In the present embodiment, the first target joint drive torque ↑τ1_cmd is determined by the processing carried out by the section for determining control inputs classified by state quantity 85 described above from the calculated values of M, ↑N, ↑G, Jc, and Js1 (or the calculated values of M, ↑G, Jc, and Js1), the first-type state quantity target value vector ↑S1'_cmd, which is the target value of the first-type state quantity, the measurement value of ↑q', and the contact area representative point target acceleration ↑C.

In this case, ↑τ1_cmd is determined such that the temporal change rate ↑S1' of the first-type state quantity vector ↑S1 coincides with the first-type state quantity target value vector ↑S1'_cmd while causing the motion accelerations of the contact area representative points a1 to a4 to coincide with the acceleration defined by the contact area representative point target acceleration ↑C.

At this time, as described above, ↑Ptotal'_cmd of ↑S1'_cmd is determined such that the position of the overall center-of-gravity point ↑r gc_act of the robot 1 converges to the target position ↑r gc_cmd, and ↑Ltotal_cmd of ↑S1'_cmd is determined such that, in the case where the actual overall center-of-gravity point of the robot 1 is regarded as the mass point of an inverted pendulum, the inclination angle ↑θpend of the inverted pendulum converges to zero. Hence, ↑τ1_cmd is consequently determined so that the overall center-of-gravity point of the robot 1 is able to be maintained at a proper position.

Moreover, the second target joint drive torque ↑τ2_cmd is determined from the calculated values of M, ↑N, ↑G, Jc, and Js2 (or the calculated values of M, ↑G, Jc, and Js2), the second-type state quantity target value vector ↑S2'_cmd, which is the target value of the second-type state quantity, the measurement value of ↑q', and the contact area representative point target acceleration ↑C.

In this case, ↑τ2_cmd is determined such that the temporal change rate ↑S2' of the second-type state quantity vector ↑S2 coincides with the second-type state quantity target value vector ↑S2'_cmd while causing the motion accelerations of the contact area representative points a1 to a4 to coincide with the acceleration defined by the contact area representative point target acceleration ↑C.

At this time, as described above, ↑S2'_cmd is determined such that the actual rotational angle θact of each joint of the robot 1 is converged to a required target value θcmd. Hence, ↑τ2_cmd is consequently determined such that the actual rotational angle of each joint of the robot 1 coincides with the required target value θcmd for achieving the target motion of the robot 1.

After carrying out the processing by the section for determining control inputs classified by state quantity 85 as described above, the target joint drive torque determining section 72 carries out the processing by the synthesized control input determining section 86.

The synthesized control input determining section 86 is a functional section which carries out the processing for sequentially determining the synthesized target joint drive torques of the respective joints by sequentially synthesizing the target joint drive torques (the first target joint drive torque ↑τ1_cmd and the second target joint drive torque ↑τ2_cmd) corresponding to the respective types of state quantities determined by the section for determining control inputs classified by state quantity 85. Hereinafter, the vector having the synthesized target joint drive torques of the joints arranged as components is referred to as the synthesized target joint drive torque ↑τt_cmd.

In the description of the present embodiment, similarly to ↑τ1_cmd and ↑τ2_cmd, ↑τt_cmd is assumed to be a vector of the same order as the aforesaid driving force-dependent generalized force vector ↑τ (the same order as the generalized variable vector ↑q). In this case, out of the components of ↑τt_cmd, the components corresponding to the position and the posture of the representative link (the lower body 10) of the robot 1 are both zero.

In the present embodiment, the synthesized control input determining section 86 determines the synthesized target joint drive torque ↑τt_cmd by synthesizing vectors ↑τf1 and ↑τf2, which are calculated by the arithmetic processing of the following expressions 6-2 and 6-3, respectively, by the arithmetic processing of expression 6-1.

$$\uparrow \tau t\_cmd = W1 * \uparrow \tau f1 + W2 * \uparrow \tau f2 \qquad \text{Expression 6-1}$$

where $$\uparrow \tau f1 = \uparrow \tau 1\_cmd + Nu1 * \uparrow \tau 2\_cmd \qquad \text{Expression 6-2}$$

$$\uparrow \tau f2 = \uparrow \tau 2\_cmd \qquad \text{Expression 6-3}$$

Here, Nu1 in expression 6-1 is a matrix defined by the following expression 6-4 according to the first state quantity Jacobian Js1 and a matrix Js1# defined by the following expression 6-4-1.

$$Nu1 \equiv I - Js1^T * Js1\#^T \qquad \text{Expression 6-4}$$

where $$Js1\# Wat^T * Js1^T * (Js1 * Wat * Js1^T)^{-1} \qquad \text{Expression 6-4-1}$$

Wat in expression 6-4-1 is a weight matrix (diagonal matrix). In the present embodiment, the inverse matrix $M^{-1}$ of the aforesaid inertia matrix M is used as the weight matrix Wat.

For the matrix Nu1 defined as described above, the generalized force vector (Nu1*↑τ2_cmd) in the second term of the right side of expression 6-2 is a vector in which a component affecting the first-type state quantity vector ↑S1 (specifically, a component changing ↑S1') of the components of the vector is zero and other components coincide with ↑τ2_cmd.

Therefore, (Nu1*↑τ2_cmd) is a generalized force vector capable of causing the control state of the first-type state quantity vector ↑S1 to be the same in both cases of controlling the joint drive torque of each joint of the robot 1 to ↑τ1_cmd and to ↑τ1_cmd+Nu1*↑τ2_cmd(=↑τf1).

For this reason, ↑τ1_cmd+Nu1*↑τ2_cmd(=↑τf1) has a meaning of a target joint drive torque obtained by superimposing (adding up) the components of the second target joint drive torque ↑τ2_cmd for achieving the second-type state quantity target value vector ↑S2'_cmd on the first target joint drive torque ↑τ1_cmd for achieving the first-type state quantity target value vector ↑S1'_cmd within a range of not affecting the first-type state quantity vector ↑S1.

Moreover, W1 and W2 denote frequency weights having frequency pass characteristics different from each other. Therefore, W1*↑τf1 means that ↑τf1 is subjected to filtering processing with a frequency pass characteristic of W1. In addition, W2*↑τf2 means that ↑τf2 is subjected to filtering processing with a frequency pass characteristic of W2.

In this case, in the present embodiment, W1 has a frequency pass characteristic capable of passing through frequency components in a relatively higher frequency region than W2.

Specifically, W1 and W2 in the present embodiment are frequency weights functioning as filters whose transfer functions are expressed by the following expressions 6-5 and 6-6, respectively.

$$W1=(1/(T1*s+1))*(1-W2) \quad \text{Expression 6-5}$$

$$W2=1/(T2*s+1) \quad \text{Expression 6-6}$$

T1 and T2 in expressions 6-5 and 6-6 are time constants having predetermined values preset such that T1<T2 is satisfied.

Therefore, the frequency weight W1 serves as a bandpass filter whose cutoff frequency on the low frequency side and cutoff frequency on the high-frequency side are defined by time constants T2 and T1, respectively. In addition, the frequency weight W2 serves as a low-pass filter whose cutoff frequency on the high frequency side is defined by the time constant T2.

By the processing of the synthesized control input determining section 86 described hereinabove, the synthesized target joint drive torque ↑τt_cmd is determined as a result of synthesizing (adding up) the components on the high frequency side of the target joint drive torque ↑τf1, which is obtained by adding components not affecting the first-type state quantity vector ↑S1' out of the second target joint drive torque ↑τ2_cmd to the first target joint drive torque ↑τ1_cmd, (components in the pass frequency band with the frequency weight W1) with the components on the low-frequency side of the second target joint drive torque ↑τ2_cmd (=↑τf2) (components in the pass frequency band with the frequency weight W2).

After carrying out the processing by the synthesized control input determining section 86 as described above, the target joint drive torque determining section 72 carries out the processing by the compliance control section 87.

The compliance control section 87 is a functional section which determines the target value of the total floor reaction force (overall floor reaction force) acting on the robot 1 on the basis of the synthesized target joint drive torque ↑τt_cmd determined by the synthesized control input determining section 86, and then sequentially carries out processing for correcting the synthesized target joint drive torque ↑τt_cmd to bring the difference between the determined target value and the measurement value of the actual total floor reaction force close to zero. Hereinafter, the torque obtained by correcting the synthesized target joint drive torque ↑τ1_cmd by the compliance control section 87 is referred to as the corrected synthesized target joint drive torque ↑τtc_cmd. In the present embodiment, the corrected synthesized target joint drive torque ↑τtc_cmd is finally used as the target joint drive torque for controlling the electric motor 50 (the target joint drive torque to be input to the target joint drive control section 73) at each arithmetic processing cycle of the control device 60.

In order to calculate the corrected synthesized target joint drive torque ↑τtc_cmd, the compliance control section 87 sequentially receives the centrifugal force/Coriolis force-dependent generalized force vector ↑N and the gravity-dependent generalized force vector ↑G (or the nonlinear term generalized force vector (↑N+↑G)) determined by the basic parameter group determining section 81, the synthesized target joint drive torque ↑τt_cmd determined by the synthesized control input determining section 86, and the contact area representative point defining ratio r at determined by the contact area Jacobian determining section 82 (or the positions of the contact area representative points a1 to a4 defined thereby).

In addition, the compliance control section 87 sequentially receives the matrices Rc, Jc' and Jc# calculated by the section for determining control inputs classified by state quantity 85, the contact area representative point target acceleration ↑C (zero vector in the present embodiment), the measurement values of actual floor reaction forces ↑FM_act_R and ↑FM_act_L acting on the feet 18R and 18L, respectively, the measurement value of the moving velocity of the representative link 10, the measurement value of the posture angle of the representative link (the lower body) 10 of the robot 1 and the measurement value of the temporal change rate (angular velocity) thereof, and the measurement value of the rotational angle of each joint and the measurement value of the temporal change rate (angular velocity) thereof.

The measurement values of the floor reaction forces ↑FM_act_R and ↑FM_act_L are the measurement values recognized by the control device 60 on the basis of the detection outputs of the aforesaid force sensors 62R and 62L.

The compliance control section 87 first calculates the right side of the above expression 5-10 from the received ↑N, ↑G (or ↑N+↑G), Rc, Jc', Jc#, and ↑τt_cmd, and the measurement value of the first-order differential value ↑q' of the generalized variable vector ↑q, thereby calculating a contact area representative point target acting force ↑Fc_cmd as a vector formed of a sequence of the target values of forces (translational forces) acting on the contact area representative points a1 to a4, respectively.

More specifically, ↑Fc_cmd is calculated according to expression 7-1 given below. The contact area representative point target acting force ↑Fc_cmd means a force (translational force) to be applied to the robot 1 at the contact area representative points a1 to a4 in the case where the actual joint drive torque of each joint of the robot 1 is set to coincide with the target joint drive torque defined by ↑τt_cmd.

$$\uparrow Fc\_cmd=(Jc\#)^{T}*(\uparrow\tau t\_cmd-\uparrow N-\uparrow G)-Rc*\uparrow C-Rc*Jc'*\uparrow q' \quad \text{Expression 7-1}$$

If ↑N+↑G≈↑G applies, then ↑N in expression 7-1 may be omitted.

Subsequently, the compliance control section 87 converts the contact area representative point target acting force ↑Fc_cmd to a target total floor reaction force ↑FMt_cmd, which is the target value of a force acting on a predetermined total floor reaction force acting point (e.g., a target ZMP) serving as the acting point of the total floor reaction force for the robot 1.

In the present embodiment, the target total floor reaction force ↑FMt_cmd is a vector formed of translational force components in the directions of three axes and moment components about three axes (a vector having six degrees of freedom). In this case, the translational force component of ↑FMt_cmd is a result of adding up the target translational forces acting on the individual contact area representative points a1 to a4. Further, the moment component of ↑FMt_cmd is a result of adding up the moments generated about the total floor reaction force acting point by the target translational forces acting on the contact area representative points a1 to a4.

The conversion of ↑Fc_cmd to ↑FMt_cmd is performed by multiplying ↑Fc_cmd by a conversion matrix, which has a component determined on the basis of the positional relationship between each of the contact area representative points a1 to a4 and the aforesaid total floor reaction force acting point.

Further, the compliance control section 87 calculates the measurement value of the total floor reaction force ↑FMt_act actually acting on the aforesaid total floor reaction force acting point from the measurement values of the actual floor reaction forces ↑FM_act_R and ↑FM_act_L acting on the feet 18R and 18L, respectively.

In this case, according to the present embodiment, the measurement value of ↑FM_act_R is a vector formed of the translational force components in the directions of three axes and the moment components about three axes, which act on a predetermined floor reaction force acting point corresponding to the right foot 18R. Similarly, the measurement value of ↑FM_act_L is a vector formed of the translational force components in the directions of three axes and the moment components about three axes, which act on a predetermined floor reaction force acting point corresponding to the left foot 18L.

Further, the compliance control section 87 adds up the result of converting the measurement value of ↑FM_act_R to a force (a pair of a translational force component and a moment component) acting on an total floor reaction force acting point by using a conversion matrix, which has a component determined on the basis of the positional relationship between the total floor reaction force acting point and the floor reaction force acting point of the right foot 18R and the result of converting the measurement value of ↑FM_act_L to a force (a pair of a translational force component and a moment component) acting on an total floor reaction force acting point by using a conversion matrix, which has a component determined on the basis of the positional relationship between the total floor reaction force acting point and the floor reaction force acting point of the left foot 18L, thereby calculating the measurement value of the total floor reaction force ↑FMt_act.

The translational force component of the measurement value of ↑FMt_act provides a translational force of the total sum (vector sum) of the translational force component of ↑FM_act_R and the translational force component of ↑FM_act_L. Further, the moment component of ↑FMt_act provides a moment of the total sum (vector sum) of the moment which is generated about the total floor reaction force acting point by the moment component of ↑FM_act_R, the moment component of ↑FM_act_L, and the translational force component of ↑FM_act_R, and the moment which is generated about the total floor reaction force acting point generated by the translational force component of ↑FM_act_L.

After calculating the measurement values of the target total floor reaction force ↑FMt_cmd and the total floor reaction force ↑FMt_act as described above, the compliance control section 87 calculates a difference ↑ΔFMt therebetween (=↑FMt_cmd−↑FMt_act). Then, the compliance control section 87 calculates, according to a predetermined feedback control law, a correction amount ↑Δτt of the synthesized target joint drive torque ↑τt_cmd serving as the manipulated variable for converging the difference ↑ΔFMt to zero.

To be more specific, according to the present embodiment, the compliance control section 87 converts a vector Gk*↑ΔFMt, which is obtained by multiplying the difference ↑ΔFMt by a proportional gain Gk of a predetermined value, into an error ↑ΔFc relative to the target value (the contact area representative point target acting force ↑Fc_cmd) of an actual force (translational force) acting on the contact area representative points a1 to a4.

The conversion is performed by multiplying the vector Gk*↑ΔFMt by an inverse matrix of a conversion matrix for converting the aforesaid ↑Fc_cmd into ↑FMt_cmd. In the present embodiment, the conversion matrix for converting ↑Fc_cmd into ↑FMt_cmd is not a regular matrix and therefore the inverse matrix of the conversion matrix is a pseudo inverse matrix determined according to the above expression 5-23.

Further, the compliance control section 87 multiplies the error ↑ΔFc by an inverse matrix $(Jc\#^T)-1$ of a matrix $Jc\#^T$, as indicated by the following expression 7-2, to calculate a correction amount ↑Δτt of the synthesized target joint drive torque ↑τt_cmd.

$$↑\Delta \tau t = (Jc\#^T)^{-1} * ↑\tau Fc \qquad \text{Expression 7-2}$$

Thus, the correction amount ↑Δτt is determined so as to converge the difference ↑ΔFMt to zero according to a proportional law serving as a feedback control law.

Then, the compliance control section 87 adds the correction amount ↑Δτt to the synthesized target joint drive torque ↑τ1_cmd as indicated by expression 7-3 given below to determine a corrected target joint drive torque ↑τ1c_cmd.

$$↑\tau 1c\_cmd = ↑\tau t\_cmd + ↑\Delta \tau t \qquad \text{Expression 7-3}$$

The processing by the compliance control section 87 described above corrects the synthesized target joint drive torque ↑τt_cmd so as to bring the difference between the target total floor reaction force ↑FMt_cmd, which is the total floor reaction force corresponding to the synthesized target joint drive torque ↑τ1_cmd, and the measurement value of an actual total floor reaction force ↑FMt_act close to zero.

According to the present embodiment, the corrected synthesized target joint drive torque ↑τtc_cmd determined as described above (more specifically, the component, out of ↑τtc_cmd, corresponding to the rotational angle of each joint) is input to the joint drive control section 73.

After carrying out the processing of the compliance control section 87 as described above, the target joint drive torque determining section 72 subsequently carries out the processing of the contact region elastic deformation compensation section 88.

The contact region elastic deformation compensation section 88 is a functional section which uses the state quantity target value determining section 84 to sequentially carries out processing for considering an elastic deformation of the foot 18 of the robot 1 in contact with the ground and an elastic deformation of the floor surface and setting a value obtained by correcting the target joint angle (hereinafter, referred to as the basic target joint angle θcmd_base) generated by the gait generating section 71 as the target joint angle θcmd of each joint of the robot 1 used to determine the second-type state quantity target value vector ↑S2'cmd.

The contact region elastic deformation compensation section 88 receives the contact area representative point target acting force ↑Fc_cmd calculated by the compliance control section 87 and the contact area Jacobian Jc calculated by the contact area Jacobian determining section 82 and receives the basic target joint angle θcmd_base generated by the gait generating section 71.

Then, the contact region elastic deformation compensation section 88 calculates a vector ↑Δqcmd including a joint angle correction amount Δθcmd for correcting the basic target joint angle θcmd_base of each joint as a component (hereinafter, referred to as the joint angle correction amount vector ↑Δqcmd) according to the following expression 8-1 by using the received ↑Fc_cmd and Jc. Each component of the joint angle correction amount vector ↑Δqcmd corresponds to each component of the generalized variable vector ↑q. The component corresponding to the rotational angle of each joint out of the component of ↑Δqcmd is the aforesaid joint angle correction amount Δθcmd corresponding to the joint.

$$\uparrow \Delta qcmd = (Jc)^{-1} * (Kstif * \uparrow Fc\_cmd) \qquad \text{Expression 8-1}$$

Kstif in expression 8-1 is a previously determined coefficient matrix (diagonal matrix), which corresponds to an inverse value of a spring constant dependent on the elastic characteristic of the foot 18 in contact with the ground or the elastic characteristic of the floor surface. In other words, Kstif is a coefficient matrix for converting the forces (translational forces) acting on the aforesaid contact area representative points a1 to a4 to the displacement amounts of the contact area representative points a1 to a4 generated due to the elastic deformation of the foot 18 (the foot 18 in contact with the ground) and of the floor surface caused by the forces.

Therefore, (Kstif*↑Fc_cmd) in expression 8-1 corresponds to an estimated value of each of the displacement amounts of the positions of the contact area representative points a1 to a4 generated in the case where the forces (translational forces) acting on the contact area representative points a1 to a4.

Further, (Kstif*↑Fc_cmd) is multiplied by the inverse matrix $(Jc)^{-1}$ of the contact area Jacobian Jc, by which the aforesaid displacement amounts of the positions of the contact area representative points a1 to a4 are converted to the amounts of change of the components of the generalized variable vector ↑q including the rotational angle of each joint of the robot 1. Then, a vector composed of the amounts of change obtained by the conversion as components is calculated as the aforesaid joint angle correction amount vector ↑Δq. In addition, $(Jc)^{-1}$ is a pseudo inverse matrix calculated on the basis of the above expression 5-23.

Subsequently, the contact region elastic deformation compensation section 88 determines the target joint angle θcmd of each joint input to the state quantity target value determining section 88 by adding the joint angle correction amount Δθcmd of the joint angle correction amount vector ↑Δq to the basic target joint angle θcmd_base of the joint corresponding thereto as indicated by the following expression 8-2.

$$\theta cmd = \theta cmd\_base + \Delta \theta cmd \qquad \text{Expression 8-2}$$

By the processing of the contact region elastic deformation compensation section 88 described above, a proper target joint angle θcmd (a proper target joint angle θcmd as a convergence target for an actual joint angle) can be determined with consideration for the elastic deformation of the foot 18 in contact with the ground as a contact area and the elastic deformation of the floor surface.

This completes the detailed description of the processing carried out by the target joint drive torque determining section 72.

According to the present embodiment described above, a component on the high-frequency side (W1*↑τf1) of the synthesized target joint drive torque ↑τt_cmd is a component dependent mainly on a component on the high-frequency side of the first target joint drive torque ↑τ1_cmd, and a component on the low-frequency side (W2*↑τf2) of the synthesized target joint drive torque ↑τt_cmd is a component dependent on a component on the low-frequency side of the second target joint drive torque ↑τ2_cmd.

Therefore, the drive torque of each joint of the robot 1 can be controlled while achieving the aforesaid first-type state quantity target value vector ↑S1'_cmd (by extension, controlling the position of the overall center-of-gravity point of the robot 1 to a target position) with a high quick reaction capability and, in the long term, achieving the second-type state quantity target value vector ↑S2'_cmd (by extension, controlling the actual rotational angle of each joint to a target joint angle).

Further, the component on the high-frequency side (W1*↑τf1) of the synthesized target joint drive torque ↑τt_cmd also includes components not affecting the first-type state quantity vector ↑S1 out of the components on the high-frequency side of the second target joint drive torque ↑τ2_cmd. This increases the controllability of the temporal change rate ↑S2' of the second-type state quantity vector ↑S2 in the high-frequency region without deteriorating the controllability of the temporal change rate ↑S1' of the first-type state quantity vector ↑S1.

According to the present embodiment described above, the target value of the first-order differential value ↑Ptotal' of the total translational momentum of the first-type state quantity target value vector ↑S1'_cmd is determined such that the position of the overall center-of-gravity point of the robot 1 including the position in the vertical direction converges to the target position of the overall center-of-gravity point of a target gait generated by the gait generating section 71. In other words, the target value of ↑Ptotal' corresponding to the target value of the translational inertial force generated by a motion of the robot 1 is determined such that the actual position of the overall center-of-gravity point of the robot 1 converges to a proper target position.

Further, the target value of the first-order differential value ↑Ltotal' of the total angular momentum in ↑S1'_cmd is determined such that the horizontal position of the overall center-of-gravity point of the robot 1 converges to a position in the vertical direction above a target ZMP, which serves as the supporting point of a virtual inverted pendulum having its mass point at the overall center-of-gravity point. In other words, the target value of ↑Ltotal' corresponding to the target value of a moment inertial force generated by a motion of the robot 1 is determined such that the actual horizontal position of the overall center-of-gravity point of the robot 1 converges to a position enabling the prevention of the aforesaid virtual inverted pendulum from tilting.

Further, in the present embodiment, the aforesaid synthesized target joint drive torque ↑τt_cmd is determined so as to allow the target value of ↑Ptotal' and the target value of ↑Ltotal' of the first-type state quantity target value vector ↑S1'_cmd to be achieved in the high-frequency region corresponding to the aforesaid frequency weight W1.

Here, in the robot 1 according to the present embodiment, the joint drive system of each joint is provided with the torsion bar 53, which is a spring member, thus making each joint flexible. This tends to cause the rotational angle of each joint to easily change due to the influence of an external force acting on the robot 1, thus causing the position of the overall center-of-gravity point (especially the position thereof in the vertical direction) to easily change.

However, the first-type state quantity target value vector ↑S1'_cmd is determined as described above, and therefore, if the actual position of the overall center-of-gravity point of the robot 1 deviates from a target position, then the target joint drive torque ↑τt_cmd is determined such that the deviation is corrected with quick responsiveness.

This prevents the actual position of the overall center-of-gravity point of the robot 1 from deviating from a proper target position. As a result, even if the joints of the robot 1 are flexible, the posture of the robot 1 can be prevented from being unstable, thus permitting higher stability of the behaviors of the robot 1.

In the present embodiment, the target joint drive torques ↑τ1_cmd and ↑τ2_cmd are determined on the basis of the above expression 5-20. Therefore, the motions of the contact area representative points a1 to a4 are defined by the aforesaid target value ↑C, and then ↑τ1_cmd and ↑τ2_cmd are determined on the basis of the first-type state quantity target value vector ↑S1'_cmd and the second-type state quantity target value vector ↑S2'_cmd, which are target values of the state quantities (the first-type state quantity and the second-type state quantity) to be controlled of the robot 1, respectively.

This enables the determination of proper ↑τ1_cmd and ↑τ2_cmd that allow ↑S1'_cmd and ↑S2'_cmd to be achieved without identifying the value of an external force acting on the robot 1 (which is susceptible to the influence of a disturbance or the like). In addition, the first target joint drive torque ↑τ1_cmd can be determined without need for identifying the rotational operations of all joints of the robot 1. This leads to an increase in flexibility of the motions of joints of the robot 1 involved with a change in an external force acting on the robot 1.

Here, the relationship of correspondence between the embodiment described above and the present invention will be supplementarily described.

In the present embodiment, the section for determining control inputs classified by state quantity 85 implements the element for determining control inputs classified by state quantity in the present invention. In this case, the first-type state quantity and the second-type state quantity correspond to the plurality of types of state quantities, and the first target joint drive torque ↑τ1_cmd and the second target joint drive torque ↑τ2_cmd correspond to the target values of the respective types of state quantities. In the present embodiment, the number of types of state quantities M is two.

Moreover, the section for determining control inputs classified by state Quantity 86 implements the synthesized control input determining element in the present invention. In this case, the synthesized target joint drive torque ↑τt_cmd corresponds to the synthesized control input τtotal in the present invention, W1*↑τf1 and W2*↑τf2 in the above expression 6-1 correspond to the control inputs classified by frequency region (W(i)*τf(i)) in the present invention, respectively, and the respective passable frequency bands with the frequency weights W1 and W2 correspond to the frequency regions in the present invention. In the present embodiment, the number of frequency regions n is two.

Further, in the present embodiment, each of ↑τf1 and ↑τf2 corresponds to τf(i) (in the above expressions 01 and 02a) in the present invention. In this case, ↑τ1_cmd and ↑τ2_cmd correspond to composition components τ(1, 1) and τ(1, 2) of ↑τf1(τf(1)), and the matrix Nu1 corresponds to Nu(1, 1) in the present invention. Moreover, ↑τ2_cmd corresponds to a composition component τ(2, 1) of ↑τf2(τf(2)). In the present embodiment, the number of composition components m(1) of ↑τf1(τf(1)) is two, and the number of composition components m(2) of ↑τf2(Tf(2)) is one.

Furthermore, in the present embodiment, the aforesaid matrices Js1# and Js2# correspond to Js#(i, j) in the present invention, respectively, Js1 and Js2 correspond to Js(i, j) in the present invention, respectively, and ↑S1 and ↑S2 correspond to S(i, j) in the present invention, respectively. Moreover, M and ↑q in the present embodiment correspond to the inertia matrix M and the generalized variable vector q in the present invention, respectively. In the present embodiment, the weight matrix Wd in the present invention is an identity matrix and Wat=$M^{-1}$ applies.

The compliance control section 87 and the joint drive control section 73 implement the actuator control element in the present invention.

Second Embodiment

A second embodiment of the present invention will now be described with reference to FIGS. 6 to 8. In the description of the present embodiment, the same reference characters as those in the first embodiment are used for the same constituent members as those in the first embodiment, and the detailed description thereof is omitted.

A robot in the present embodiment is the same as the robot 1 illustrated in the first embodiment. Then, a control device 60 in the present embodiment differs from the control device in the first embodiment in a part of processing of the target joint drive torque determining section out of the functions of the control device 60. In other words, the control device 60 includes a target joint drive torque determining section 90 illustrated in the block diagram of FIG. 6, instead of the target joint drive torque determining section 72 described in the first embodiment.

The target joint drive torque determining section 90 includes, as its main functions, a basic parameter group determining section 91, a contact area Jacobian determining section 92, a state quantity Jacobian determining section 93, a state quantity target value determining section 94, a section for determining control inputs classified by state quantity 95, a synthesized control input determining section 96, a compliance control section 97, and a contact region elastic deformation compensation section 98.

In this case, among these functions, the basic parameter group determining section 91, the contact area Jacobian determining section 92, the compliance control section 97, and the contact region elastic deformation compensation section 98 are the same as the basic parameter group determining section 81, the contact area Jacobian determining section 82, the compliance control section 87, and the contact region elastic deformation compensation section 88 described in the first embodiment, respectively. Therefore, the processing of these functional sections is not described here.

On the other hand, in the present embodiment, the state quantity Jacobian determining section 93, the state quantity target value determining section 94, the section for determining control inputs classified by state quantity 95, and the synthesized control input determining section 96 differ in processing from those of the first embodiment. Therefore, the processing of these functional sections will be described below.

First, description is given for a plurality of types of state quantities to be controlled in the present embodiment. In the present embodiment, three types of state quantities are selected beforehand as controlled objects which are preferably controlled to proper target values in order to perform the walking motion of the robot 1 stably. Two types of state quantities among the three types of state quantities are the first-type state quantity (the pair of the total translational momentum ↑Ptotal and the total angular momentum ↑Ltotal) and the second-type state quantity (the rotational angular velocity of each joint of the robot 1) described in the first embodiment.

On the other hand, the remaining one type of state quantity (hereinafter, referred to as the third-type state quantity) is the motion state quantity of the distal end (foot 18) of a leg 2 whose distal end (foot 18) is off the ground in the walking motion of the robot 1, in other words, the leg 2 which is the idling leg. The motion state quantity is a pair of the temporal change rate of the position of the foot 18 of the leg 2 which is the idling leg (hereinafter, referred to as the leg 2 on the side of the idling leg in some cases) and the temporal change rate of the posture, in other words, a pair of the moving velocity of the foot 18 of the leg 2 on the side of the idling leg and the angular velocity of the posture in the example of the present embodiment. Therefore, in the present embodiment, the moving velocity of the foot 18 and the angular velocity of the posture while the foot 18 of the leg 2 on the side of the idling leg is moving in the air are considered to be a state quantity to be controlled.

Further, the state quantity Jacobian determining section 93 in the present embodiment sequentially carries out the processing for calculating the Jacobian (state quantity Jacobian) which represents the relationship between each of the three types of state quantities described above and a first-order differential value ↑q' of a generalized variable vector N.

In this case, the processing for calculating the state quantity Jacobians Js1 and Js2 corresponding to the first-type state quantity and the second-type state quantity, respectively, is the same as the processing in the first embodiment.

On the other hand, the state quantity Jacobian Js3 (hereinafter, referred to as the third state quantity Jacobian Js3) corresponding to the third-type state quantity is a matrix Js3 representing the relationship between a vector ↑S3 (=[↑Vfoot,↑ωfoot]$^T$: hereinafter, referred to as the third-type state quantity vector ↑S3), which is composed of a translational moving velocity ↑Vfoot of the foot 18 of the leg 2 on the side of the idling leg and the temporal change rate (angular velocity) ↑ωfoot of the posture of the foot 18 as components, and the first-order differential value ↑q' of the generalized variable vector ↑q by using the following expression 3-3.

$$↑S3 = Js3 * ↑q'$$  Expression 3-3

In the present embodiment, ↑Vfoot and ↑ωfoot are vectors each having three degrees of freedom, and therefore ↑S3 is a vector having six degrees of freedom.

In order to calculate the third state quantity Jacobian Js3, the state quantity Jacobian determining section 93 receives the measurement value of the moving velocity of the representative link (lower body) 10, the measurement value of the posture angle of the representative link (lower body) 10, the measurement value of the temporal change rate (angular velocity) thereof, the measurement value of the rotational angle of each joint, and the measurement value of the temporal change rate (angular velocity) thereof.

Then, in the period in which the right leg 2R is the idling leg (one-leg supporting period), the state quantity Jacobian determining section 93 calculates the third state quantity Jacobian Js3, which represents the relationship between ↑S3 and ↑q' by the above expression 3-3, from the received measurement values, considering that the third-type state quantity vector ↑S3 is a state quantity vector composed of the translational moving velocity ↑Vfoot of the foot 18R of the right leg 2R and the angular velocity ↑ωfoot of the posture of the foot 18R of the right leg 2R as components.

Further, in the period in which the left leg 2L is the idling leg (one-leg supporting period), the state quantity Jacobian determining section 93 calculates the third state quantity Jacobian Js3, which represents the relationship between ↑S3 and ↑q' by the above expression 3-3, from the received measurement values, considering that the third-type state quantity vector ↑S3 is a state quantity vector composed of the translational moving velocity ↑Vfoot of the foot 18L of the left leg 2L and the angular velocity ↑Vfoot of the posture of the foot 18L of the left leg 2RL as components.

The determination of whether the right leg 2R is the idling leg or the left leg 2L is the idling leg in the period is carried out on the basis of, for example, the detection outputs of the force sensors 62R and 62L or the target gait given to the target joint drive torque determining section 90 by the gait generating section 71.

Moreover, in the two-leg supporting period in which the feet 18R and 18L of both legs 2R and 2L are in contact with the floor during the walking motion of the robot 1, the state quantity Jacobian determining section 93 discontinues the processing for calculating the third state quantity Jacobian Js3.

This completes the detailed description of the processing carried out by the state quantity Jacobian determining section 93 in the present embodiment.

Moreover, the state quantity target value determining section 94 in the present embodiment carries out the processing for determining the target values of the three types of state quantities described above.

In this case, the target value of the first-type state quantity in the present embodiment is the same as the target value in the first embodiment. In other words, the target value is a target value ↑S1'_cmd (the first-type state quantity target value vector ↑S1'_cmd) of a temporal change rate (first-order differential value) ↑S1'(=d↑S1/dt) of the first-type state quantity vector ↑S1. Then, the state quantity target value determining section 94 determines the first-type state quantity target value vector ↑S1'_cmd by the same processing as in the first embodiment.

Further, the target value of the second-type state quantity is a target value of the temporal change rate (first-order differential value) ↑S2'(=d↑S2/dt) of the second-type state quantity vector ↑S2 similarly to the first embodiment. In the present embodiment, however, the state quantity target value determining section 94 determines the plurality of types, for example, two types of target values ↑S2'_cmd1 and ↑S2'_cmd2 as target values of ↑S2' by individual processing.

In more detail, in the present embodiment, the state quantity target value determining section 94 determines the above two types of target values ↑S2'_cmd1 and ↑S2'_cmd2 as control inputs for causing the actual rotational angles of the respective joints (joint angle) of the robot 1 to follow required target values, respectively.

In this case, however, the target value ↑S2'_cmd1 out of the two types of target values ↑S2'_cmd1 and ↑S2'_cmd2 is determined directly (according to the feedforward law) from the time series of the target value of the joint angle without the feedback of the measurement values of the actual joint angles of the respective joints. Further, the target value ↑S2'_cmd2 is determined according to the feedback control law for carrying out the feedback of the measurement values of the actual joint angles of the respective joints. Hereinafter, ↑S2'_cmd1 and ↑S2'_cmd2 are referred to as the second-type state quantity FF target value vector ↑S2'_cmd1 and the second-type state quantity FB target value vector ↑S2'_cmd2, respectively.

The second-type state quantity FF target value vector ↑S2'_cmd1 and the second-type state quantity FB target value vector ↑S2'_cmd2 are specifically determined as described below.

Specifically, in the determination processing of the second-type state quantity FF target value vector ↑S2'_cmd1, the state quantity target value determining section 94 sequentially calculates the second-order differential value of the target value θcmd (the target angular acceleration of each joint defined by the time series of θcmd) on the basis of the time series of the target value θcmd of each joint angle of the robot 1 calculated by the same processing as the first embodiment in the contact region elastic deformation compensation section 98, and determines the vector composed of the calculated target angular accelerations of the respective joints as components to be the second-type state quantity FF target value vector ↑S2'_cmd1.

Moreover, in the determination processing of the second-type state quantity FB target value vector ↑S2'_cmd2, the state quantity target value determining section 94 determines the second-type state quantity FB target value vector ↑S2'_cmd2 by the same processing as the calculation processing of the second-type state quantity target value vector ↑S2'_cmd in the first embodiment. More specifically, the state quantity target value determining section 94 determines the second-type state quantity FB target value vector ↑S2'_cmd2 according to the PD law as the feedback control law (by the calculation of the right side of the above expression 4-4) from a vector ↑ΔΘ, which includes differences Δθ (=θcmd−θact) between the target value θcmd of the joint angle of each joint sequentially input from the contact region elastic deformation compensation section 98 and the measurement value of the actual rotational angle θact of each joint, and the first-order differential value ↑Θ' thereof. Therefore, ↑S2'_cmd2 is a target value vector which is determined such that θact of each joint converges to θcmd according to the feedback control law.

Moreover, the target value of the third-type state quantity is a target value of a temporal change rate (first-order differential value) ↑S3' (=d↑S3/dt) of the third-type state quantity vector ↑S3. In the present embodiment, the state quantity target value determining section 94 determines the plurality of types, for example, two types of target values ↑S3'_cmd1 and ↑S3'_cmd2 as the target values of ↑S3' by individual processing, similarly to the target value of ↑S2'.

In more detail, in the present embodiment, the state quantity target value determining section 94 determines the aforesaid two types of target values ↑S3'_cmd1 and ↑S3'_cmd2 as control inputs for causing the actual position and posture of the foot 18 of the leg 2 on the side of the idling leg of the robot 1 to follow predetermined target values.

In this case, however, the target value ↑S3'_cmd1 out of the two types of target values ↑S3'_cmd1 and ↑S3'_cmd2 is determined directly (according to the feedforward law) from the time series of the target position and the target posture of the foot 18 without the feedback of the measurement values of the actual position and posture of the foot 18 of the leg 2 on the side of the idling leg. Further, the target value ↑S3'_cmd2 is determined according to the feedback control law for feeding back the measurement values of the actual position and posture of the foot 18 of the leg 2 on the side of the idling leg.

Hereinafter, ↑S3'_cmd1 and ↑S3'_cmd2 are referred to as the third-type state quantity FF target value vector ↑S3'_cmd1 and the third-type state quantity FB target value vector ↑S3'_cmd2, respectively.

The third-type state quantity FF target value vector ↑S3'_cmd1 and the third-type state quantity FB target value vector ↑S3'_cmd2 are specifically determined as described below.

Specifically, the state quantity target value determining section 94 sequentially calculates the target position and the target posture of the foot 18 of the leg 2 on the side of the idling leg on the basis of the time series of the target value θcmd of the joint angle of each joint sequentially input from the contact region elastic deformation compensation section 98 (or on the basis of the time series of the target joint angle out of the target gait input from the gait generating section 71). FIG. 7 typically illustrates an example of a trajectory of the target position (the target position in the vertical direction) of the foot 18 on the side of the idling leg calculated as described above.

Moreover, the state quantity target value determining section 94 sequentially calculates the measurement values of the actual position and posture of the foot 18 of the leg 2 on the side of the idling leg on the basis of the time series of the measurement values of the actual joint angles of the respective joints of the robot 1.

Thereafter, in the determination processing of the third-type state quantity FF target value vector ↑S3'_cmd1, the state quantity target value determining section 94 sequentially calculates the second-order differential values of the target position and the target posture (the target translational acceleration of the foot 18 defined by the time series of the target position and the target angular acceleration of the posture of the foot 18 defined by the time series of the target posture) on the basis of the time series of the calculated target position and target posture of the foot 18 of the leg 2 on the side of the idling leg, and determines a vector composed of the calculated target translational acceleration and target angular acceleration as components to be a third-type state quantity FF target value vector ↑S3'_cmd1.

Figure 7:
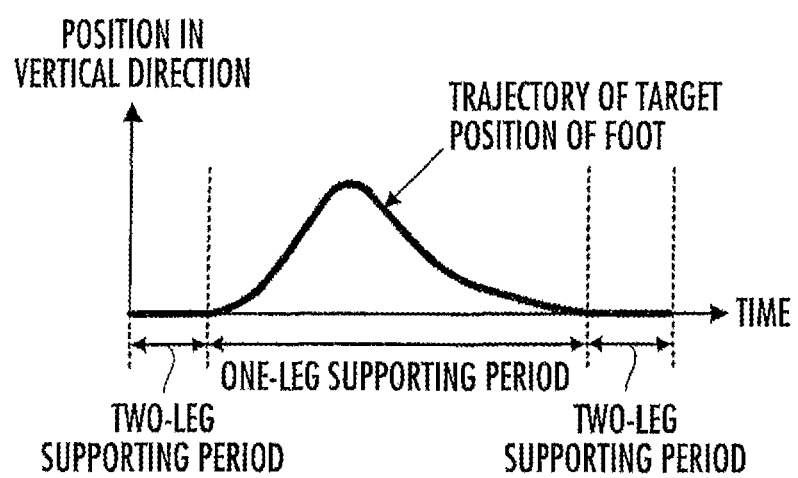
FIG. 7 is a graph illustrating an example of a trajectory of the target position of a foot portion illustrated in FIG. 1.

For example, in an example of the trajectory of the target position illustrated in FIG. 7, the vertical component of the target translational acceleration of the third-type state quantity FF target value vector ↑S3'_cmd1 is determined to be a value derived by calculating the second-order differential value of the illustrated trajectory.

Moreover, in the determination processing of the third-type state quantity FB target value vector ↑S3'_cmd2, the state quantity target value determining section 94 calculates a difference ↑ΔXfoot between each of the calculated target position and target posture of the foot 18 of the leg 2 on the side of the idling leg and each of the measurement value of the actual position and the measurement value of the actual posture of the foot 18 and the first-order differential value ↑ΔXfoot of the difference ↑ΔXfoot.

In addition, the above difference ↑ΔX is a vector in which there are arranged a difference (a difference with three degrees of freedom) between the target position and the measurement value of the actual position of the foot 18 of the leg 2 on the side of the idling leg and the difference (three degrees of freedom difference) between the target posture and the measurement value of the actual posture of the foot 18.

Furthermore, the state quantity target value determining section 94 calculates a feedback manipulated variable for converging the aforesaid difference ↑ΔX of each joint to zero according to the predetermined feedback control law and then determines the calculated feedback manipulated variable as the third-type state quantity FB target value vector ↑S3'_cmd2.

In this case, to be more specific, the state quantity target value determining section 94 determines ↑S3'_cmd2 such that the above difference ↑ΔX is converged to zero according to the PD law (proportional-derivative law). In other words, the state quantity target value determining section 94 determines ↑S3'_cmd2 from the aforesaid difference ↑ΔX and the first-order differential value ↑ΔX' thereof according to the following expression 4-5.

$$\uparrow S3'cmd2 = Kp4 * \uparrow \Delta Xfoot + Kv4 * \uparrow \Delta Xfoot' \qquad \text{Expression 4-5}$$

In addition, Kp4 and Kv4 in expression 4-5 denote a proportional gain and a differential gain, respectively, of predetermined values set beforehand. These gains Kp4 and Kv4 are expressed by diagonal matrices (diagonal matrices of the same order as ↑S3'cmd2).

Supplementarily, in the determination processing of the third-type state quantity FF target value vector ↑S3'_cmd1 and the third-type state quantity FB target value vector ↑S3'_cmd2, the determination of which one of the right leg 2R and the left leg 2L is the idling leg is made on the basis of, for example, the detection outputs of the force sensors 62R and 62L or the target gait given to the target joint drive torque determining section 90 by the gait generating section 71.

Moreover, in the two-leg supporting period in which the feet 18R and 18L of both legs 2R and 2L are in contact with the floor during the walking motion of the robot 1, the state quantity target value determining section 94 discontinues the processing for determining ↑S3'_cmd1 and ↑S3'_cmd2.

This completes the detailed description of the processing carried out by the state quantity target value determining section 94 in the present embodiment.

Subsequently, the section for determining control inputs classified by state quantity 95 in the present embodiment sequentially carries out the processing for determining the target joint drive torque of each joint of the robot 1, for each target value vector, as control inputs (control inputs for motion control of an actuator (electric motor 50)) necessary to achieve the target values of the aforesaid three types of state quantities, namely, the first-type state quantity target value vector ↑S1'_cmd, the second-type state quantity FF target value vector ↑S2'_cmd1, the second-type state quantity FB target value vector ↑S2'_cmd2, the third-type state quantity FF target value vector ↑S3'_cmd1, and the third-type state quantity FB target value vector ↑S3'_cmd2.

Hereinafter, vectors in which there are arranged target joint drive torques of the respective joints corresponding to the aforesaid ↑S1'_cmd, ↑S2'_cmd1, ↑S2'_cmd2, ↑S3'_cmd1, and ↑S3'_cmd2, respectively, as components are denoted by the first target joint drive torque ↑τ1_cmd, the second FF target joint drive torque ↑τ2_cmd1, the second FB target joint drive torque ↑τ2_cmd2, the third FF target joint drive torque ↑τ3_cmd1, and the third FB target joint drive torque ↑τ3_cmd2, respectively.

In the description of the present embodiment, ↑τ1_cmd, ↑τ2_cmd1, ↑τ2_cmd2, ↑τ3_cmd1, and ↑τ3_cmd2 are assumed to be vectors of the same order as the driving force-dependent generalized force vector ↑τ (the same order as the generalized variable vector ↑q), similarly to the ↑τ1_cmd and ↑τ2_cmd in the first embodiment.

As with the first embodiment, the section for determining control inputs classified by state quantity 95 calculates ↑τ1_cmd, ↑τ2_cmd1, ↑τ2_cmd2, ↑τ3_cmd1, and ↑τ3_cmd2 by using the above expression 5-22. The calculation is carried out in the same method as in the first embodiment.

In more detail, the section for determining control inputs classified by state quantity 95 sequentially receives the inertia matrix M determined by the basic parameter group determining section 91, the centrifugal force/Coriolis force-dependent generalized force vector ↑N and the gravity-dependent generalized force vector ↑G (or nonlinear term generalized force vector (↑N+↑G)), the contact area Jacobian Jc determined by the contact area Jacobian determining section 92, the state quantity Jacobians Js1, Js2, and Js3 corresponding to the respective types of state quantities determined by the state quantity Jacobian determining section 93, and the target value vectors ↑S1'_cmd, ↑S2'_cmd1, ↑S2'_cmd2, ↑S3'_cmd1, and ↑S3'_cmd2 determined by the state quantity target value determining section 94, in order to calculate the target joint drive torques ↑τ1'_cmd, ↑τ2_cmd1, ↑τ2_cmd2, ↑τ3_cmd1, and ↑τ3_cmd2.

In addition, the section for determining control inputs classified by state quantity 95 sequentially receives the measurement values of the temporal change rate (first-order differential value) ↑q' of the generalized variable vector ↑q (the measurement values of the moving velocity of the lower body 10 and the temporal change rate of the posture angle (angular velocity), and the measurement value of the temporal change rate of the rotational angle (angular velocity) of each joint) and also receives the contact area representative point target acceleration ↑C. The contact area representative point target acceleration ↑C in the present embodiment is the same as that of the first embodiment (zero vector).

Then, the section for determining control inputs classified by state quantity 95 calculates the matrices Tc and Pc and the generalized force vector ↑τcmpn by using the inertia matrix M, the centrifugal force/Coriolis force-dependent generalized force vector ↑N and the gravity-dependent generalized force vector ↑G (or the nonlinear term generalized force vector (↑N+↑G)), the contact area Jacobian Jc, and the contact area representative point target acceleration ↑C having been received. The calculation is made in the same manner as in the first embodiment.

Moreover, the section for determining control inputs classified by state quantity 95 calculates the matrices Bs (Bs1, Bs2, and Bs3) on the right side of the above expression 5-22 corresponding to the first-type state quantity, the second-type state quantity, and the third-type state quantity, respectively, in the same manner as in the first embodiment.

Specifically, the matrix Bs1 corresponding to the first-type state quantity is calculated from the inertia matrix M, the first state quantity Jacobian Js1, and the calculated value of the matrix Pc having been received according to the above expression 5-21a or 5-21b.

Moreover, the matrix Bs2 corresponding to the second-type state quantity is calculated from the calculated values of the inertia matrix M, the second state quantity Jacobian Js2, and the matrix Pc, which have been received, according to the above expression 5-21a or 5-21b.

Moreover, the matrix Bs3 corresponding to the third-type state quantity is calculated from the calculated values of the inertia matrix M, the third state quantity Jacobian Js3, and the matrix Pc, which have been received, according to the above expression 5-21a or 5-21b.

Thereafter, the section for determining control inputs classified by state quantity 95 calculates ↑τ by carrying out an arithmetic operation of the right side of the above expression 5-22 (specifically, the calculation of an expression in which Bs, ↑S', Js, Js', and ↑q' on the right side of expression 5-22 are replaced by the measurement values of Bs1, ↑S1'_cmd, Js1, Js1', and ↑q', respectively) by using the calculated values of Bs1, Tc, and ↑τcmpn and the received first-type state quantity target value vector ↑S1'_cmd, first state quantity Jacobian Js1, and inertia matrix M, and the measurement value of ↑τ' and then determines the calculated value of ↑τ to be the first target joint drive torque ↑τ1_cmd.

In this case, ↑τ1_cmd is determined such that the motion accelerations of the contact area representative points a1 to a4 coincide with the accelerations defined by the contact area representative point target acceleration ↑C while the temporal change rate ↑S1' of the first-type state quantity vector ↑S1 coincides with the first-type state quantity target value vector ↑S1'_cmd, which is determined such that the overall center-of-gravity point of the robot 1 is maintained at a proper position.

Moreover, the section for determining control inputs classified by state quantity 95 calculates ↑τ by carrying out the calculation of the right side of the above expression 5-22 (specifically, the calculation of an expression in which Bs, ↑S', Js, Js', and ↑q' on the right side of expression 5-22 are replaced by the measurement values of Bs2, ↑S2'_cmd1, Js2, Js2', and ↑q', respectively) by using the calculated values of Bs2, Tc, and ↑τcmpn and the received second-type state quantity FF target value vector ↑S2'_cmd1, second state quantity Jacobian Js2, and inertia matrix M, and the measurement value of ↑q' and then determines the calculated value of ↑τ to be the second FF target joint drive torque ↑τ2_cmd1.

In this case, ↑τ2_cmd1 is determined such that the motion accelerations of the contact area representative points a1 to a4 coincide with the accelerations defined by the contact area representative point target acceleration IC while the temporal change rate ↑S2' of the second-type state quantity vector ↑S2 coincides with the second-type state quantity FF target value vector ↑S2'_cmd1, which is determined according to the feedforward law so that the actual joint angle of each joint of the robot 1 follows the target value.

Moreover, the section for determining control inputs classified by state quantity 95 calculates ↑τ by carrying out the calculation of the right side of the above expression 5-22 (specifically, the calculation of an expression in which Bs, ↑S', Js, Js', and ↑q' on the right side of expression 5-22 are replaced by the measurement values of Bs2, ↑S2'_cmd2, Js2, Js2', and ↑q', respectively) by using the calculated values of Bs2, Tc, and ↑τcmpn and the received second-type state quantity FB target value vector ↑S2'_cmd2, second state quantity Jacobian Js2, and inertia matrix M, and the measurement value of ↑q' and then determines the calculated value of ↑τ to be the second FB target joint drive torque ↑τ2_cmd2.

In this case, ↑τ2_cmd2 is determined such that the motion accelerations of the contact area representative points a1 to a4 coincide with the accelerations defined by the contact area representative point target acceleration ↑C while the temporal change rate ↑S2' of the second-type state quantity vector ↑S2 coincides with the second-type state quantity FB target value vector ↑S2'_cmd2, which is determined according to the feedback control law (PD law) so that the actual joint angle of each joint of the robot 1 follows the target value.

Moreover, the section for determining control inputs classified by state quantity 95 calculates ↑τ by carrying out the calculation of the right side of the above expression 5-22 (specifically, the calculation of an expression in which Bs, ↑S', Js, Js', and ↑q' on the right side of expression 5-22 are replaced by the measurement values of Bs3, ↑S3'_cmd1, Js3, Js3', and ↑q', respectively) by using the calculated values of Bs3, Tc, and ↑τcmpn and the received third-type state quantity FF target value vector ↑S3'_cmd1, third state quantity Jacobian Js3, and inertia matrix M, and the measurement value of ↑q' and then determines the calculated value of ↑τ to be the third FF target joint drive torque ↑τ3_cmd1.

In this case, ↑τ3_cmd1 is determined such that the motion accelerations of the contact area representative points a1 to a4 coincide with the accelerations defined by the contact area representative point target acceleration ↑C while the temporal change rate ↑S3' of the third-type state quantity vector ↑S3 coincides with the third-type state quantity FF target value vector ↑S3'_cmd1, which is determined according to the feedforward law so that the actual position and posture of the foot 18 of the leg 2 on the side of the idling leg follow the target position and the target posture, respectively.

Moreover, the section for determining control inputs classified by state quantity 95 calculates ↑τ by carrying out the calculation of the right side of the above expression 5-22 (specifically, the calculation of an expression in which Bs, ↑S', Js, Js', and ↑q' on the right side of expression 5-22 are replaced by the measurement values of Bs3, ↑S3'_cmd2, Js3, Js3', and ↑q', respectively) by using the calculated values of Bs3, Tc, and ↑τcmpn and the received third-type state quantity FB target value vector ↑S3'_cmd2, third state quantity Jacobian Js3, and inertia matrix M, and the measurement value of ↑q' and then determines the calculated value of ↑τ to be the third FB target joint drive torque ↑τ3_cmd2.

In this case, ↑τ3_cmd2 is determined such that the motion accelerations of the contact area representative points a1 to a4 coincide with the accelerations defined by the contact area representative point target acceleration ↑C while the temporal change rate ↑S3' of the third-type state quantity vector ↑S3 coincides with the third-type state quantity FB target value vector ↑S3'_cmd2, which is determined according to the feedback control law so that the actual position and posture of the foot 18 of the leg 2 on the side of the idling leg follow the target position and the target posture, respectively.

The aforesaid Js1' (=the first-order differential value of Js2), Js2' (=the first-order differential value of Js2), and Js3' (=the first-order differential value of Js3) are calculated from the time series of the first state quantity Jacobian Js1, the time series of the second state quantity Jacobian Js2, and the time series of the third state quantity Jacobian Js3, respectively.

This completes the detailed description of the processing carried out by the section for determining control inputs classified by state quantity 95 in the present embodiment.

Moreover, the synthesized control input determining section 96 in the present embodiment sequentially determines the synthesized target joint drive torque (synthesized target joint drive torque ↑τt_cmd) of each joint by sequentially synthesizing the first target joint drive torque ↑τ1_cmd, the second FF target joint drive torque ↑τ2_cmd1, the second FB target joint drive torque ↑τ2_cmd2, the third FF target joint drive torque ↑τ3_cmd1, and the third FB target joint drive torque ↑τ3_cmd2, which have been determined by the section for determining control inputs classified by state quantity 95.

In addition, ↑τt_cmd in the present embodiment is assumed to be a vector of the same order as that of the aforesaid driving force-dependent generalized force vector ↑τ (the same order as that of the generalized variable vector ↑q), as with the first embodiment.

In the present embodiment, the synthesized control input determining section 96 determines the synthesized target joint drive torque ↑τt_cmd by synthesizing vectors ↑τf1a and ↑τf2a, which are calculated by arithmetic processing of the following expressions 6-8 and 6-9, respectively, by arithmetic processing of expression 6-7.

$$\uparrow \tau t\_cmd = W1*\uparrow \tau f1a + W2*\uparrow \tau f2a \qquad \text{Expression 6-7}$$

where $$\uparrow \tau f1a = wc3*\uparrow \tau 3\_cmd1 + Nuw3*wc1*\uparrow \tau 1\_cmd + Nuw3*Nuw1*wc2*\uparrow \tau 2\_cmd1 \qquad \text{Expression 6-8}$$

$$\uparrow \tau f2a = wc3*\uparrow \tau 3\_cmd2 + Nuw3*wc1*\uparrow \tau 1\_cmd + Nuw3*Nuw1*wc2*\uparrow \tau 2\_cmd2 \qquad \text{Expression 6-9}$$

Here, W1 and W2 in expression 6-7 are frequency weights having frequency pass characteristics different from each other. In this case, in the present embodiment, the characteristics of the frequency weights W1 and W2 are the same as those of the first embodiment. In other words, W1 and W2 are frequency weights whose transfer functions are expressed by the above expressions 6-5 and 6-6, respectively.

Moreover, wc1, wc2, and wc3 in expressions 6-8 and 6-9 denote weight coefficients set within a range of zero to one. In this case, the weight coefficient wc1 corresponds to the first target joint drive torque ↑τ1_cmd related to the first-type state quantity and is fixedly set to one in the present embodiment.

Moreover, the weight coefficient wc2 denotes a weight coefficient corresponding to the second FF target joint drive torque ↑τ2_cmd1 and the second FB target joint drive torque ↑τ2_cmd2 related to second-type state quantity and is fixedly set to one in the present embodiment.

Figure 8:
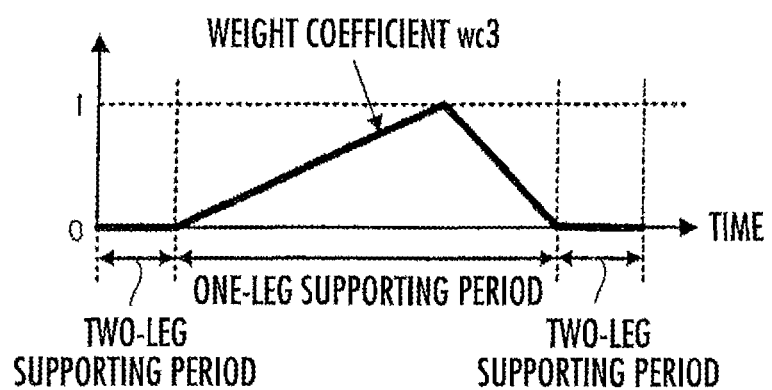
FIG. 8 is a graph illustrating an example of the setting of a weight coefficient w3 used in the second embodiment.

Moreover, the weight coefficient wc3 denotes a weight coefficient corresponding to the third FF target joint drive torque ↑τ3_cmd1 and the third FB target joint drive torque ↑τ3_cmd2 related to the third-type state quantity and is variably set, for example, as illustrated in FIG. 8.

To be more specific, the synthesized control input determining section 96 in the present embodiment sets the value of the weight coefficient wc3 so that the value of wc3 continuously increases from zero to one and then continuously decreases from one to zero in a period in which the foot 18 of the leg 2 on the side of the idling leg moves in the air (one-leg supporting period) as illustrated in FIG. 8. In addition, in a two-leg supporting period in which the feet 18R and 18L of the both legs 2R and 2L are in contact with the floor, the synthesized control input determining section 96 steadily maintains the value of the weight coefficient wc3 at zero.

In the example illustrated in FIG. 8, the value of the weight coefficient wc3 is set so as to increase continuously to one and then immediately decrease continuously in the one-leg supporting period, but may be set so as to be maintained at one in the middle of the one-leg supporting period. Moreover, the continuous increase or decrease of the wc3 value is not limited to the linear form as illustrated in FIG. 8, but the wc3 value may increase and decrease along a curve (the temporal change rate of the wc3 value may gradually change).

Moreover, Nuw1 in expressions 6-8 and 6-9 is a matrix defined by the following expression 6-10 according to the first state quantity Jacobian Js1, a matrix Js1# defined by the following expression 6-10-1, and the weight coefficient wc1. Furthermore, Nuw3 in expressions 6-8 and 6-9 is a matrix defined by the following expression 6-11 according to the third state quantity Jacobian Js3, a matrix Js3# defined by the following expression 6-11-1, and the weight coefficient wc3. Expression 6-10-1 is the same expression as the above expression 6-4-1.

$$Nuw1 = I - wc1*Js1^T*Js1\#^T \qquad \text{Expression 6-10}$$

where $$Js1\# = Wat^T*Js1^T*(Js1*Wat*Js1^T)^{-1} \qquad \text{Expression 6-10-1}$$

$$Nuw3 = I - wc3*Js3^T*Js3\#^T \qquad \text{Expression 6-11}$$

where $$Js3\# = Wat^T*Js3^T*(Js3*Wat*Js3^T)^{-1} \qquad \text{Expression 6-11-1}$$

Wat in expressions 6-10-1 and 6-11-1 is a weight matrix (diagonal matrix). In the present embodiment, the inverse matrix M−1 of the inertia matrix M is used as the weight matrix Wat, as with the first embodiment.

Here, Nuw1 and Nuw3 are matrices defined as described above, and therefore a generalized force vector (Nuw3*wc1*↑τ1_cmd) in the second term of expression 6-8, is a generalized force vector capable of making the control state of the third-type state quantity vector ↑S3 the same both in the case where the joint drive torque of each joint of the robot 1 is controlled to wc31*↑τ3_cmd and where the joint drive torque of each joint of the robot 1 is controlled to wc31*↑τ3_cmd1+Nuw3*wc1*↑τ1_cmd.

Moreover, the generalized force vector (Nuw3*Nuw1*wc21*↑τ2_cmd1) in the third term in expression 6-8 is a generalized force vector capable of making the control states of the third-type state quantity vector ↑S3 and the first-type state quantity vector ↑S1 the same both in the case where the joint drive torque of each joint of the robot 1 is controlled to (wc31*↑τ3_cmd1+Nuw3*wc1*↑τ1_cmd) and where the joint drive torque of each joint of the robot 1 is controlled to ↑τf1a determined by the above expression 6-8.

Therefore, ↑τf1a determined by expression 6-8 has a meaning of a target joint drive torque derived by superimposing (adding up) the components of the first target joint drive torque ↑τ1_cmd for achieving the first-type state quantity target value vector ↑S1'_cmd on the third FF target joint drive torque ↑τ3_cmd1 for achieving the third-type state quantity target value vector ↑S3'_cmd within a range of not affecting the third-type state quantity vector ↑S3 and further superimposing (adding up) the components of the second FF target joint drive torque ↑τ2_cmd1 for achieving the second-type state quantity target value vector ↑S2'_cmd within a range of not affecting the third-type state quantity vector ↑S3 and the first-type state quantity vector ↑S1.

Similarly, ↑τf2a determined by expression 6-9 has a meaning of a target joint drive torque derived by superimposing (adding up) the components of the first target joint drive torque ↑τ1_cmd for achieving the first-type state quantity target value vector ↑S1'_cmd on the third FB target joint drive torque ↑τ3_cmd2 for achieving the third-type state quantity target value vector ↑S3'_cmd within a range of not affecting the third-type state quantity vector ↑S3 and further superimposing (adding up) the components of the second FB target joint drive torque ↑τ2_cmd2 for achieving the second-type state quantity target value vector ↑S2'_cmd within a range of not affecting the third-type state quantity vector ↑S3 and the first-type state quantity vector ↑S1.

As described above, the synthesized control input determining section 96 in the present embodiment determines the synthesized target joint drive torque ↑τt_cmd by synthesizing ↑τf1a and ↑τf2a calculated according to the above expressions 6-8 and 6-9, which include the weight coefficients wc1, wc2, and wc3, by using the above expression 6-7.

In this case, the synthesized target joint drive torque ↑τt_cmd is determined as a result of synthesizing (adding up) the components on the high-frequency side (components in the pass frequency band with the frequency weight W1) of ↑τf1a and the components on the low-frequency side (components in the pass frequency band with the frequency weight W2) of ↑τf2a. Further, ↑τf1a composed of the aforesaid components on the high frequency side is determined as a target joint drive torque derived by adding components not affecting ↑S3' out of the first target joint drive torque ↑τ1_cmd and components not affecting ↑S3' and ↑S1' out of the second FF target joint drive torque ↑τ2_cmd1 to the third FF target joint drive torque ↑τ3_cmd1. Moreover, ↑τf2a composed of the aforesaid components on the low frequency side is determined as a target joint drive torque derived by adding components not affecting ↑S3' out of the first target joint drive torque ↑τ1_cmd and components not affecting ↑S3' and ↑S1' out of the second FB target joint drive torque ↑τ2_cmd2 to the third FB target joint drive torque ↑τ3_cmd2.

Supplementarily, in the two-leg supporting period of the robot 1 in the present embodiment, the weight coefficient wc3 is set to zero, and therefore Nuw3=identity matrix I applies. Moreover, in the present embodiment, wc1=wc2=1 applies. Therefore, in the two-leg supporting period, expressions 6-8 and 6-9 coincide with the following expressions 6-8a and 6-9a derived by eliminating the target joint drive torques ↑τ3_cmd1 and ↑τ3_cmd2 related to the third-type state quantity therefrom.

$$\uparrow \tau f1a = \uparrow \tau 1\_cmd + Nuw1 * \uparrow \tau 2\_cmd1 \quad \text{Expression 6-8a}$$

$$\uparrow \tau f2a = \uparrow \tau 1\_cmd + Nuw1 * \uparrow \tau 2\_cmd2 \quad \text{Expression 6-9a}$$

Therefore, in the two-leg supporting period, the third-type state quantity is substantially eliminated from the controlled object.

This completes the detailed description of the processing carried out by the synthesized control input determining section 96 in the present embodiment. The present embodiment is the same as the first embodiment except the above description.

According to the embodiments described hereinabove, in the one-leg supporting period of the robot 1, the components on the high-frequency side (W1*↑τf1a) of the synthesized target joint drive torque ↑τt_cmd include the components on the high-frequency side of the third FF target joint drive torque ↑τ3_cmd1 as major components, and the components on the low-frequency side (W2*↑τf2a) of the synthesized target joint drive torque ↑τt_cmd include the components on the low-frequency side of the third FB target joint drive torque ↑τ3_cmd2 as major components.

Therefore, the drive torque of each joint of the robot 1 can be controlled while achieving the aforesaid third-type state quantity FF target value vector ↑S3'_cmd1 (controlling the position and posture of the foot 18 of the leg 2 on the side of the idling leg of the robot 1 to the target position and posture according to the feedforward law) with a high quick reaction capability and, in the long term, achieving the third-type state quantity FB target value vector ↑S3'_cmd2 (by extension, feedback-controlling the position and posture of the foot 18 on the leg 2 on the side of the idling leg of the robot 1 to the target position and posture).

This enables a proper motion of the foot 18 on the side of the idling leg, thereby effectively preventing the landing position and the landing posture of the foot 18 from deviating from the target position and the target posture.

Furthermore, in the one-leg supporting period, the components on the high-frequency side (W1*↑τf1a) of the synthesized target joint drive torque ↑τt_cmd include components not affecting the third-type state quantity vector ↑S3 out of the components on the high-frequency side of the first target joint drive torque ↑τ1_cmd and components not affecting the third-type state quantity vector ↑S3 and the first-type state quantity vector ↑S1 out of the components on the high-frequency side of the second FF target joint drive torque ↑τ2_cmd1.

Similarly, the components on the low-frequency side (W2*↑τf2a) of the synthesized target joint drive torque ↑τt_cmd include components not affecting the third-type state quantity vector ↑S3 out of the components on the low-frequency side of the first target joint drive torque ↑τ1_cmd and components not affecting the third-type state quantity vector ↑S3 and the first-type state quantity vector ↑S1 out of the components on the high-frequency side of the second FB target joint drive torque ↑τ2_cmd2.

Therefore, the controllability of the temporal change rate ↑S1' of the first-type state quantity vector ↑S1 can be increased without deteriorating the controllability of the temporal change rate ↑S3' of the third-type state quantity vector ↑S3, and the controllability of the temporal change rate ↑S2' of the second-type state quantity vector ↑S2 can be increased without deteriorating the controllability of the temporal change rate ↑S3' of the third-type state quantity vector ↑S3 and the controllability of the temporal change rate ↑S1' of the first-type state quantity vector ↑S1.

In this case, regarding the controllability of the temporal change rate ↑S1' of the first-type state quantity vector ↑S1, the aforesaid first-type state quantity target value vector ↑S1'_cmd can be achieved (by extension, the position of the overall center-of-gravity of the robot 1 can be controlled) properly both on the high-frequency side and on the low-frequency side.

Moreover, regarding the controllability of the temporal change rate ↑S2' of the second-type state quantity vector ↑S2, the second-type state quantity FF target value vector ↑S2'_cmd1 can be achieved (the joint angle of each joint of the robot 1 can be controlled to a target joint angle according to the feedforward law) with a high quick reaction capability, and in the long term the second-type state quantity FB target value vector ↑S2'_cmd2 can be achieved (the joint angle of each joint of the robot 1 can be feedback controlled to the target joint angle).

On the other hand, in the two-leg supporting period of the robot 1, the components on the high-frequency side (W1*↑τf1a) and the components on the low frequency side (W2*↑τf2a) of the synthesized target joint drive torque ↑τt_cmd include the components on the high-frequency side and the low-frequency side of the first target joint drive torque ↑τ1_cmd, respectively, as major components.

Therefore, the first-type state quantity target value vector ↑S1'_cmd can be achieved (by extension, the position of the overall center-of-gravity of the robot 1 can be controlled to the target position) properly both on the high-frequency side and on the low-frequency side.

Furthermore, in the two-leg supporting period, the components on the high-frequency side (W1*↑τf1a) of the synthesized target joint drive torque ↑τt_cmd include the components not affecting the first-type state quantity vector ↑S1 out of the components on the high-frequency side of the second FF target joint drive torque ↑τ2_cmd1. Similarly, the components on the low-frequency side (W2*↑τf2a) of the synthesized target joint drive torque ↑τt_cmd include the components not affecting the first-type state quantity vector ↑S1 out of the components on the low-frequency side of the second FB target joint drive torque ↑τ2_cmd2.

Therefore, the second-type state quantity FF target value vector ↑S2'_cmd1 can be achieved (the joint angle of each joint of the robot 1 can be controlled to the target joint angle according to the feedforward law) with a high quick reaction capability without deteriorating the controllability of the temporal change rate ↑S1' of the first-type state quantity vector ↑S1, and in the long term the second-type state quantity FB target value vector ↑S2'_cmd2 can be achieved (the joint angle of each joint of the robot 1 can be feedback controlled to the target joint angle).

In addition, in the two-leg supporting period, the third-type state quantity is substantially removed from the controlled objects, by which the synthesized target joint drive torque ↑τt_cmd is not dependent on the third FF target joint drive torque ↑τ3_cmd1 and the third FB target joint drive torque ↑τ3_cmd2. Therefore, in the two-leg supporting period, the position and posture of each foot 18, namely, the foot 18 in contact with the floor surface and subjected to constraint can be prevented from being controlled to be forcibly corrected to the target position and posture. This prevents an occurrence of a situation where the electric motor 50 is requested to supply an excess motive power (torque).

Furthermore, the weight coefficient wc3 is set such that the value thereof continuously changes, thereby preventing the synthesized target joint drive torque ↑τt_cmd from changing in a discontinuous manner in the vicinity of changeover between the one-leg supporting period in which the third-type state quantity is included as a controlled object and the two-leg supporting period in which the third-type state quantity is removed from the controlled objects, so that the synthesized target joint drive torque ↑τt_cmd can be continuously changed. As a result, the robot 1 is able to operate smoothly.

Moreover, in the present embodiment, the target joint drive torques ↑τ1_cmd, ↑τ2_cmd1, ↑τ2_cmd2, ↑τ3_cmd1, and ↑τ3_cmd2 are determined on the basis of the above expression 5-20. Therefore, similarly to the first embodiment, this enables the determination of proper target joint drive torques ↑τ1_cmd, ↑τ2_cmd1, ↑τ2_cmd2, ↑τ3_cmd1, and ↑τ3_cmd2 that allow ↑S1'_cmd, ↑S2'_cmd1, ↑S2'_cmd2, ↑S3'_cmd1, and ↑S3'_cmd2 to be achieved, respectively, without identifying the value of an external force acting on the robot 1 (which is susceptible to the influence of a disturbance or the like).

Here, the relationship of correspondence between the embodiment described above and the present invention will be supplementarily described.

In the present embodiment, the section for determining control inputs classified by state quantity 95 implements the element for determining control inputs classified by state quantity in the present invention. In this case, the first-type state quantity, the second-type state quantity, and the third-type state quantity correspond to the plurality of types of state quantities in the present invention. Therefore, in the present embodiment, the number of types of state quantities M is three.

Further, the first-type state quantity target value vector ↑S1'_cmd corresponds to two target values of the first-type state quantity, and the first target joint drive torque ↑τ1_cmd corresponds to the control inputs classified by state quantity for achieving ↑τS1'_cmd.

Moreover, the second-type state quantity FF target value vector ↑S2'_cmd1 and the second-type state quantity FB target value vector ↑S2'_cmd2 correspond to two target values of the second-type state quantity, and the second FF target joint drive torque ↑τ2_cmd1 and the second FB target joint drive torque ↑τ2_cmd2 correspond to the control inputs classified by state quantity for achieving ↑S2'_cmd1 and ↑S2'_cmd2, respectively.

Moreover, the third-type state quantity FF target value vector ↑S3'_cmd1 and the third-type state quantity FB target value vector ↑S3'_cmd2 correspond to two target values of the third-type state quantity, and the third FF target joint drive torque ↑τ3_cmd1 and the third FB target joint drive torque ↑τ3_cmd2 correspond to the control inputs classified by state quantity for achieving ↑S3'_cmd1 and ↑S3'_cmd2, respectively.

Moreover, the synthesized control input determining section 96 implements the synthesized control input determining element in the present invention. In this case, the synthesized target joint drive torque ↑τt_cmd calculated by the processing expressed by the above expression 6-7 corresponds to the synthesized control input τtotal in the present invention, W1*↑τf1a and W2*↑τf2a in expression 6-7 correspond to the control inputs classified by frequency region (W(i)*τf(i)) in the present invention, and the respective passable frequency bands with the frequency weights W1 and W2 correspond to the frequency regions in the present invention. In the present embodiment, the number of frequency regions n is two.

Moreover, in the present embodiment, ↑τf1a and ↑τf2a correspond to τf(i) in the present invention (in the above expressions 01 and 02b), respectively. In this case, ↑τ3_cmd1, ↑τ1_cmd, and ↑τ2_cmd1 correspond to composition components τ(1, 1), τ(1, 2), and τ(1, 3) of ↑τf1a(τf(1)), respectively. The matrices Nuw3 and Nuw1 correspond to Nuw(1, 1 and Nuw(1, 2 in the present invention, and the weight coefficients wc3, wc1, and wc2 correspond to wc(1, 1), wc(1, 2), and wc(1, 3) in the present invention, respectively.

Further, ↑τ3_cmd2, ↑τ1_cmd, and ↑τ2_cmd2 correspond to composition component τ(2, 1, τ(2, 2, and τ(2, 3 of ↑τf2a (τf(2)), respectively. In this case, ↑τ3_cmd2, ↑τ1_cmd, and ↑τ2_cmd2 correspond to composition component τ(2, 1, τ(2, 2, and τ(2, 3) of ↑τf2a(τf(2)), respectively. The matrices Nuw3 and Nuw1 correspond to Nuw(2, 1 and Nuw(2, 2 in the present invention, respectively, and the weight coefficients wc3, wc1, and wc2 correspond to wc(2, 1), wc(2, 2), and wc(2, 3) in the present invention, respectively.

Furthermore, in the present embodiment, rank(Nuw3) out of the respective ranks rank(Nuw3) and rank(Nuw1) of the matrices Nuw3 and Nuw1 is five or six for the most of the postures of the robot 1 and rank(Nuw1) is six. Therefore, the relationship satisfying rank(Nuw(1, 1)≥rank(Nuw(1, 2) and the relationship satisfying rank(Nuw(2, 1))≥rank(Nuw(2, 2) are achieved.

In the present embodiment, the number of composition components m(1) of ↑τf1a(τf(1)) and the number of components m(2) of ↑τf2a(τf(2)) are both one.

Moreover, in the present embodiment, the matrices Js1# and Js2# correspond to Js#(i, j) in the present invention, respectively. Js1 and Js2 correspond to Js(i, j) in the present invention, respectively, and ↑S1, ↑S2, and ↑S3 correspond to S(i, j) in the present invention. Further, M and ↑q in the present invention correspond to the inertia matrix M and the generalized variable vector q in the present invention, respectively. In the present embodiment, the weight matrix Wd in the present invention is an identity matrix and Wat=M$^{-1}$ applies.

Furthermore, the compliance control section 97 and the joint drive control section 73 in the present embodiment implement the actuator control element in the present invention.

Moreover, in the present embodiment, the legs 2R and 2L correspond to predetermined areas in the present invention, and the floor in the walking motion of the robot 1 corresponds to the portion to be contacted in the present invention. In addition, the third-type state quantity (↑S3) corresponds to the motion state quantity of the predetermined area in the present invention, and the third FF target joint drive torque ↑τ3_cmd1 and the third FB target joint drive torque ↑τ3_cmd2 correspond to the (ia, ja)-th control input classified by state quantity τ(ia, ja) in the present invention. Moreover, wc3 corresponds to the weight coefficient corresponding to τ(ia, ja).

[About Modifications]

The following describes some modifications of the embodiments described above.

In each of the aforesaid embodiments, the robot 1 is a bipedal walking robot, which is a legged mobile robot. The robot in the present invention, however, may be a mobile robot other than a legged mobile robot (e.g., a robot that moves on wheels). Alternatively, the robot in the present invention may be an installed robot, any one of links of which is fixed to a floor or the like.

Moreover, the actuator of the robot 1 is not limited to the electric motor 50, but may be a hydraulic actuator.

Further, the present invention is not limited to a walking motion, but may be applied to a running motion or a working motion with hands 30R and 30L in parallel with a moving operation.

In the first embodiment to which the above expressions 01 and 01a in the present invention are applied, the state quantities of the controlled object are two types of state quantities, namely the first-type state quantity and the second-type state quantity. A greater variety of state quantities, however, may be used for the controlled object. More specifically, for example, a temporal change rate (angular velocity) of the posture of the head 5 (the posture about two axes, namely, the pitch axis and the yaw axis) of the robot 1 may be added to the state quantities of the controlled object. The following describes an example of calculating the synthesized target joint drive torque ↑τt_cmd (synthesized control input) in this case.

It is assumed that the angular velocity of the posture of the head 5 of the robot 1 (the angular velocity about two axes, namely, the pitch axis and the yaw axis, here) is the fourth-type state quantity and that a vector in which two components of the fourth-type state quantity are arranged is a fourth-type state quantity vector ↑S4 and a Jacobian representing the relationship between ↑S4 and the first-order differential value ↑q' of the generalized variable vector ↑q by the following expression 3-4 is a fourth-state quantity Jacobian Js4.

$$\uparrow S4 = Js4 * \uparrow q' \qquad \text{Expression 3-4}$$

Further, assuming that the target value ↑S4'_cmd of the first-order differential value ↑S4' of ↑S4 is a target value of the fourth type state quantity, the target value ↑S4'_cmd is sequentially determined from a difference ΔXhead between the measurement value Xhead_act of an actual posture of the head 5 and a target value Xhead_cmd for the posture (=Xhead_act−Xhead_cmd) and the first-order differential value ΔXhead' of the difference ΔXhead according to the feedback control law such as, for example, the PD law. In other words, ↑S4'_cmd is sequentially determined according to the following expression 4-6.

$$\uparrow S4'\_cmd = Kp5 * \uparrow \Delta Xhead + Kv5 * \uparrow \Delta Xhead' \qquad \text{Expression 4-6}$$

Furthermore, the target joint drive torque ↑τ4_cmd (hereinafter, referred to as the fourth target joint drive torque ↑τ4_cmd) for achieving the target value ↑S4'_cmd (hereinafter, referred to as the fourth-type state quantity target value vector ↑S4'_cmd) calculated according to the above expression 4-6 is determined by the same method as the method of calculating ↑τ1_cmd and ↑τ2_cmd described in the first embodiment (by the arithmetic operation of the right side of the above expression 5-22).

Further, the synthesized target joint drive torque ↑τt_cmd is determined by the arithmetic processing of expression 6-12 by synthesizing the vectors ↑τf1b and ↑τf2b, which are calculated by the arithmetic processing of, for example, the following expressions 6-13 and 6-14, respectively.

$$\uparrow \tau t\_cmd = W1 * \uparrow \tau f1b + W2 * \uparrow \tau f2b \qquad \text{Expression 6-12}$$

where $$\uparrow \tau f1b = \uparrow \tau 1\_cmd + Nu1 * \uparrow \tau 2\_cmd1 \qquad \text{Expression 6-13}$$

$$\uparrow \tau f2b = \uparrow \tau 1\_cmd + Nu1 * \uparrow \tau 4\_cmd + Nu1 * Nu4 * \uparrow \tau 2\_cmd2 \qquad \text{Expression 6-14}$$

In this example, ↑τ1_cmd denotes the same first target joint drive torque as that of the first embodiment, and ↑τ2_cmd1 and ↑τ2_cmd2 denote the same second FF target joint drive torque and second FB target joint drive torque as those of the second embodiment. Further, W1 and W2 denote the same frequency weights as those of the first embodiment.

Moreover, the matrix Nu1 is defined by the above expression 6-4 in the first embodiment, the matrix Nu4 is defined by the following expression 6-15 according to the fourth state quantity Jacobian Js4 and the matrix Js4# defined by the following expression 6-15-1.

$$Nu4 = I - Js4T * Js4\#T \qquad \text{Expression 6-15}$$

In the above, $$Js4\# WatT * Js4T * (Js4 * Wat * Js4T)^{-1} \qquad \text{Expression 6-15-1}$$

As the weight matrix Wat in expression 6-15-1, the inverse matrix $M^{-1}$ of the inertia matrix M is used.

As described hereinabove, it is possible to determine the synthesized target joint drive torque ↑τt_cmd derived by synthesizing ↑τ1_cmd for achieving the first-type state quantity target value vector ↑S1'_cmd related to the first-type state quantity, ↑τ4_cmd for achieving the fourth type state quantity target value vector ↑S4'_cmd related to the fourth type state quantity, and ↑τ2_cmd1 and ↑τ2_cmd2 for achieving the second-type state quantities FF target value vector ↑S2'_cmd1 and ↑S2'_cmd2 related to the second-type state quantity.

In this case, in expression 6-14, the rank of the matrix Nu1 (corresponding to τ(2, 1) in expression 02a of the present invention) is five or six for the most of postures of the robot and the rank of the matrix Nu4 (corresponding to τ(2, 2) in expression 02a of the present invention) is two, and therefore the relationship represented by (Nu1)≥rank(Nu4) is satisfied.

Moreover, in the second embodiment to which the above expressions 01 and 01b in the present invention are applied, the state quantities of the controlled object are three types of state quantities, namely the first-type state quantity, the second-type state quantity, and the third-type state quantity. Regarding the number of types of state quantities of the controlled object, for example, two types of state quantities may be used. Alternatively, another state quantity (for example, the fourth-type state quantity) may be included in the controlled objects.

Moreover, the contact area representative point target acceleration ↑C is set to zero in each of the above embodiments. Alternatively, however, a target of another motion form of the contact area representative points a1 to a4 may be set as ↑C. For example, the motion pattern of the contact area representative points a1 to a4 may be set to a sinusoidal pattern. Further, for example, in the case where the robot 1 exists in a system in which acceleration occurs such as an elevator, the acceleration of the system (acceleration viewed from the inertial coordinate system) may be added to the contact area representative point target acceleration ↑C.

Moreover, the compliance control sections 87 and 97 may be omitted. In other words, the target joint drive torque ↑τt_cmd determined by the synthesized control input determining section 86 or 96 may be directly used to control the drive torque of each joint of the robot 1.

Moreover, in the case where the elastic deformation of the foot 18R or 18L and the floor surface when the foot 18R or 18L is in contact with the ground is sufficiently minute, the contact region elastic deformation compensation sections 88 and 98 may be omitted, so that a target joint angle generated by the gait generating section 71 is input to the state quantity target value determining section 84 or 94.

INDUSTRIAL APPLICABILITY

Under a variety of operating conditions of a robot such as a legged mobile robot, the operation of the robot can be controlled such that a plurality of types of state quantities are efficiently controlled to the target values corresponding to the state quantities, respectively.

EXPLANATION OF REFERENCES

1 ... robot; 2 ... body link; 3 ... leg link; 4 ... arm link; 5 ... head (link); 10 ... lower body (link); 11 ... upper body (link); 12, 19-24, 31-37, 39, 40; joint; 14 ... thigh (link); 16 ... crus (link); 18 ... foot (link); 26 ... upper arm (link); 28 ... forearm (link); 30 ... hand (link); 60 ... control device; 73 ... joint drive control section (actuator control element); 85, 95 ... section for determining control inputs classified by state quantity (element for determining control inputs classified by state quantity); 86, 96 ... synthesized control input determining section (synthesized control input determining element); 87, 97 ... compliance control section (actuator control element).

The invention claimed is:

1. A control device for a robot provided with a plurality of links interconnected by joints and actuators which drive the joints, the control device comprising:
 an element for determining control inputs classified by state quantity which receives respective target values of a plurality of types of state quantities whose values are defined dependently of one or more component values of a generalized variable vector of the robot which is a vector including at least a displacement amount of each joint of the robot as a component, and then determines control inputs classified by state quantity, which are control inputs defining operations of the actuators necessary to achieve the target values corresponding to the state quantities, for each of the respective types of state quantities on the basis of at least the target values corresponding to the state quantities;
 a synthesized control input determining element which determines a synthesized control input by determining control inputs classified by frequency region, which are control inputs defining operations of the actuators in a plurality of respective preset frequency regions, according to one or more of the control inputs classified by state quantity, which are determined correspondingly to the plurality of types of state quantities, respectively, while carrying out processing for synthesizing the control inputs classified by frequency region corresponding to the plurality of frequency regions, respectively;
 an actuator control element which controls the operation of the actuators according to at least the synthesized control input,
 wherein the processing carried out by the synthesized control input determining element includes processing for determining the control inputs classified by frequency region, which correspond to at least one of the plurality of frequency regions, by synthesizing a plurality of control inputs classified by state quantity of the control inputs classified by state quantity, which correspond to the plurality of types of state quantities, respectively, in a mutually non-interfering manner,
 wherein, assuming that τtotal is the synthesized control input, n is the total number of the plurality of frequency regions, an i-th frequency region (i=1, 2, ..., n) is each of n frequency regions, and W(i) is a frequency weight having a frequency pass characteristic set so that the i-th frequency region is a passable frequency band, the synthesized control input determining element determines the synthesized control input τtotal by processing represented by the following expression 01 from n τf(i) (i=1, 2, ..., n) calculated by processing represented by the following expression 02a and the frequency weight W(i) (i=1, 2, ..., n):

[MATH. 1]

$$\tau\,total = W(1)*\tau f(1) + W(2)*\tau f(2) + \ldots + W(n)*\tau f(n) \quad \text{Expression 01}$$
$$= \sum_{i=1}^{n}(W(i)*\tau f(i))$$

$$\tau f(i) = \tau(i,1) + Nu(i,1)*\tau(i,2) + \ldots + Nu(i,1)* \quad \text{Expression 02a}$$
$$Nu(i,2)*\ldots*Nu(i,m(i)-1)*\tau(i,m(i))))$$
$$= \tau(i,1) + \sum_{j=1}^{m(i)-1}\left(\left(\prod_{k=1}^{j}Nu(i,k)\right)*\tau(i,j+1)\right)$$

where

[MATH. 2]

$$\text{if } m(i) = 1, \sum_{j=1}^{m(i)-1}\left(\left(\prod_{k=1}^{j}Nu(i,k)\right)*\tau(i,j+1)\right) \equiv 0$$

where
 W(i)*τf(i) is the i-th control input classified by frequency region, which is a control input classified by frequency region corresponding to the i-th frequency region;
 m(i) is an integer which indicates the number of control inputs classified by state quantity determined as composition components of the i-th control input classified by frequency region W(i)*τf(i) out of the control inputs classified by state quantity corresponding to the plurality of types of state quantities, respectively, and which is set so as to satisfy conditions 1≤m(i)≤M (M: the number of types of the state quantities) and m(i)>1 for any i within a range of satisfying a predetermined constraint condition;
 τ(i, j) is a (i, j)-th control input classified by state quantity (vector), which is a j-th control input classified by state quantity out of the m(i) control inputs classified by state quantity τ(i, j) (j=1, 2, ..., m(i)) determined as composition components of the i-th control input classified by frequency W(i)*τf(i) within a range of satisfying the predetermined constraint condition;
 the predetermined constraint condition is a condition that the following is not satisfied: m(i)=M hold for all i (i=1, 2, ..., n), and τ(i1, j)=τ(i2, j) hold for all j (j=1, 2, ..., M) from 1 to M with respect to arbitrary i values i1 and i2 (1≤i1≤n, 1≤i2≤n) different from each other;

Nu(i, j) is a matrix defined by Nu(i, j)≡I−Js(i, j)$^T$*(Js#(i, j))$^T$;

Js#(i, j) is a matrix defined by Js#(i, j)≡(Wat)$^T$*Js(i, j)$^T$*(Js(i, j)*Wat*Js(i, j)$^T$)$^{-1}$;

I is an identity matrix;

Js(i, j) is a Jacobian satisfying S(i, j)=Js(i, j)·q';

Wat is a matrix defined by Wat≡Wd*M$^{-1}$;

Wd is a preset weight matrix (diagonal matrix);

M is an inertia matrix transforming q" into a generalized force vector (M*q"=generalized force vector);

S(i, j) is a state quantity corresponding to the (i, j)-th control input classified by state quantity (a vector or a scalar);

q is a generalized variable vector;

q' is a first-order differential value of q (=dq/dt); and q" is a second-order differential value of q (=d$^2$q/dt$^2$).

2. The control device for a robot according to claim 1, wherein the frequency weight W(i) (i=1, 2, . . . , n) is a frequency weight expressed by a transfer function in the following expression 03:

[MATH. 5]

$$W(i) = \frac{1}{T(i)*s + 1} * (1 - W(i+1)) \quad \text{Expression 03}$$

where s is a Laplace transform operator;

T(i) (i=1, 2, . . . , n) is a time constant set so as to satisfy T(1)<T(2)< . . . <T(n); and W(n+1)≡0.

3. The control device for a robot according to claim 1, wherein the control inputs classified by state quantity τ(i, j) (j=1, 2, . . . , m(i)), whose number m(i) satisfies m(i)>1 and which are determined as composition components of the i-th control input classified by frequency region W(i)*τf(i), are control inputs classified by state quantity selected out of the M control inputs classified by state quantity corresponding to the plurality of types of state quantities such that the m(i) matrices Nu(i, j) (j=1, 2, . . . , m(i)) used for calculating the expression 02a satisfy a relationship expressed by rank(Nu(i, 1))≥rank(Nu(i, 2))≥ . . . ≥rank(Nu(i, m(i))).

4. A control device for a robot provided with a plurality of links interconnected by joints and actuators which drive the joints, the control device comprising:

an element for determining control inputs classified by state quantity which receives respective target values of a plurality of types of state quantities whose values are defined dependently of one or more component values of a generalized variable vector of the robot which is a vector including at least a displacement amount of each joint of the robot as a component, and then determines control inputs classified by state quantity, which are control inputs defining operations of the actuators necessary to achieve the target values corresponding to the state quantities, for each of the respective types of state quantities on the basis of at least the target values corresponding to the state quantities;

a synthesized control input determining element which determines a synthesized control input by determining control inputs classified by frequency region, which are control inputs defining operations of the actuators in a plurality of respective preset frequency regions, according to one or more of the control inputs classified by state quantity, which are determined correspondingly to the plurality of types of state quantities, respectively, while carrying out processing for synthesizing the control inputs classified by frequency region corresponding to the plurality of frequency regions, respectively;

an actuator control element which controls the operation of the actuators according to at least the synthesized control input, wherein the processing carried out by the synthesized control input determining element includes processing for determining the control inputs classified by frequency region, which correspond to at least one of the plurality of frequency regions, by synthesizing a plurality of control inputs classified by state quantity of the control inputs classified by state quantity, which correspond to the plurality of types of state quantities, respectively, in a mutually non-interfering manner, wherein, assuming that τtotal is the synthesized control input, n is the total number of the plurality of frequency regions, an i-th frequency region (i=1, 2, . . . , n) is each of n frequency regions, and W(i) is a frequency weight having a frequency pass characteristic set so that the i-th frequency region is a passable frequency band, the synthesized control input determining element determines the synthesized control input τtotal by processing represented by the following expression 01 from n τf(i) (i=1, 2, . . . , n) calculated by processing represented by the following expression 02b and the frequency weight W(i) (i=1, 2, . . . , n):

[MATH. 3]

$$\tau\text{total} = W(1)*\tau f(1) + W(2)*\tau f(2) + \ldots + W(n)*\tau f(n) \quad \text{Expression 01}$$

$$= \sum_{i=1}^{n} (W(i)*\tau f(i))$$

$$\tau f(i) = wc(i, 1)*\tau(i, 1) + Nuw(i, 1)*wc(i, 2)* \quad \text{Expression 02b}$$
$$\tau(i, 2) + \ldots + Nuw(i, 1)*Nuw(i, 2)*\ldots*$$
$$Nuw(i, m(i) - 1)*wc(i, m(i))*\tau(i, m(i))))$$

$$= wc(i, 1)*\tau(i, 1) + \sum_{j=1}^{m(i)-1}\left(\left(\prod_{k=1}^{j} Nuw(i, k)\right) * wc(i, j+1)*\tau(i, j+1)\right)$$

where

[MATH. 4]

if m(i) = 1, $$\sum_{j=1}^{m(i)-1}\left(\left(\prod_{k=1}^{j} Nuw(i, k)\right) * wc(i, j+1)*\tau(i, j+1)\right) \equiv 0,$$

where

W(i)*τf(i) is the i-th control input classified by frequency region, which is a control input classified by frequency region corresponding to the i-th frequency region;

m(i) is an integer which indicates the number of control inputs classified by state quantity determined as composition components of the i-th control input classified by frequency region W(i)*τf(i) out of the control inputs classified by state quantity corresponding to the plurality of types of state quantities, respectively, and which is set so as to satisfy conditions 1≤m(i)≤M (M: the number of types of the state quantities) and m(i)>1 for any i within a range of satisfying a predetermined constraint condition;

$\tau(i, j)$ is the (i, j)-th control input classified by state quantity (vector), which is the j-th control input classified by state quantity out of the m(i) control inputs classified by state quantity $\tau(i, j)$ (j=1, 2, ..., m(i)) determined as composition components of the i-th control input classified by frequency $W(i)*\tau f(i)$ within a range of satisfying the predetermined constraint condition;

the predetermined constraint condition is a condition that the following is not satisfied: m(i)=M hold for all i (i=1, 2, ..., n), and $\tau(i1, j)=\tau(i2, j)$ hold for all j (j=1, 2, ..., M) from 1 to M with respect to arbitrary i values i1 and i2 (1≤i1≤n, 1i2≤n) different from each other;

wc (i, j) is a weight coefficient which corresponds to the (i, j)-th control input classified by state quantity $\tau(i, j)$ and which is maintained at a constant value within a range of 0≤wc(i, j)≤1 or set in a fixed or variable manner within a range of weight coefficients set so as to continuously change;

Nuw(i, j) is a matrix defined by Nuw(i, j)≡I−wc(i, j)*Js(i, j)$^T$*(Js#(i, j))$^T$;

Js#(i, j) is a matrix defined by Js#(i, j)≡(Wat)$^T$*Js(i, j)$^T$*(Js(i, j)*Wat*Js(i, j)$^T$)$^{-1}$;

I is an identity matrix;

Js(i, j) is a Jacobian satisfying S(i, j)=Js(i, j)·q';

Wat is a matrix defined by Wat≡Wd*M$^{-1}$;

Wd is a preset weight matrix (diagonal matrix);

M is an inertia matrix transforming q" into a generalized force vector (M*q"=generalized force vector);

S(i, j) is a state quantity corresponding to the (i, j)-th control input classified by state quantity (vector or scalar);

q is a generalized variable vector;

q' is a first-order differential value of q (=dq/dt); and q" is a second-order differential value of q (=d$^2$q/dt$^2$).

5. The control device for a robot according to claim 4, wherein:

the robot makes motions including an operation of causing a predetermined area thereof to come in contact with a portion to be contacted in an external world of the robot and an operation of moving away from the portion to be contacted, and the plurality of types of state quantities include the motion state quantity of the predetermined area with the predetermined area of the robot being away from the portion to be contacted as a controlled object in at least one frequency region out of the plurality of frequency regions; and assuming that an ia-th frequency region is a frequency region in which the motion state quantity of the predetermined area is included as a controlled object and an (ia, ja)-th control input classified by state quantity $\tau$(ia, ja) is a control input classified by state quantity corresponding to the motion state quantity of the predetermined area out of the control inputs classified by state quantity to be composition components of the ia-th control input classified by frequency region (W(ia)*$\tau$f(i)) corresponding to the ia-th frequency region, the value of the weight coefficient wc(ia, ja) corresponding to $\tau$(ia, ja) is set so as to be maintained at zero in a period in which the predetermined area is in contact with the portion to be contacted, and the value of the weight coefficient wc(ia, ja) is set so as to continuously increase from zero to one and thereafter to continuously decrease from one to zero in a period in which the predetermined area is away from the portion to be contacted.

6. The control device for a robot according to claim 4, wherein the frequency weight W(i) (i=1, 2, ..., n) is a frequency weight expressed by a transfer function in the following expression 03:

[MATH. 6]

$$W(i) = \frac{1}{T(i)*s+1} * (1 - W(i+1)) \quad \text{Expression 03}$$

where s is a Laplace transform operator;

T(i) (i=1, 2, ..., n) is a time constant set so as to satisfy T(1)<T(2)<...<T(n); and W(n+1)≡0.

7. The control device for a robot according to claim 4, wherein the control inputs classified by state quantity $\tau$(i, j) (j=1, 2, ..., m(i)), whose number m(i) satisfies m(i)>1 and which are determined as composition components of the i-th control input classified by frequency region W(i)*$\tau$f(i), are control inputs classified by state quantity selected out of the M control inputs classified by state quantity corresponding to the plurality of types of state quantities such that the m(i) matrices Nuw(i, j) (j=1, 2, ..., m(i)) used for calculating the expression 02b satisfy a relationship expressed by rank(Nuw(i, 1))≥rank(Nuw(i, 2))≥...≥rank(Nuw(i, m(i))).

\* \* \* \* \*